(12) United States Patent  (10) Patent No.: US 7,714,956 B2
Sawayama et al.  (45) Date of Patent: May 11, 2010

(54) FRONT ILLUMINATING DEVICE AND A REFLECTION-TYPE LIQUID CRYSTAL DISPLAY USING SUCH A DEVICE

(75) Inventors: Yutaka Sawayama, Nara (JP); Yukihiro Sumida, Nara (JP); Takeshi Masuda, Nara (JP); Tsuyoshi Ebi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 680 days.

(21) Appl. No.: 11/009,788

(22) Filed: Dec. 10, 2004

(65) Prior Publication Data

US 2005/0174509 A1  Aug. 11, 2005

Related U.S. Application Data

(63) Continuation of application No. 09/394,327, filed on Sep. 13, 1999, now Pat. No. 6,879,354, which is a continuation-in-part of application No. 09/048,527, filed on Mar. 26, 1998, now abandoned.

(30) Foreign Application Priority Data

Mar. 28, 1997 (JP) ..................................... 9-78211
Dec. 19, 1997 (JP) .................................. 9-351794
Sep. 16, 1998 (JP) ................................ 10-260717

(51) Int. Cl.
     *G20F 1/1335* (2006.01)
(52) U.S. Cl. .......................................... 349/63; 349/62
(58) Field of Classification Search ................... 349/62, 349/63
     See application file for complete search history.

(56) References Cited

U.S. PATENT DOCUMENTS 4,124,279 A  11/1978  Byles (Continued)

FOREIGN PATENT DOCUMENTS

JP  61-34583  2/1986

(Continued)

OTHER PUBLICATIONS

Machine translation of JP 11202785 A, You, Eiho.*
C.Y. Tai, et al., "A Transparent Frontlighting System for Reflective-Type Displays", SID International Symposium Digest of Technical Papers, XXVI: 375-378 (1995).

*Primary Examiner*—Dung Nguyen
*Assistant Examiner*—Lucy P Chien
(74) *Attorney, Agent, or Firm*—Edwards Angell Palmer & Dodge LLP; David G. Conlin; William J. Daley, Jr.

(57) ABSTRACT

A front-illuminating device of the present invention, which is placed over the entire surface of an object to be illuminated such as a reflection-type liquid crystal display device when it is used, is provided with a light source and a light-directing body. The light-directing body has an incident surface on which light from the light source (light-source light) is made incident, a first light-releasing surface for releasing the light toward the object to be illuminated, and a second light-releasing surface which faces the first light-releasing surface and releases reflected light from the object to be illuminated. The second light-releasing surface is formed into a step shape in which slanting portions and flat portions are alternately placed. The light source light, released from the first light-releasing surface to the object to be illuminated, is reflected by the object to be illuminated and the reflected light is allowed to reach the observer from the first light-releasing surface through the flat portions. In this case, among the light-source light rays, the light components progressing in parallel with the flat portions are reflected by the slanting portions and directed to the object to be illuminated. Consequently, the present invention makes it possible to provide a brighter front-illuminating device in which the efficiency of use of the light-source light is improved.

36 Claims, 62 Drawing Sheets

U.S. PATENT DOCUMENTS

| | | | |
|---|---|---|---|
| 4,252,416 A * | 2/1981 | Jaccard | 349/65 |
| 4,914,553 A | 4/1990 | Hamada et al. | |
| 5,046,826 A | 9/1991 | Iwamoto et al. | |
| 5,050,946 A * | 9/1991 | Hathaway et al. | 385/33 |
| 5,165,772 A | 11/1992 | Wu | |
| 5,197,792 A | 3/1993 | Jiao et al. | |
| 5,341,231 A * | 8/1994 | Yamamoto et al. | 349/63 |
| 5,357,405 A | 10/1994 | Park | |
| 5,359,503 A | 10/1994 | Myodo et al. | |
| 5,485,354 A * | 1/1996 | Ciupke et al. | 362/619 |
| 5,506,929 A | 4/1996 | Tai et al. | |
| 5,584,556 A * | 12/1996 | Yokoyama et al. | 362/625 |
| 5,608,550 A * | 3/1997 | Epstein et al. | 349/57 |
| 5,608,837 A | 3/1997 | Tai et al. | |
| 5,640,483 A | 6/1997 | Lin | |
| 5,772,304 A | 6/1998 | Smith | |
| 5,779,338 A | 7/1998 | Ishikawa et al. | |
| 5,914,760 A | 6/1999 | Daiku | |
| 5,982,540 A * | 11/1999 | Koike et al. | 359/487 |
| 6,092,904 A * | 7/2000 | Tai et al. | 362/603 |
| 6,164,799 A * | 12/2000 | Hirmer et al. | 362/330 |
| 6,266,108 B1 | 7/2001 | Bao et al. | |
| 6,379,017 B2 | 4/2002 | Nakabayashi et al. | |
| 2001/0019479 A1 | 9/2001 | Nakabayashi et al. | |

FOREIGN PATENT DOCUMENTS

| | | |
|---|---|---|
| JP | 62-073206 | 4/1987 |
| JP | 01189627 A | 7/1989 |
| JP | 2-85422 | 7/1990 |
| JP | 05-158033 | 6/1993 |
| JP | 05158034 A | 6/1993 |
| JP | 05-297366 | 11/1993 |
| JP | 06-123884 | 5/1994 |
| JP | 06-160636 | 6/1994 |
| JP | 06-174929 | 6/1994 |
| JP | 08-050291 | 2/1996 |
| JP | 08-094844 | 4/1996 |
| JP | 08-201807 | 8/1996 |
| JP | 09102209 B2 | 4/1997 |
| JP | 10268306 A | 10/1998 |
| JP | 10-301109 | 11/1998 |
| JP | 11-109344 | 4/1999 |
| JP | 11-202785 | 7/1999 |
| JP | 11184386 A | 7/1999 |
| JP | 11-242220 | 9/1999 |
| JP | 11-326903 | 11/1999 |
| JP | 2000-019330 | 1/2000 |
| KR | 1994-0005971 | 3/1994 |
| KR | 01493761 | 4/1998 |

* cited by examiner

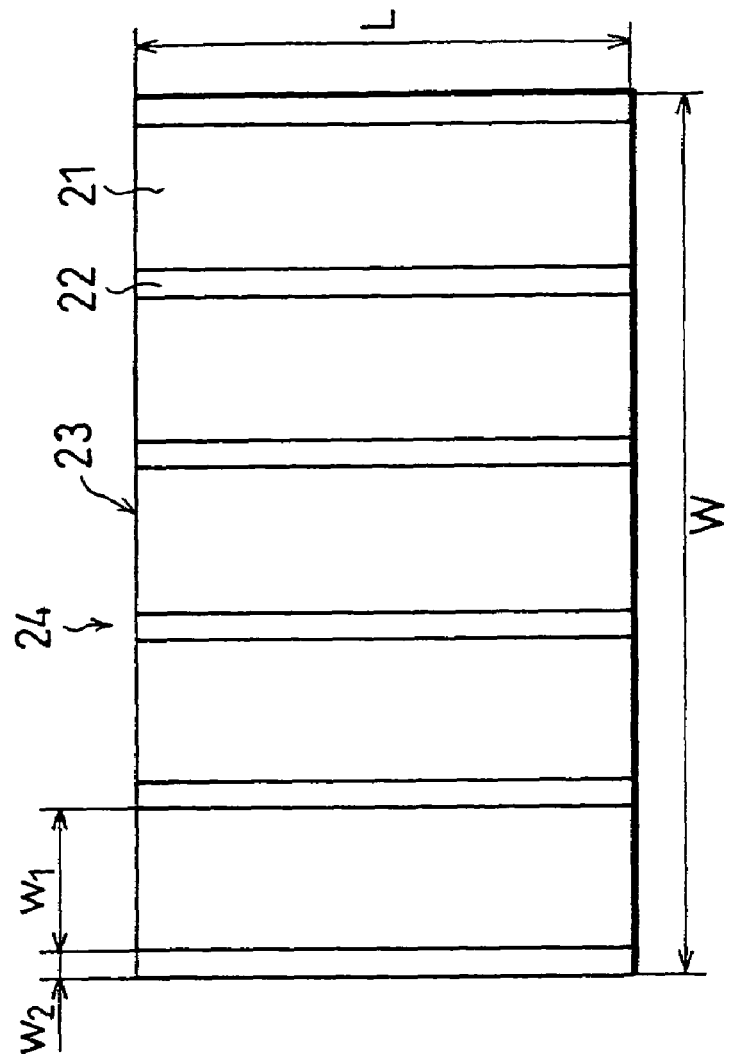
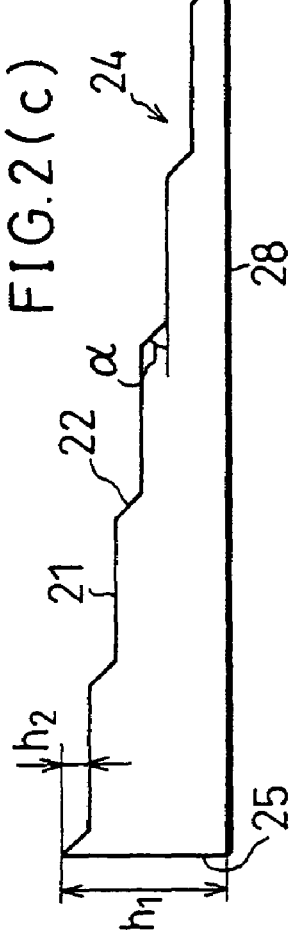
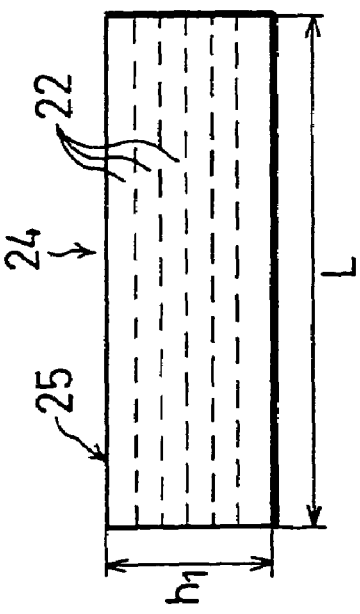

F I G. 4
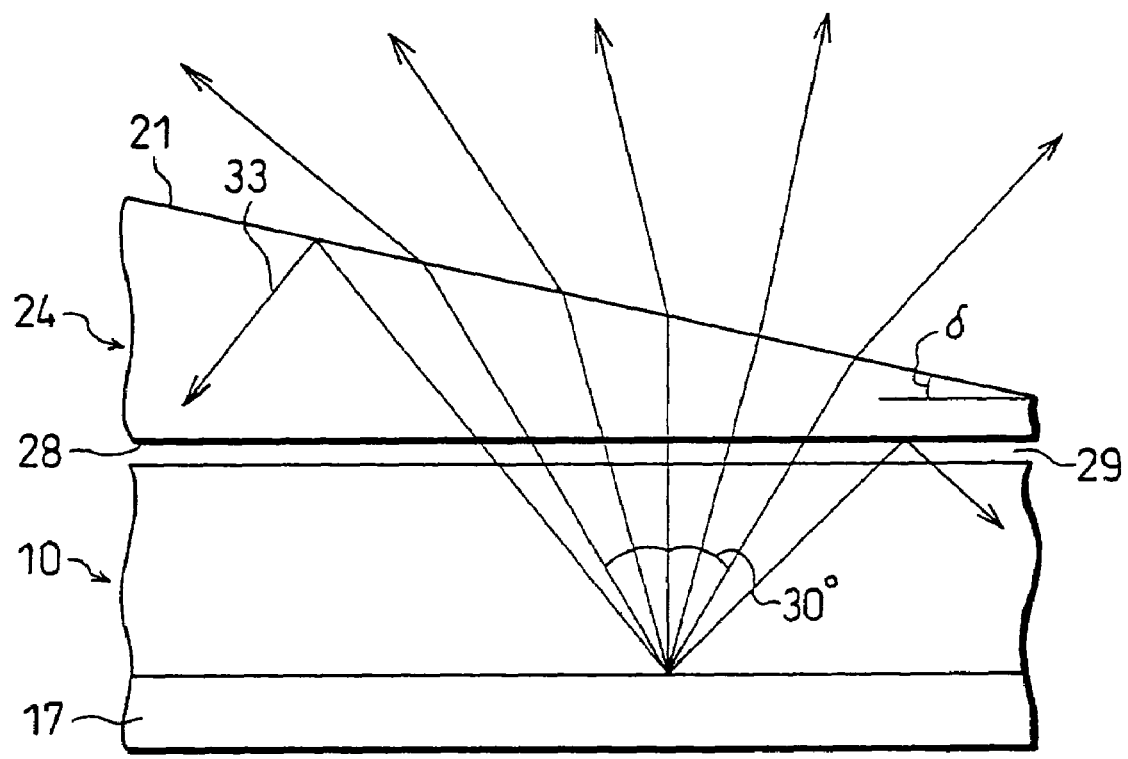

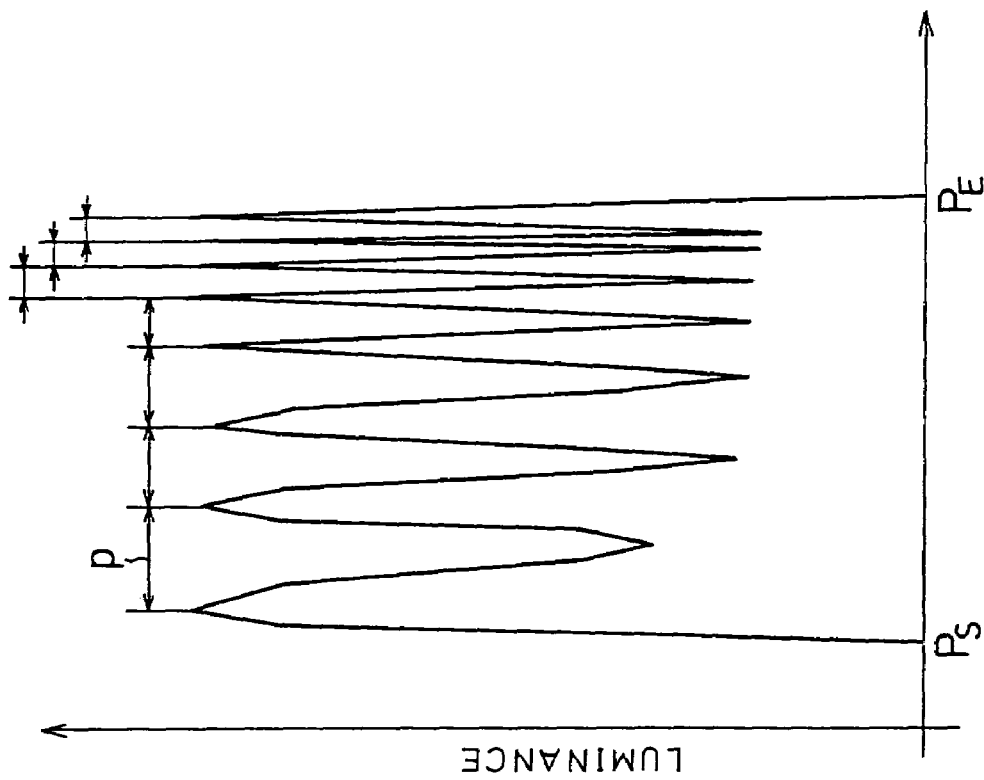
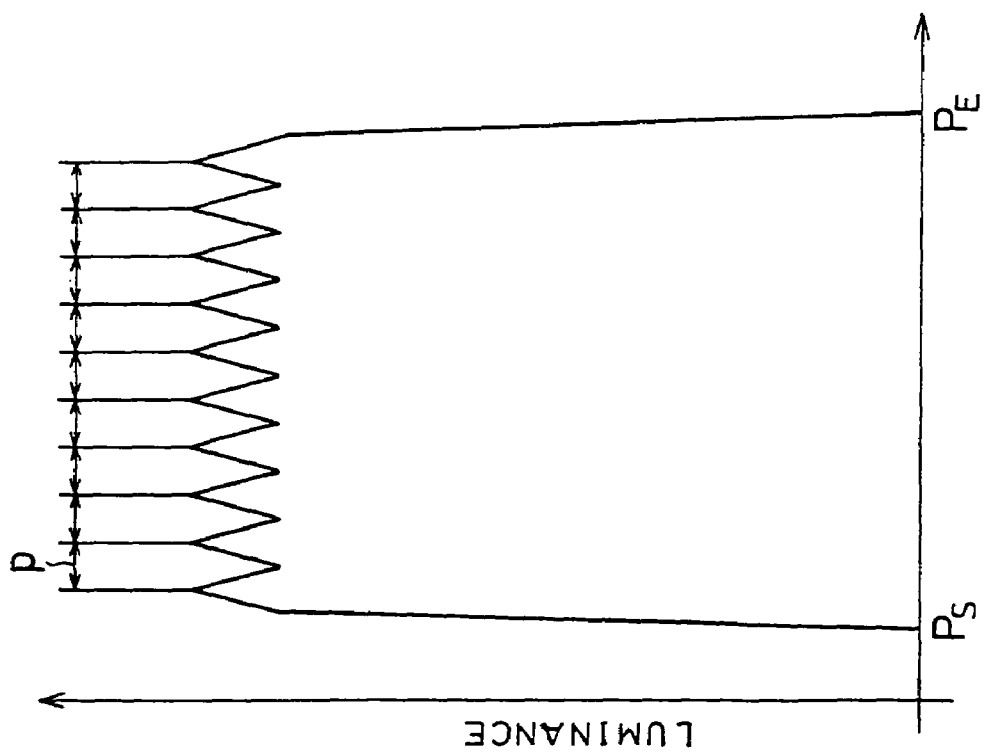

F I G. 15
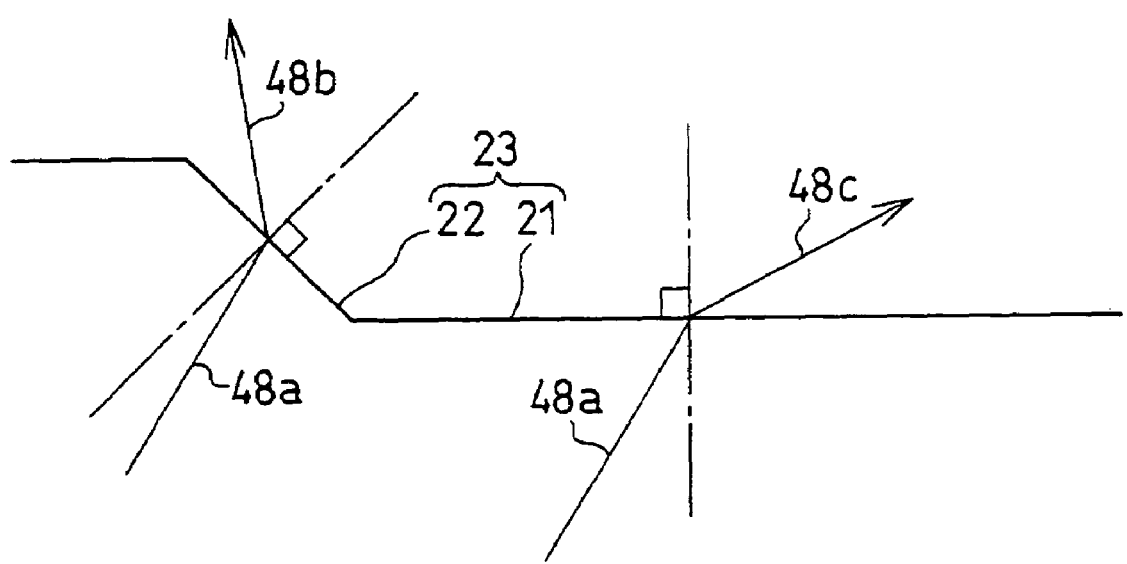

F I G. 40 (a)
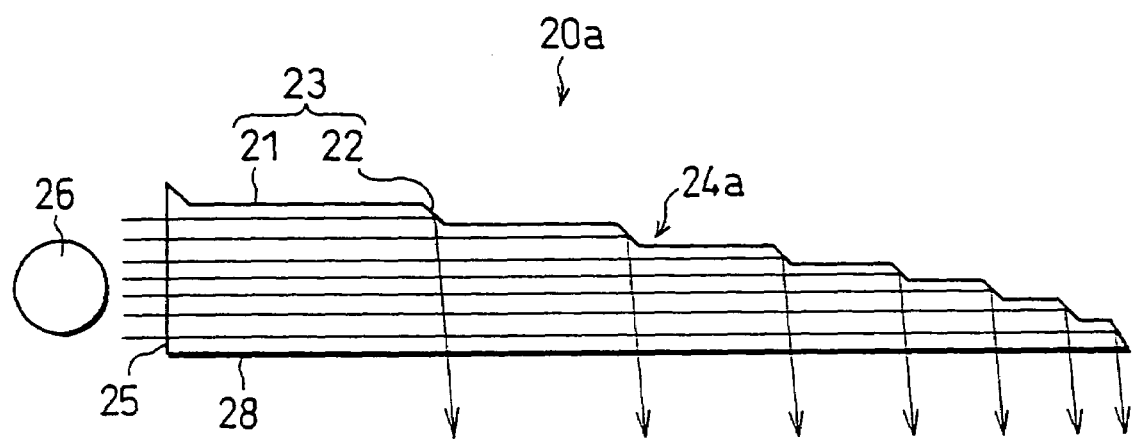
F I G. 40 (b)
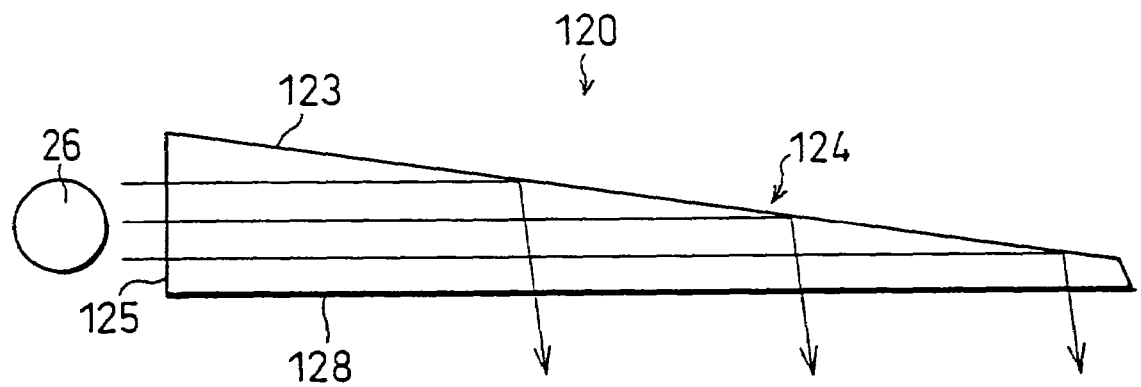

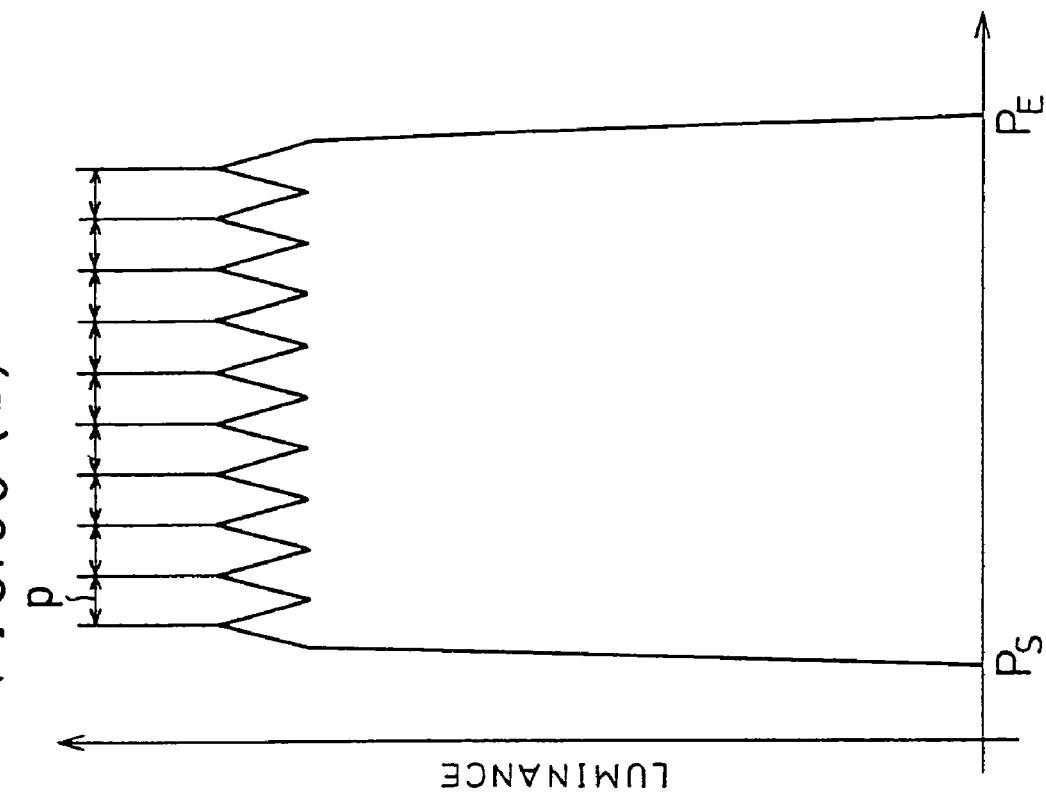
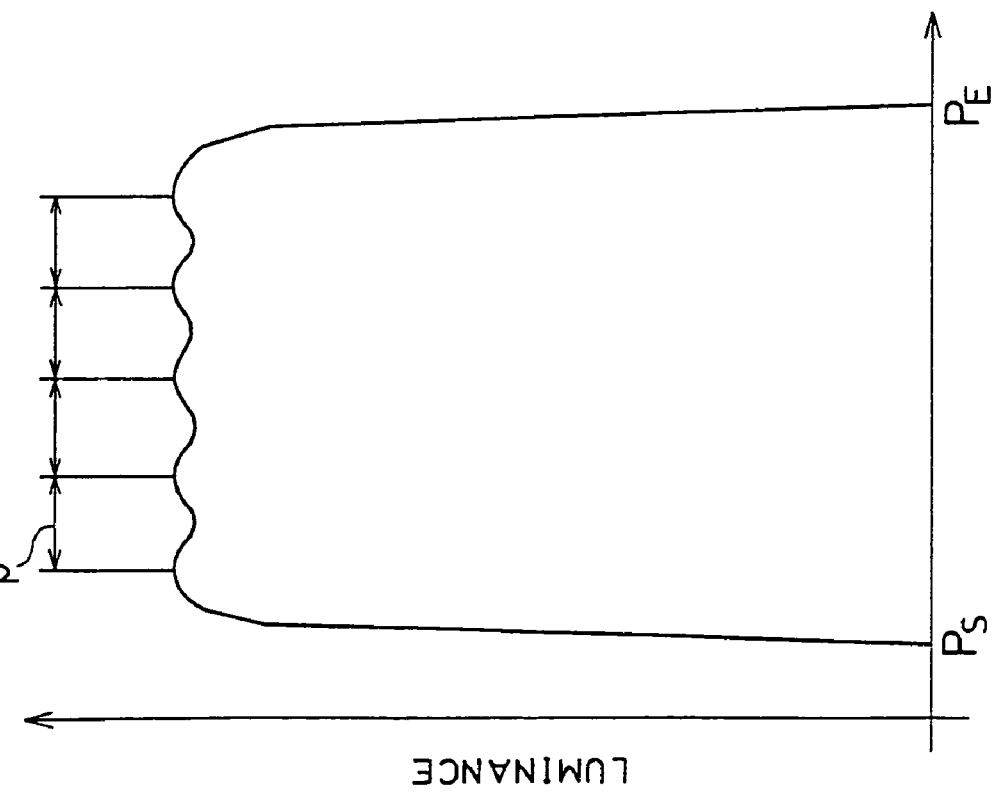
FIG. 50(a)
FIG. 50(b)

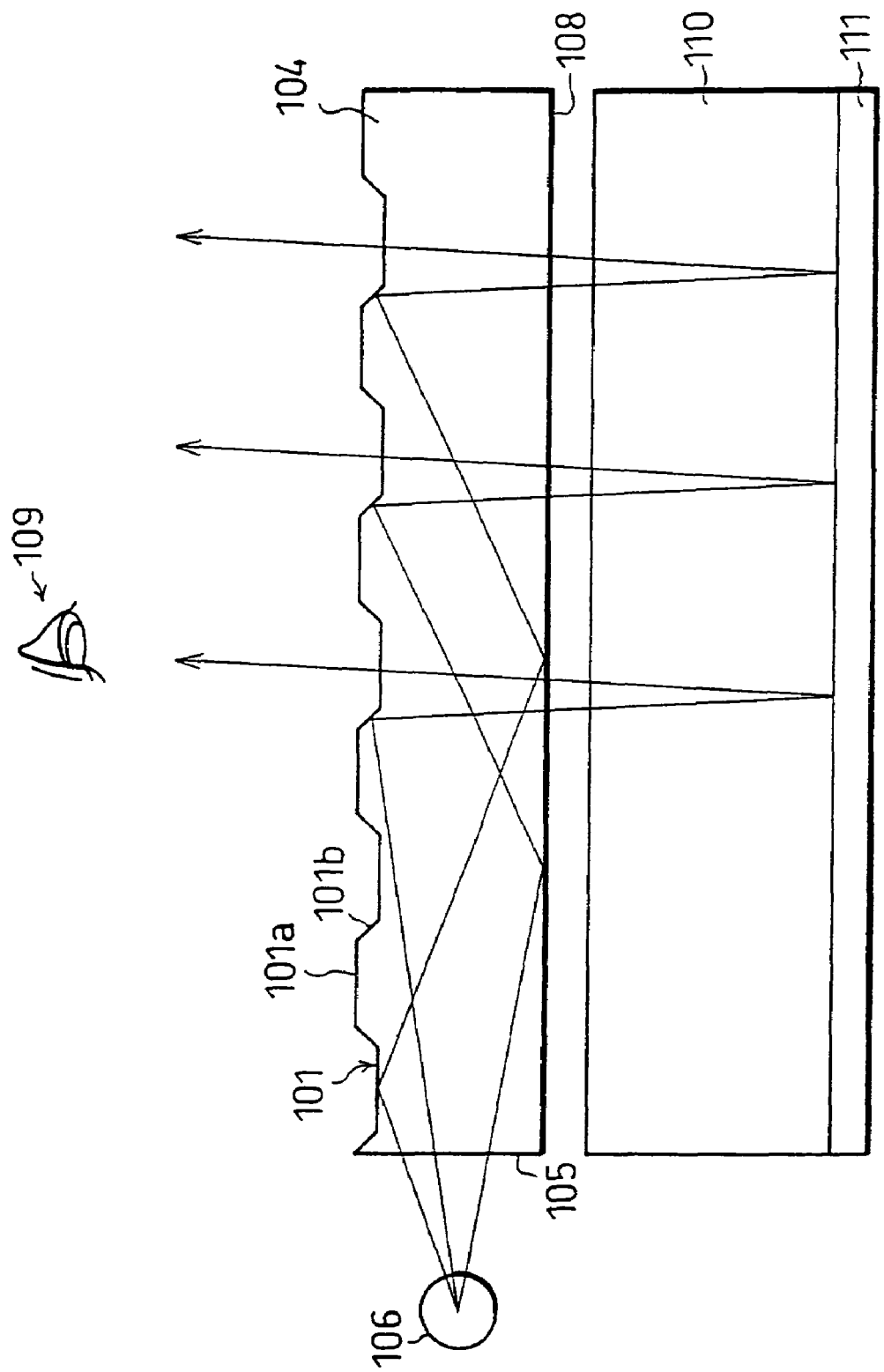

delta alignment stripe alignment

FRONT ILLUMINATING DEVICE AND A REFLECTION-TYPE LIQUID CRYSTAL DISPLAY USING SUCH A DEVICE

This application is a continuation of U.S. application Ser. No. 09/394,327, filed Sep. 13, 1999, now U.S. Pat. No. 6,879,354, which application is a continuation-in-part of U.S. application Ser. No. 09/048,527, filed Mar. 26, 1998 (now abandoned), the teachings of which are incorporated herein by reference.

FIELD OF THE INVENTION

The present invention relates to a front-illuminating device which is placed in use between an object to be illuminated and an observer so as to illuminate the object with light and which is designed to transmit reflected light from the object so that the reflected light can be visualized to the observer and a reflection-type liquid crystal display having such a front-illuminating device and a reflection-type liquid crystal cell, and more particularly concerns a front-illuminating device for carrying out efficient illumination without causing degradation in the display quality of the reflection-type liquid crystal cell, and a thin, light-weight, low-power-consumption reflection-type liquid crystal display that uses such a front-illuminating device as an auxiliary light source and that is used for image display in apparatuses, such an information display system and an OA system.

BACKGROUND OF THE INVENTION

Different from other displays such as CRTs (Cathode Ray Tubes), PDP (Plasma Display Panels) and EL (Electro Luminescence) devices, liquid crystal displays display characters and images by adjusting the quantity of transmitted light from a specific light source even though the liquid crystal itself does not emit light.

Conventional liquid crystal displays (hereinafter, referred to as LCDs) are mainly classified into transmission-type LCDs and reflection-type LCDs.

In the transmission-type LCD, polarizing plates are respectively placed on the light-incident side and the light-releasing side of a transmission-type liquid crystal cell (transmission-type liquid crystal display element). In the transmission-type LCD of this type, the polarized state of linearly polarized light that has been made incident on the polarizing plate is modulated by a liquid crystal layer, and the light transmitted through the liquid crystal layer is controlled in its quantity of light while being transmitted through the polarizing plate on the light-releasing side, with a result that an image is displayed. For this reason, a surface-illuminating light source, such as a fluorescent tube and an EL device, is placed on the back-surface of the transmission-type liquid crystal cell as a light source (a back light).

The reflection-type LCD is, on the other hand, provided with a reflection-type liquid crystal cell (reflection-type liquid crystal display element) having, for example, a sheet of a polarizing plate and a reflective plate. In this reflection-type LCD, linearly polarized light, made incident on the polarizing plate, is reflected by the reflective plate, and in the course of again reaching the polarizing plate, the polarized state of the linearly polarized light is modulated by the liquid crystal layer so that the quantity of light released from the polarizing plate is controlled.

In other words, the reflection-type LCD does not require a back light since display is made by utilizing ambient light, thereby providing advantages of light weight, thinness and reduced power consumption. Further, in very bright places like places that are subjected to direct sun light, the display is hardly visible in the case of the light-emitting-type display and the transmission-type display due to extreme degradation in visibility for images; in contrast, in the case of the reflection-type LCD, the display is viewed more clearly because of its improved visibility for images. For this reason, in recent years, there have been ever-increasing demands for reflection-type LCDs, and these LCDs tend to be adopted, in particular, to portable-type information terminals and mobile computers that are more likely to be used outdoors.

However, although it has the above-mentioned advantages, the reflection-type LCD also has the following problem. Since the reflection-type LCD utilizes ambient light, its display luminance is highly dependent on environmental conditions. In particular, in dark environmental conditions, for example, at night, the display is sometimes completely invisible. Moreover, the above-mentioned problem is particularly aggravated in those reflection-type LCDs using color filters for color display and those reflection-type LCDs using polarizing plates, and an auxiliary illuminating means is required in case of insufficient ambient light.

However, in the reflection-type liquid crystal cell used for the reflection-type LCD, since a reflective plate made of a metal thin-film, etc. is placed on the back surface of the liquid crystal layer, a back light, as used in the transmission-type LCD, can not be used as an auxiliary illuminating means. LCDs using a half-mirror as a reflective plate, called the semi-transmission-type LCDs, have been proposed; however, the display characteristics thereof merely end up with those somewhat in the middle of the transmission-type LCD and the reflection-type LCD, and it seems to be difficult to put this type of LCDs into practical use.

For this reason, front-light systems, which are placed on the front surface of liquid crystal cell, have been conventionally proposed as an auxiliary lighting device for the reflection-type LCD in case of use in dark conditions. In general, the front-light system is provided with a light-directing body and a light source that is placed on the side face of the light-directing body. Light from the light source, which is made incident on the side face of the light-directing body, proceeds inside the light-directing body, and is reflected in accordance with a shape formed on the surface of the light-directing body so as to be released toward the liquid crystal cell. The light thus released is adjusted in accordance with display information while being transmitted through the liquid crystal cell, and is reflected by the reflective plate that is placed on the back surface side of the liquid crystal cell. The reflected light is again transmitted through the light-directing body, and released toward the observer. Thus, the observer is allowed to recognize the display even in case of an insufficient quantity of ambient light.

Such front-light systems have been disclosed by, for example, Japanese Laid-Open Patent Publication No. 158034/1993 (Tokukaihei 5-158034), Japanese Laid-Open Patent Publication No. 102209/1997 (Tokukaihei 9-102209) and SID95 DIGEST "A Transparent Front Lighting System for Reflective-type Display" (C. Y. Tai, H. Zou, P.-K. Tai p 375-p 278).

Here, referring to Figures, an explanation will be briefly given of the operating principle of the front light system disclosed in (1) Japanese Laid-Open Patent Publication No. 102209/1997 (Tokukaihei 9-102209) and (2) SID95DIGEST.

First, in Laid-Open Patent Application (1), the front light is disclosed as an auxiliary illuminating means used in a transmission-type LCD. More specifically, as illustrated in FIG. 60, a surface light-emitting source device (front light, illuminating means) 700, which is provided with a light source 701 and a light-directing body 703 having a surface on which periodic protruding and recessed portions 702 are formed, is installed. The light source 701 is placed on a side face of the light-directing body 703, and light from the light source 701 is made incident on the light-directing body 703 through this side face. A face opposing the face having the protruding and recessed portions 702 formed thereon in the light-directing body 703 is formed so as to serve as a light-releasing surface 704 which releases light from the light source 701 toward the LCD side.

By placing the protruding and recessed portions 702 in a manner so as to face the surface of the reflection-type LCD 705, the surface light-emitting source device 700 can be applied not only to the transmission-type LCD, but also to the reflection-type LCD 705 as an illuminating means. In this case, the light released from the light-releasing surface 704 is made incident on the reflection-type LCD 705 with virtually the same angle as the light projected to the reflection-type LCD 705 with an angle virtually close to the normal to the surface thereof. Therefore, it is possible to irradiate the reflection-type LCD 705 with high efficiency.

Here, in the surface light-emitting source device 700 disclosed in the above-mentioned Laid-Open Patent Application (1), Moire fringes tend to occur due to interference between the periodic protruding and recessed portions 702 formed on the light-directing body 703 and the repeating direction (not shown) of the pixels formed on the reflection-type LCD 705, resulting in degradation in the display quality. However, Laid-Open Patent Application (1) does not disclose anything about techniques for addressing the above-mentioned problem.

Moreover, for example, as illustrated in FIG. 61, the protruding and recessed portions 702 formed on the surface of the light-directing body 703 are arranged with respectively different formation angles to adjacent pixels 708a, 708b formed inside the reflection-type LCD 705. For this reason, when the observer 709 views an image through the light-directing body 703, the observed image 708b viewed through a recessed portion 702a as "a window" and the observed image 708a viewed through a protruding portion 702b as "a window" have different observed positions, resulting in a problem of double images in the image viewed by the observer 709.

Here, as illustrated in FIG. 51, in the front-light system disclosed in the reference (2), it is supposed that one of the side faces of a light-directing body 104 having an interface 101 formed by flat portions 101a and slanting portions 101b is referred to as an incident surface 105 on which light from a light source 106 is made incident. In other words, the light source 106 is placed at a position facing the incident surface 105 of the light-directing body 104.

Among light rays that have been made incident on the light-directing body 104 from the light source 106 through the light-directing body 104, some are allowed to proceed straight and some are made incident on the interface 101 or 108 that are formed by the light-directing body 104 and its ambient medium. In this case, supposing that the ambient medium of the light-directing body 104 is air and that the refractive index of the light-directing body is approximately 1.5, it is found by the Snell's law (equation 1) that those light rays which have incident angles of not less than approximately 41.8° with respect to the interface 101 or 108 are totally reflected by the interface 101 or 108.

$$n_1 \cdot \sin\theta_1 = n_2 \cdot \sin\theta_2$$

$$\theta_C = \arcsin(n_2/n_1) \qquad \text{(equation 1)}$$

where:

$n_1$ is the refractive index of the first medium (in this case, the light-directing body 104), $n_2$ is the refractive index of the second medium (in this case, air), $\theta_1$ is an incident angle from the light-directing body 104 onto the interface 101, $\theta_2$ is a releasing angle from the interface 101 to the second medium, and $\theta_C$ is a critical angle.

Among the light rays that were made incident on the interface 101 or 108, those light rays that have been totally reflected by the slanting portions 101b that form reflective surfaces and those light rays that have been reflected by the slanting portions 101b of the interface 101 after having been totally reflected by the interface 108 are made incident on the liquid crystal cell 110. The light rays, made incident on the liquid crystal cell 110, are reflected by a reflective plate 111 that is placed on the back surface of the liquid crystal cell 110 after having been adjusted by a liquid crystal layer, not shown, again made incident on the light-directing body 104, allowed to pass through the flat portions 101a, and released toward the observer 109.

Further, those light rays, which have passed through the incident surface 105 from the light source 106 and have been made incident not on the slanting portions 101b but on the flat portions 101a, are allowed to proceed while repeating total reflections between the interface 101 and the interface 108 until they reach the slanting portions 101b. Here, the area of the slanting portions 101b, when seen from the observer 109 side, are formed to become sufficiently small as compared with the area of the flat portions 101a.

The above-mentioned conventional front-light system has the following problems in its structure.

(1) As illustrated in FIG. 52, those light rays which can not reach the slanting portions 101b even after repeating total reflections and those light rays which have been made incident virtually perpendicularly on the incident surface 105 are formed into light 114 that is released out of the light-directing body 104 from a surface 107 that faces the incident surface 105; therefore, they are not utilized for display. In other words, the system fails to provide good efficiency in the use of light.

(2) The shape of the interface 101 formed by the slanting portions 101b and the flat portions 101a is just similar to a shape formed by flattening apexes of a prism sheet; therefore, as shown in FIG. 52, ambient light 115 tends to be reflected toward the observer 109, resulting in degradation in the display quality.

These problems are commonly seen in most of the conventional front-light systems. Consequently, the use of such front-light systems fails to illuminate an object to be illuminated (such as the reflection-type LCD) with a sufficient quantity of light. Therefore, it has been demanded to improve the efficiency of use of light in the light source of the front-light systems.

Moreover, as illustrated in FIG. 62(a), the reference (2) also discloses an arrangement in which: a first light-directing body 900a for directing light from the light source 901 of the reflection-type LCD 905 is placed, and a second light-directing body 900b is placed in front of this first light-directing body 900a so as to correct the proceeding direction of the released light therefrom. Such a front light system having the first light-directing body 900a and the second light-directing body 900b makes it possible to correct double images.

However, even in the above-mentioned arrangement, interference tends to occur between periodic structures 902 formed on the first light-directing body 900a and the second light-directing body 900b and the repeating direction of pixels formed on the reflection-type LCD, resulting in a problem of Moire fringes.

Moreover, as illustrated in FIG. 62(b), the space formed between the first light-directing body 900a and the second light-directing body 900b needs to be adjusted in the order of several μms. Without ensuring such precision in the space, Newton rings occur between the first light-directing body 900a and the second light-directing body 900b, resulting in a problem of serious degradation in the display quality.

Furthermore, in the above-mentioned arrangement, since the two light-directing bodies, the first light-directing body 900a and the second light-directing body 900b, are installed, the light transmittance is reduced as compared with a case of one light-directing body. As a result, the brightness of the reflection-type LCD that displays images by reflecting external light is reduced, resulting in difficulty in achieving thinness and light weight.

SUMMARY OF THE INVENTION

The present invention has been devised so as to solve the above-mentioned problems, and its objective is to provide a front-illuminating device for improving the efficiency of use of light in the light source and for illuminating an object to be illuminated uniformly and more brightly, and also to provide a reflection-type liquid crystal display using such a front-illuminating device.

Moreover, another objective of the present invention is to provide a thin, light-weight, reflection-type liquid crystal display with high display quality by preventing double images and occurrences of various phenomena resulting from light interference, such as Moire fringes and Newton rings.

In order to solve the above-mentioned problems, the front-illuminating device of the present invention is provided with: a light source and a light-directing body that is placed in front of an object to be illuminated, the light-directing body having an incident surface on which light from the light source is made incident, a first light-releasing surface from which light is released to the object to be illuminated and a second light-releasing surface, placed face to face with the first light-releasing surface, for releasing light reflected from the object to be illuminated, wherein the second light-releasing surface is formed into a step shape in which slanting portions for reflecting light mainly from the light source toward the first light-releasing surface and flat portions for transmitting light reflected mainly from the object to be illuminated are alternately placed.

In the above-mentioned construction, illuminating light is released from the first light-releasing surface to the object to be illuminated, and light reflected from the object to be illuminated is again returned to the inside of the light-directing body from the first light-releasing surface, and then allowed to pass through the flat portions of the second light-releasing surface to reach the observer. In the light-directing body of the above-mentioned construction, the second light-releasing surface, which faces the first light-releasing surface, is formed into a step shape in which slanting portions and flat portions are alternately placed and the slanting portions, each of which is located between the flat portions, reflect light mainly from the light source toward the first light-releasing surface; therefore, among light rays that have been incident from the light source, those components in parallel with the flat portions are all reflected by the slanting portions so as to be directed to the object to be illuminated from the first light-releasing surface. With this construction, as compared with conventional constructions having a light-directing body that is formed into a virtually flat-plate shape, the front-illuminating device of the present invention makes it possible to direct those light components proceeding in parallel with the flat portions onto the object to be illuminated without letting them leak outside of the light-directing body. Therefore, it becomes possible to improve the efficiency of use of light in the light source, and consequently to provide a brighter front-illuminating device.

In order to solve the above-mentioned problems, supposing that the above-mentioned light-directing body is a first light-directing body, the front-illuminating device is further provided with a second light-directing body for averaging the luminance distribution of light released from the first light-releasing surface.

In the aforementioned construction, since the first light-directing body is formed into a step shape, the distance from the slanting portions of the second light-releasing surface to the first light-releasing surface becomes smaller in proportion to the distance from the light source. Therefore, the luminance distribution of light released from the first light-releasing surface is sometimes not maintained uniform. The above-mentioned construction, which is further provided with the second light-directing body, makes it possible to average the luminance distribution of light released to the object to be illuminated. As a result, it becomes possible to provide a front-illuminating device which functions as a surface light source without unevenness of luminance.

In order to solve the aforementioned objective, the front-illuminating device is further provided with an optical compensating plate for aligning light-releasing directions of those light rays from the flat portions and those light rays from the slanting portions of the second light-releasing surface.

In the aforementioned construction, since the second light-releasing surface is formed into a step shape in which the flat portions and the slanting portions are alternately placed, light rays, which have been reflected from the object to be illuminated and made incident on the light-directing body from the first light-releasing surface, are released from the flat portions and the slanting portions of the second light-releasing surface in respectively different directions, which might cause blurredness of fogs in the image of the object to be illuminated. For this reason, it becomes possible to obtain a sharper image of the object to be illuminated by providing the optical compensating plate for aligning light-releasing directions of those light rays from the flat portions and those light rays from the slanting portions of the second light-releasing surface.

In order to solve the aforementioned subjects, the front-illuminating device is further provided with a prism sheet, a diffusing plate, etc. which is placed between the light source and the incident surface so as to restrict light from the light source from spreading.

In the aforementioned construction, light from the light source is mainly reflected by the slanting portions of the second light-releasing surface; therefore, in order to reduce light components leaking outside the light-directing body without being totally reflected by the slanting portions, it is preferable to impart a certain degree of directivity to the light from the light source so as to reduce the components that are made incident on the slanting portions at angles smaller than the critical angle. For this reason, the above-mentioned construction, which is provided with a prism sheet, a diffusing plate, etc. for restricting light from the light source from spreading, makes it possible to reduce light leaking from the slanting portions, and also to improve the efficiency of the use of light, thereby preventing blurredness and fogs in the image of the object to be illuminated. Consequently, it is possible to achieve a front-illuminating device that serves as a surface light source capable of providing a bright, sharper image of the object to be illuminated.

In order to solve the aforementioned problems, the reflection-type liquid crystal display of the present invention is provided with a reflection-type liquid crystal element having a reflective plate, and the front-illuminating device having the above-mentioned construction is placed in front of the reflection-type liquid crystal element.

In this construction, in the case when there is a sufficient quantity of ambient light, like outdoors in the day, the apparatus is used with the front-illuminating device turned off. In contrast, in the case when the quantity of ambient light is insufficient, it is used with the front-illuminating device turned on. Thus, it becomes possible to provide a reflection-type liquid crystal display that always realizes bright, high-quality display regardless of environmental conditions.

In order to solve the aforementioned problems, another reflection-type liquid crystal display of the present invention, which is a reflection-type liquid crystal display that has the front-illuminating device having the optical compensating plate in front of the reflection-type liquid crystal element having the reflective plate, is designed so that the optical compensating plate has flexibility responding to a predetermined pressure, and so that a pair of transparent electrodes, which detect a position to which a pressure is given by contacting each other, are respectively installed on the optical compensating plate and the second light-releasing surface.

In this construction, the front-illuminating device serves as a so-called touch panel. In other words, for example, by pressing a certain position on the surface of the optical compensating plate with a pen, etc., the optical compensating plate is distorted so that the pair of transparent electrodes, respectively installed on the optical compensating plate and the second light-releasing surface, are allowed to contact each other at the corresponding position. By recognizing this position as coordinates, it is possible to achieve a reflection-type liquid crystal display that enables a pen input with respect to the contents displayed by the liquid crystal element.

Still another front-illuminating device of the present invention is provided with: a light source; a light-directing body that is placed in front of an liquid crystal element that is an object to be illuminated, the light-directing body having an incident surface on which light from the light source is made incident, a light-releasing surface from which light is released to the liquid crystal element to be illuminated and an opposing face, placed face to face with the light-releasing surface, for releasing light reflected from the liquid crystal element to be illuminated; a periodic structure that is formed on the second light-releasing surface and that includes a transmitting section for transmitting light from the light source and a reflection section for reflecting the light from the light source toward the light-releasing surface that are alternately placed, wherein the periodic structure is formed on the opposing face in such a manner that the periodic structure has an angle in a range of not less than 10° to not more than 75° with respect to a repeating direction of a pixel arrangement formed on the liquid crystal element periodically, when placed in front of the liquid crystal element.

In the above-mentioned arrangement, since the periodic structure and the pixel arrangement is shifted so as not to cause light interference, it is possible to prevent the occurrence of Moire fringes, etc. due to light interference between the periodic structure and the pixel arrangement, and consequently to improve the display quality of images.

In order to solve the above-mentioned problem, the above-mentioned front-illuminating device has an arrangement in which the transmitting section has a width smaller than that of the reflection section in the periodic structure.

In this arrangement, the observer is allowed to view images mainly on the transmitting section so that the release of light from the reflection section is reduced. As a result, it becomes possible to prevent double images.

In order to solve the above-mentioned problem, the above-mentioned front-illuminating device has a light-shielding means which prevents light transmitted through the light-directing body from being released from the opposing face, and which is placed on a portion of the light-directing body that corresponds to the reflection section on the opposing face.

The above-mentioned arrangement makes it possible to prevent the release of light from the reflection section more positively, and consequently to prevent double images more efficiently. Moreover, the application of the low reflection treatment to the surface of the light-shielding means makes it possible to reduce the occurrence of reflection of external light, and consequently to improve the display quality of images.

In order to solve the above-mentioned problem, another reflection-type liquid crystal display is provided with a reflection-type liquid crystal element having a reflective plate, wherein the front-illuminating device having the above-mentioned arrangement is installed in front of the reflection-type liquid crystal element.

The above-mentioned arrangement makes it possible to prevent the occurrence of Moire fringes, etc. due to interference between the periodic structure and the pixel arrangement, and consequently to prevent double images. As a result, it becomes possible to further improve the display quality of the reflection-type LCD. In addition, in the above-mentioned arrangement, since the front-illuminating means is formed by one sheet of a light-directing body, it is possible to obtain a thin, light-weight illuminating means, and also to prevent the occurrence of Newton rings in the resulting images.

For a fuller understanding of the nature and advantages of the invention, reference should be made to the ensuing detailed description taken in conjunction with the accompanying drawings.

BRIEF DESCRIPTION OF THE DRAWINGS

FIGS. 2(a), 2(b) and 2(c) show a shape of a light-directing body of a front light that is installed in the reflection-type LCD of in FIG. 1: FIG. 2(a) is a plan view in which the light-directing body is viewed in a normal direction of flat portions from above; FIG. 2(b) is a side view in which the light-directing body is viewed in the normal direction of the incident surface; and FIG. 2(c) is a cross-sectional view in which the light-directing body is sliced with a cross section whose normal line corresponds to the length direction of a light source.

FIG. 4 is an explanatory drawing that shows behaviors of light reflected by a reflective plate of the reflection-type LCD.

FIG. 9(*b*), given for comparative purposes, is a cross-sectional view that indicates that in the front light installed in the reflection-type LCD shown in FIG. 1, the distances from the slanting portions to the face forming the light-releasing surface of the front light are not uniform.

FIGS. 11(*a*) and 11(*b*) are graphs that respectively show the results of measurements of the luminance distributions of illuminating light by the front lights respectively shown in FIGS. 9(*a*) and 9(*b*).

FIG. 15 is an explanatory drawing that shows a principle of how blurredness and fogs occur in the image in the reflection-type LCD in accordance with still another embodiment of the present invention.

FIG. 22(*a*) is a cross-sectional view of the reflection-type LCD, and FIGS. 22(*b*) and 22(*c*) are cross-sectional views that respectively show structural examples of the optical compensating plate of the reflection-type LCD.

FIG. 38(*a*) is a plan view in which the light-directing body is viewed in a normal direction of the flat portions from above; FIG. 38(*b*) is a side view in which the light-directing body is viewed in the normal direction of the incident surface; and FIG. 38(*c*) is a cross-sectional view in which the light-directing body is sliced with a cross section whose normal line corresponds to the length direction of a light source.

FIGS. 40(*a*) and 40(*b*) are explanatory drawings that respectively show behaviors of light from the light source inside the light-directing body.

FIGS. 50(a) and 50(b) are graphs that indicate the luminance distribution and the results of measurements of illuminating light between the front light installed in the reflection-type LCD of FIG. 49 and a conventional front light.

FIG. 51 is a cross-sectional view that shows a schematic construction of a conventional reflection-type LCD with an auxiliary light as well as behaviors of light in this reflection-type LCD.

FIG. 54(a) shows a black display state, and FIG. 54(b) shows a white display state.

DESCRIPTION OF THE EMBODIMENTS

Embodiment 1

Referring to Figures, the following description will discuss one embodiment of the present invention.

Figure 1:
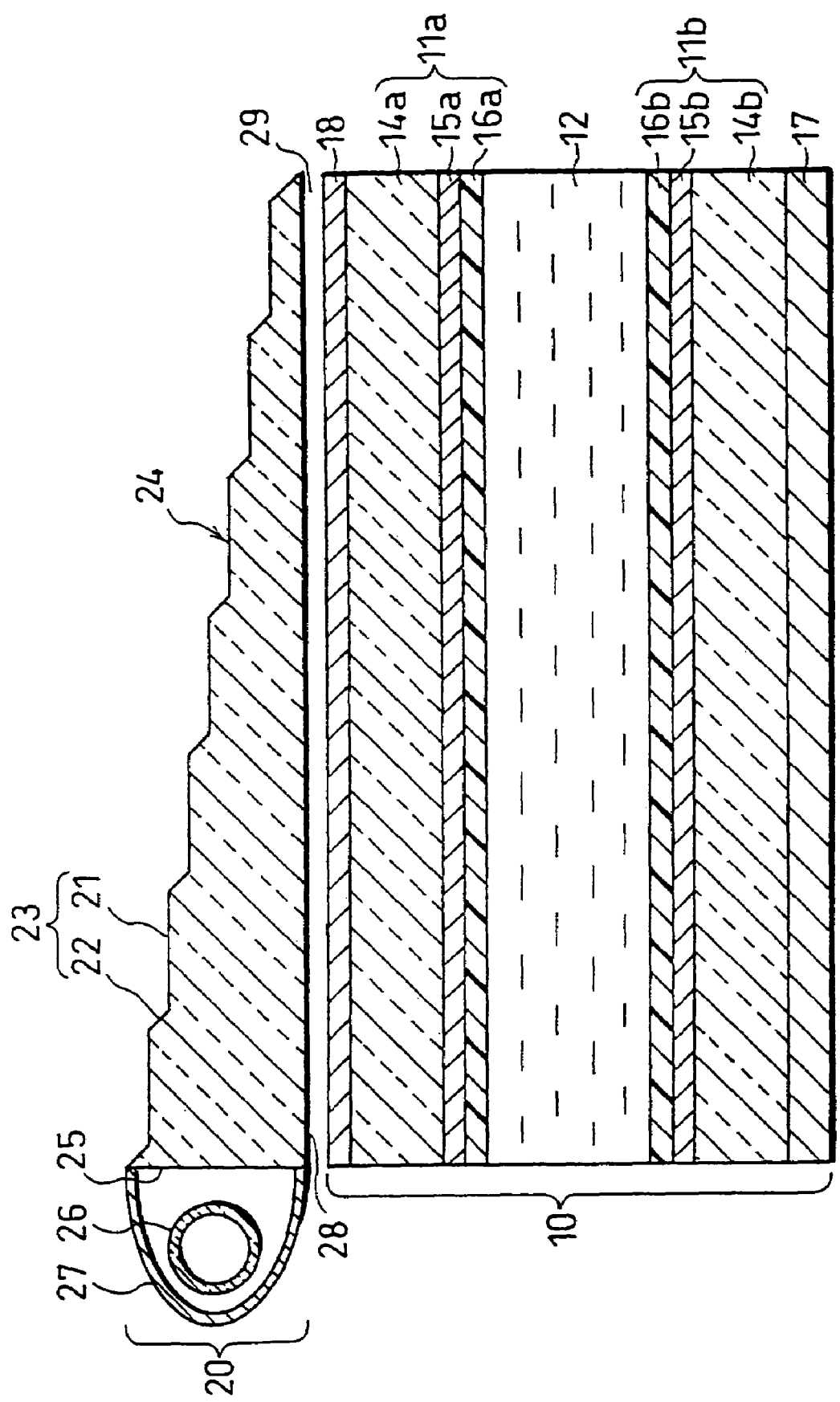
FIG. 1 is a cross-sectional view that shows a construction of a reflection-type LCD in accordance with one embodiment of the present invention.

As illustrated in FIG. 1, the reflection-type LCD of the present embodiment is provided with a front light 20 (a front-illuminating device) placed in front of a reflection-type liquid crystal cell 10 (a reflection-type liquid crystal element).

The front light 20 is mainly constituted by a light source 26 and a light-directing body 24. The light source 26, which is a line-shaped light source such as, for example, a fluorescent tube, is placed along the side face (incident surface 25) of the light-directing body 24. The light-directing body 24 is designed so that its interface 28 (a first light-releasing surface) on the liquid crystal cell 10 side has a flat shape. Its interface 23 (a second light-releasing surface), which faces the interface 28 in the light-directing body 24, is, on the other hand, designed so that flat portions 21, which are formed parallel to or virtually parallel to the interface 28, and slanting portions 22, which are inclined with a constant angle in the same direction to the flat portions 21, are alternately placed. In other words, as clearly shown by FIG. 1, the light-directing body 24 is formed into a step shape that lowers as the distance from the light source 26 increases in a cross-section whose normal corresponds to the length direction of the light source 26.

The slanting portions 22 mainly function as faces for reflecting light from the light source 26 toward the interface 28. The flat portions 21, on the other hand, mainly function as faces which, when illuminating light from the front light 20 has returned as reflected light from the liquid crystal cell 10, transmit the reflected light toward the observer.

Referring to FIGS. 2(a) through 2(c), an explanation will be given of the shape of the light-directing body 24 in more detail. FIG. 2(a) is a plan view in which the light-directing body 24 is viewed in the normal direction of the flat portions 21 from above, FIG. 2(b) is a side view in which the light-directing body 24 is viewed in the normal direction of the incident surface 25, and FIG. 2(c) is a cross-sectional view in which the light-directing body 24 is sliced by a face perpendicular to both the incident surface 25 and the interface 28.

The light-directing body 24 is formed by injection molding using, for example, PMMA (polymethylmethacrylate). The light-directing body 24 in the present embodiment is set to have dimensions of: the width W=110.0 mm, the length L=80.0 mm, the thickness $h_1$ of the incident surface 25 portion=2.0 mm, and the width $w_1$ of the flat portions 21=1.9 mm. Further, the width $w_2$ of the slanting portions 22 is approximately 87 μm by providing the following dimensions: the step gap $h_2$ of the slanting portions=50 μm and the angle of inclination α of the slanting portions 22 with respect to the flat portions 21=30°.

Since the light-directing body 24 is formed into a step shape, the front light 20 have the following advantages: First, as illustrated in FIG. 2(b), when the flat portions 21, viewed in the normal direction of the incident surface 25, are formed completely in parallel with the interface 28, these flat portions 21 are not visualized and only the slanting portions 22 are visualized. In other words, the sum of projections of the slanting portions 22 onto the incident surface 25 equals the incident surface 25.

In this case, among light components from the light source that have been made incident on the incident surface 25, those components perpendicular to the incident surface 25 are all directly made incident on the slanting portions 22, and reflected toward the interface 28. With this arrangement, different from the aforementioned conventional front-light system, it is possible to avoid the problem in which a large quantity of light is released out of the light-directing body from the surface facing the incident surface. In other words, since the light-directing body 24 having a step shape is provided, the front light 20 is improved to a great degree in the efficiency of the use of light as compared with a conventional construction.

Next, an explanation will be given of the construction of the liquid crystal cell 10 and its manufacturing method.

As illustrated in FIG. 1, the liquid crystal cell 10 is basically constituted by a pair of electrode substrates 11a and 11b and a liquid crystal layer 12 that is sandwiched therebetween. The electrode substrate 11a is made by placing a transparent electrode 15a (a scanning line) on a glass substrate 14a with a light-transmitting property and forming a liquid crystal alignment film 16a so as to cover the transparent electrode 15a.

The glass substrate 14a is provided by using, for example, a glass substrate (Brand Name: 7059) made by Corning Inc. The transparent electrode 15a is made from, for example, ITO (Indium Tin Oxide). The liquid crystal alignment film 16a is formed by applying, for example, an alignment-film material (Brand Name: AL-4552) made by Japan Synthetic Rubber Co., Ltd. onto the glass substrate 14a having the transparent electrode 15a formed thereon by means of a spin coater and carrying out a rubbing treatment as an aligning process.

The electrode substrate 11b is also formed by successively stacking the glass substrate 14b, the transparent electrode 15b and the liquid crystal alignment film 16b in the same manner as the electrode substrate 11a. Additionally, an insulating film, etc. may be formed on the electrode substrates 11a and 11b, if necessary.

The electrode substrates 11a and 11b are arranged so that the liquid crystal alignment films 16a and 16b are placed face to face with each other, with the directions of the rubbing treatment in parallel with each other in the reversed manner (so-called antiparallel), and joined by using a bonding agent. In this case, a space is formed between the electrode substrates 11a and 11b with a uniform gap by preliminarily scattering glass-beads spacers (not shown) having a particle diameter of 4.5 μm.

The liquid crystal layer 12 is formed by injecting liquid crystal into this space by means of vacuum deaeration. Here, with respect to the material of the liquid crystal layer 12, for example, a liquid crystal material (Brand Name: ZLI-3926) made by Merck & Co., Inc. may be used. This liquid crystal material has a Δn of 0.2030. However, not limited to this liquid crystal material, various liquid crystal materials may be adopted.

Further, an aluminum plate, which has been subjected to a hair-line process, is joined to the outer surface of the glass substrate 14b as a reflective plate 17 by using a bonding agent such as an epoxy agent. Moreover, a polarizing plate 18 whose polarizing axis is set at 45° with respect to the orientation direction of the liquid crystal of the liquid crystal layer 12 is placed on the outer surface of the glass substrate 14a.

The reflection-type liquid crystal cell 10 is manufactured through the above-mentioned processes. A reflection-type LCD with a front-illuminating device attached thereto is manufactured by combining the liquid crystal cell 10 with the front light 20 as will be described below. First, a light-directing body 24 is stacked on the polarizing plate 18 of the liquid crystal cell 10. Here, spacers with a particle-diameter of 50 μm (not shown) are preliminarily scattered between the polarizing plate 18 of the liquid crystal cell 10 and the light-directing body 24. Thus, a space 29 is formed with a uniform thickness that is virtually equal to the particle-diameter of the spacers. In other words, the interface 28 of the light-directing body 24 is optically equivalent to an interface between PMMA and an air layer. Here, since the space 29 has a thickness of approximate 100 fold of light wavelength, occurrences of phenomena, such as interference, due to the space 29 are suppressed.

Next, a fluorescent tube is placed face to face with the incident surface 25 of the light-directing body 24 as a light source 26, and the light source 26 and the incident surface 25 are surrounded by a reflection mirror 27 (light-converging means). The reflection mirror 27 is used for converging light from the light source 26 only onto the incident surface 25. Here, with respect to the reflection mirror 27, for example, aluminum tape may be used. Through the above-mentioned processes, a reflection-type LCD with the front light 20 attached as an auxiliary illuminating device is completed.

Upon insufficient ambient light, the reflection-type LCD is used in the lighting mode with the front light 20 turned on, while with sufficient ambient light, it is used in the reflection mode with the front light 20 turned off.

Figure 3A:
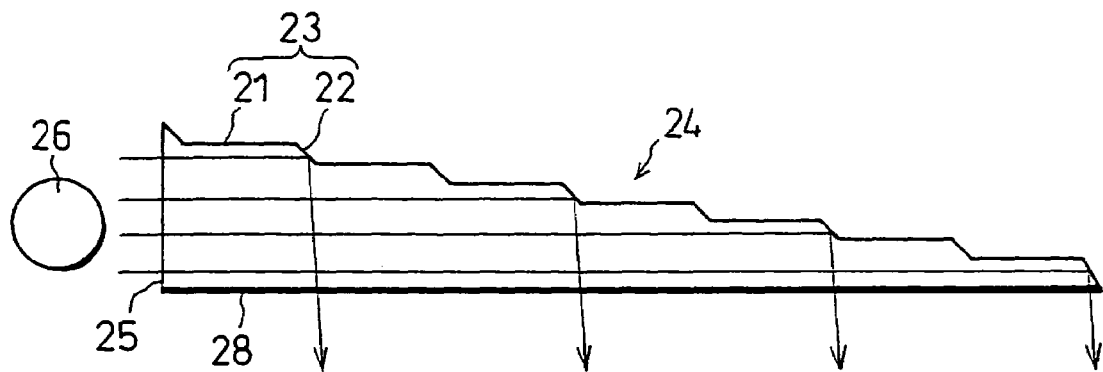
FIGS. 3(a), 3(b) and 3(c) are explanatory drawings that respectively show behaviors of light from the light source inside the light-directing body.
Figure 3B:
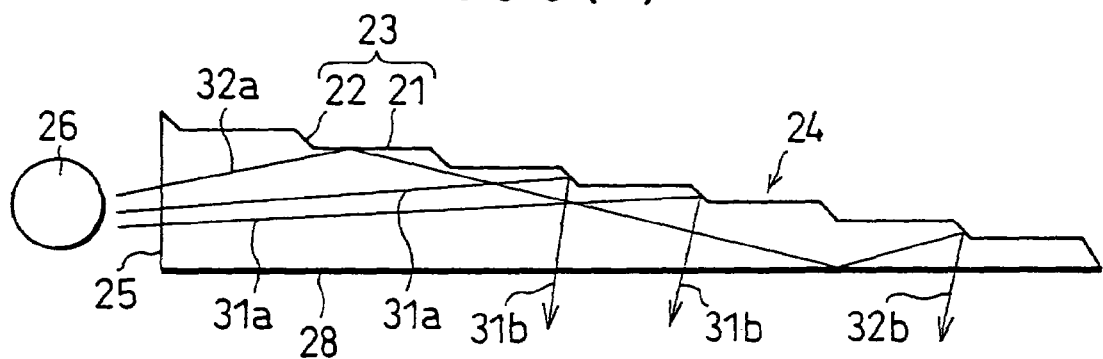
Figure 3C:
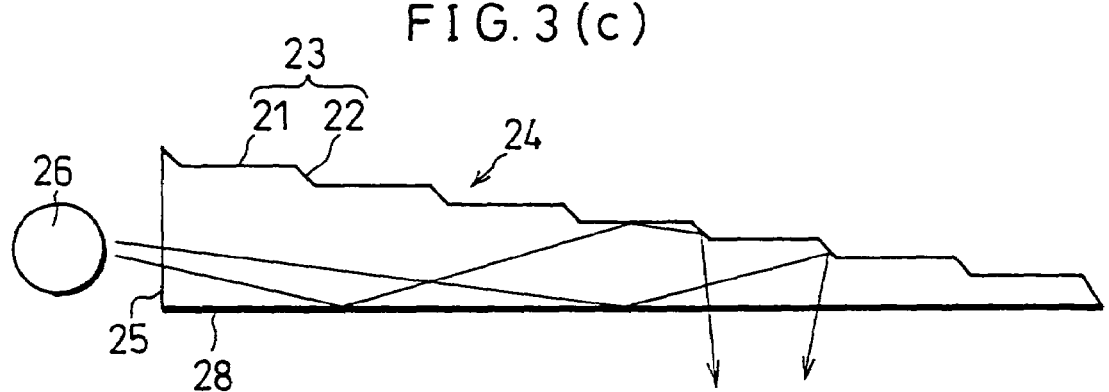

Referring to FIGS. 3(a) through 3(c), an explanation will be given of the operational principle of the front light 20.

As described earlier, in the light-directing body 24, the sum of projections of the slanting portions 22 onto the incident surface 25 is equal to the incident surface 25. For this reason, among incident light components from the light source 26, those components perpendicular to the incident surface 25 are reflected by the slanting portions 22 as shown in FIG. 3(a), and released from the interface 28 toward the liquid crystal cell 10, not shown in FIG. 3(a).

Further, as illustrated in FIG. 3(b), among incident light components from the light source 26, those components that are made incident on the interface 23 are divided into two groups depending on behaviors inside the light-directing body 24. As indicated by a light ray 31a shown in FIG. 3(b), one group of light components are directly made incident on the slanting portions 22 and reflected therefrom, thereby forming output light 31b to the liquid crystal cell 10. As indicated by a light ray 32a shown in FIG. 3(b), the other group of light components are allowed to proceed inside the light-directing body 24 while totally reflected between the flat portions 21 and the interface 28, and eventually reach the slanting portions 22 from which they are reflected to also form output light 32b.

Moreover, as illustrated in FIG. 3(c), among incident light components from the light source 26, those components that are first made incident on the interface 28 are allowed to proceed inside the light-directing body 24, while totally reflected between the interface 28 and the flat portions 21 of the interface 23, and eventually reach the slanting portions 22 from which they are reflected and released toward the liquid crystal cell 10 from the interface 28.

As explained above, almost all components of the incident light from the light source 26 to the light-directing body 24 are reflected by the slanting portions 22, and released toward the liquid crystal cell 10 through the interface 28. In other words, since the light-directing body 24 having the step-shaped interface 23 is installed, the front light 20 of the present embodiment makes it possible to minimize loss of light from the light source 26, and consequently to improve the efficiency of use of the light-source light.

Next, explanations will be given of conditions 1 through 3 of the slanting portions 22 or the flat portions 21 required so as to further improve the efficiency of use of the light-source light.

1. Concerning the Slanting Portions 22

In the light-directing body 24, the slanting portions 22 of the interface 23 mainly function as a reflection surface for reflecting incident light from the light source 26. The flat portions 21 of the interface 23, on the other hand, mainly function as a transmitting surface that transmits light reflected by the reflective plate 17 that has been installed on the back surface of the liquid crystal cell 10 as well as ambient light.

The following conditions must be satisfied in order to allow the incident light from the light source 26 to be totally reflected by the slanting portions 22. In other words, light which is made incident on a surface (an interface) at which substances having different refractive indexes is totally reflected by the interface when the incident angle is not less than the critical angle. For this reason, in order to allow the incident light onto the slanting portions 22 to be totally reflected by the slanting portions 22, the incident angle $\theta_1$ onto the slanting portions 22 is set to satisfy the following equation:

$$\theta_1 \geq \theta_C = \arcsin(n_2/n_1) \quad \text{(equation 2)}$$

where:

$\theta_1$ is an incident angle onto the slanting portions 22, $n_1$ is the refractive index of the light-directing body 24, $n_2$ is the refractive index of the substance that contact the light-directing body 24 at the slanting portions 22, and $\theta_C$ is the critical angle of the slanting portions.

As described above, when the slanting portions 22 are formed so that the incident angle $\theta_1$ of light onto the slanting portions 22 satisfies equation 2, it becomes possible to suppress the light from leaking out of the light-directing body 24 from the slanting portions 22, and consequently to further improve the efficiency of use of light.

2. Concerning the Flat Portions 21

The flat portions 21, which is a region mainly transmits light as described earlier, allows the following lights to transmit therethrough:

(1) light reflected from the liquid crystal cell 10, and (2) ambient light in the case of the reflection mode.

The above-mentioned output light (1), which has been adjusted by the liquid crystal layer 12 in the liquid crystal cell 10, is again made incident on the light-directing body 24 after having been reflected by the reflective plate 17, and then released toward the observer from the interface 23; and in this case, it is released mainly from the flat portions 21. Here, the light reflected by the reflective plate 17 forms diffused light. The diffused light, if rarely reflected by the flat portions 21, is preferably made incident on the flat portions 21 with an angle not more than the critical angle. Although it changes depending on the refractive index of the light-directing body 24, the critical angle is approximately 42° when PMMA is used as the material of the light-directing body 24. In other words, the output light from the liquid crystal cell 10 is preferably made incident on the flat portions 21 of the light-directing body 24 with an approximate angle of not more than 40°.

Moreover, it is not necessary for the flat portions 21 to be set in parallel with the interface 28. The incident angle onto the flat portions 21 is also dependent on the range of light diffusion on the reflective plate 17. For this reason, as illustrated in FIG. 4, in the case when consideration is also given to the characteristic of the reflective plate 17, supposing that the main range in which the light diffuses on the reflective plate 17 is within ±30° with respect to the normal to the reflective plate 17, light components 33 that are to be reflected by the flat portions 21 are greatly minimized when the angle of inclination δ of the flat portions 21 with respect to the reflective plate 17 is set within approximately ±10°. Additionally, in FIG. 4, the angle of inclination δ is made somewhat larger than the above-mentioned preferable range so as to make it clear that the flat portions 21 are inclined with respect to the interface 28.

As described above, if the flat portions 21 are formed in parallel with the interface 28 or with an inclination within ±10°, light from the light source 26 is made incident on the flat portions 21 with an incident angle larger than the incident angle onto the slanting portions 22. For this reason, the light that has been made incident on the flat portions 21 from the light source 26 hardly leaks outside, thereby increasing the quantity of light that is to be reflected by the flat portions 21. Thus, it becomes possible to suppress loss of the light-source light.

Furthermore, consideration is given to the case in which the present reflection-type LCD is used in the reflection mode with the front light 20 turned off. In this case, when ambient light (2) is taken into consideration in the reflection mode, the greater the area of the flat portions 21, the better so as to take sufficient ambient light into the liquid crystal cell 10.

3. Concerning the Layout of the Slanting Portions 22 and the Flat Portions 21 in the Interface 23

With respect to the layout of the slanting portions 22 and the flat portions 21 in the interface 23, the following two conditions are essential:

(a) The area of the slanting portions 22 is relatively small, while the area of the flat portions 21 is relatively large, when the reflection-type LCD is viewed by the user from the interface 23 side, and (b) the sum of projections of the slanting portions 22 onto the incident surface 25 is relatively large, while the sum of projections of the flat portions 21 is relatively small.

The condition (a), as it is, means that the sum of projections of the flat portions 21 onto the interface 28 is greater than the sum of projections of the slanting portions 22. The size of projections of the slanting portions 22 onto the interface 28 is determined by the angle of inclination α of the slanting portions 22 to the interface 28 as shown in FIG. 2(c). Therefore, by adjusting the size of the angle of inclination α, the area of the slanting portions 22, viewed from the user, can be greatly minimized as compared with the area of the flat portions 21.

Moreover, by making the pitches of the slanting portions 22 and the flat portions 21 coincide with positions lacking scanning lines or bus-lines in the liquid crystal cell 10, the flat portions 21 can be placed over the entire area on which display is actually made in the liquid crystal cell 10, thereby making it possible to further improve the efficiency of use of light.

The above-mentioned condition (b) conforms to the aforementioned fact that in order to effectively utilize incident light from the light source 26, it is preferable to allow only the slanting portions 22 in the interface 23 to be visualized when viewed in the normal direction of the incident surface 25.

Figure 5:
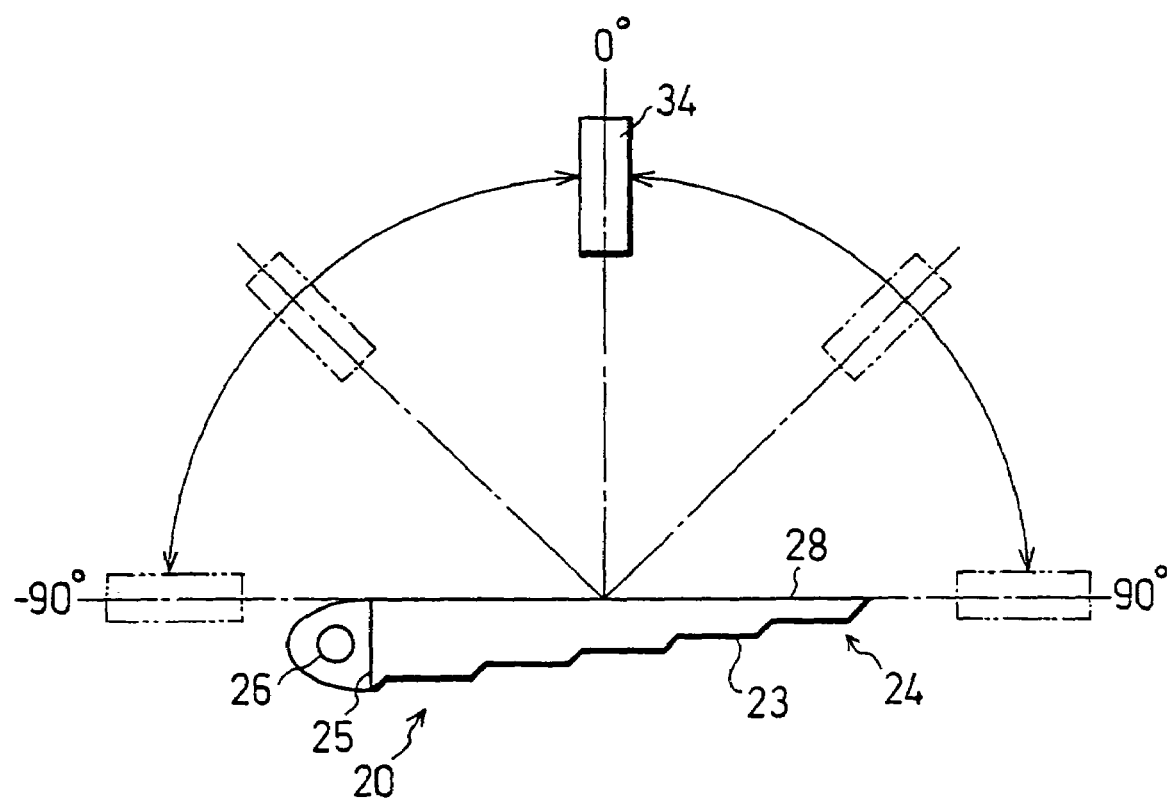
FIG. 5 is an explanatory drawing of a measuring system for measuring the light intensity of the front light shown in FIGS. 2(a) through 2(c).

Next, an explanation will be given of the results of measurements on the intensity of illuminating light of the front light 20. A measuring system, as shown in FIG. 5, was used to measure the intensity of illuminating light of the front light 20. In other words, supposing the normal direction to the interface 28 of the front light 20 is 0°, the intensity of light ranging from 0° to ±90° was measured by a detector 34.

Figure 6:
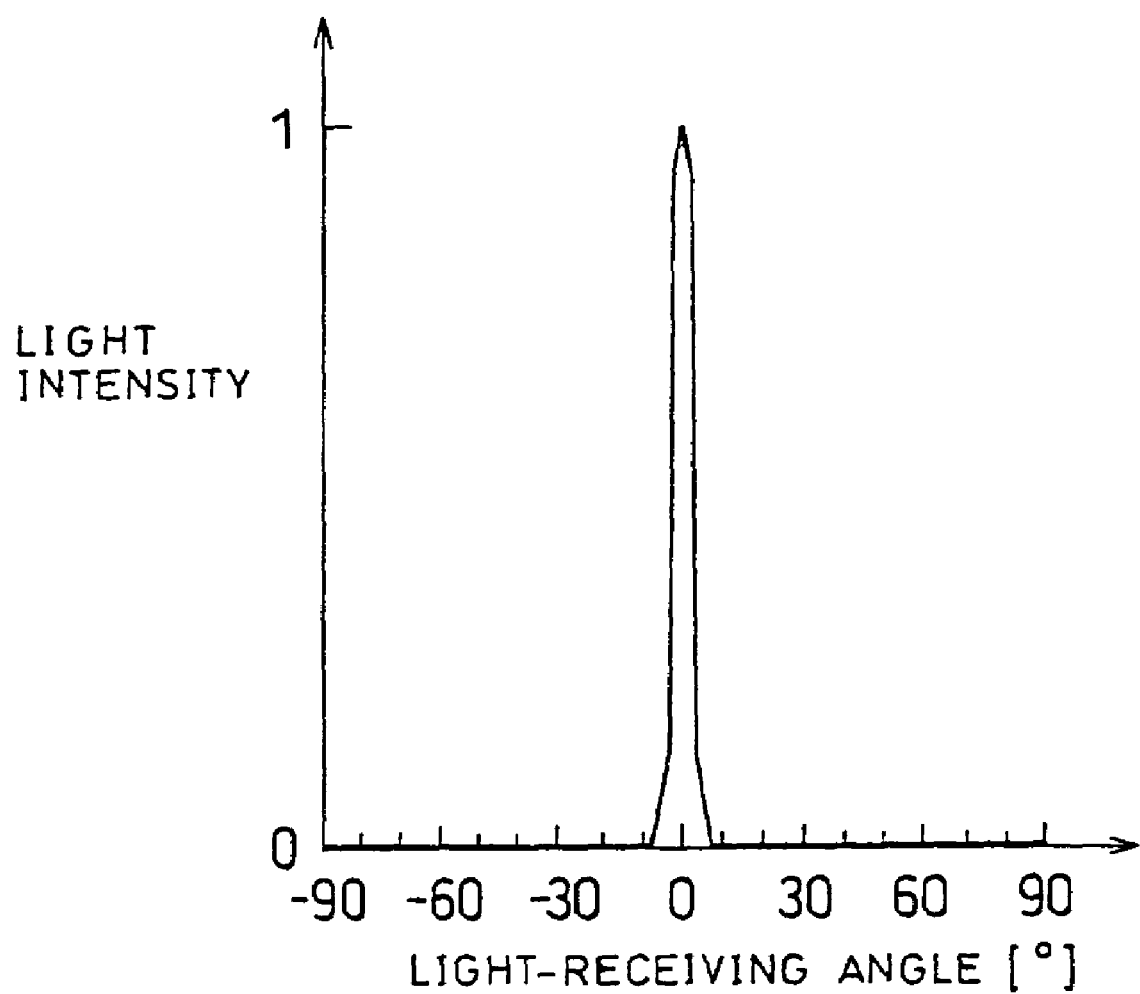
FIG. 6 is a graph showing the results of the measurements of the light intensity of the front light shown in FIGS. 2(*a*) through 2(*c*).

FIG. 6 shows the results of the measurements. FIG. 6 clearly shows that in the front light 20, light which was made incident on the light-directing body 24 through the incident surface 25 from the light source 26 was released virtually in the normal direction of the interface 28 by the function of the light-directing body 24. In other words, the front light 20 allows the light from the light source 26 placed on a side face of the light-directing body 24 to be made incident on the liquid crystal cell 10 virtually perpendicularly, thereby functioning as a bright auxiliary illuminating device.

Moreover, the reflection-type LCD of the present embodiment has the advantage of brighter display as compared with light-transmission-type LCDs and self-light-emitting type displays such as CRTs and PDPs.

Figure 7A:
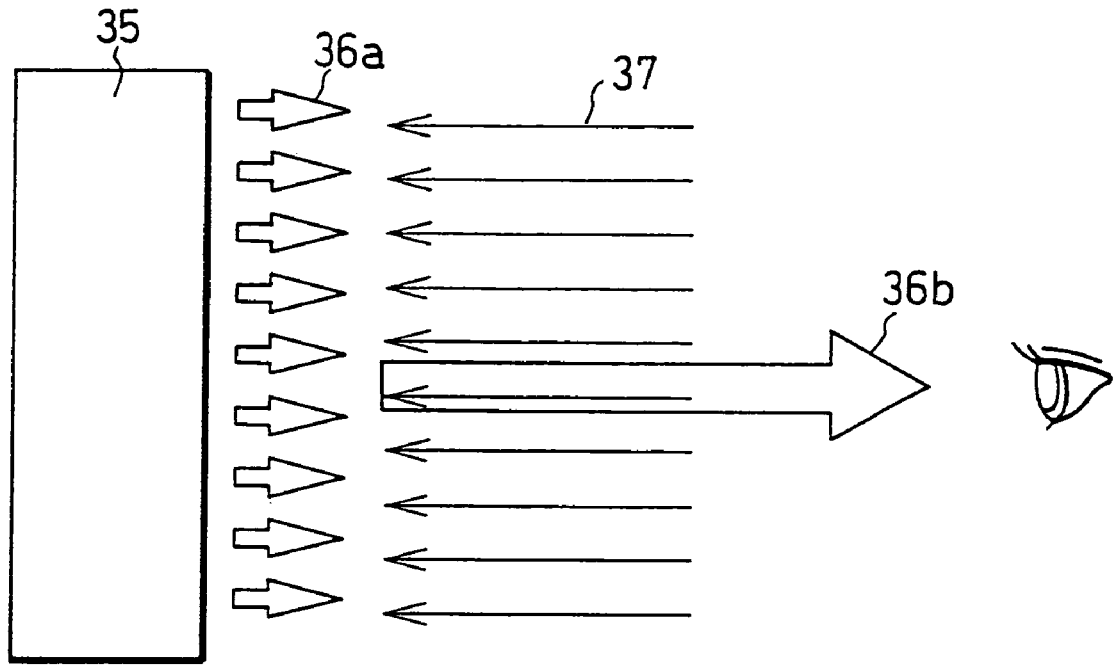
FIG. 7(*a*) is an explanatory drawing that shows the relationship between light released from a light-emitting-type display and ambient light, and FIG. 7(*b*) is an explanatory drawing that shows the relationship between light released from the reflection-type LCD of FIG. 1 and ambient light.

More specifically, as illustrated in FIG. 7(a), light components 36a, released from a self-light-emitting type display 35, are reversed to ambient light 37 in their proceeding directions. For this reason, only components 36b, obtained by subtracting the ambient light 37 from the light components 36a, are recognized by the observer.

Figure 7B:
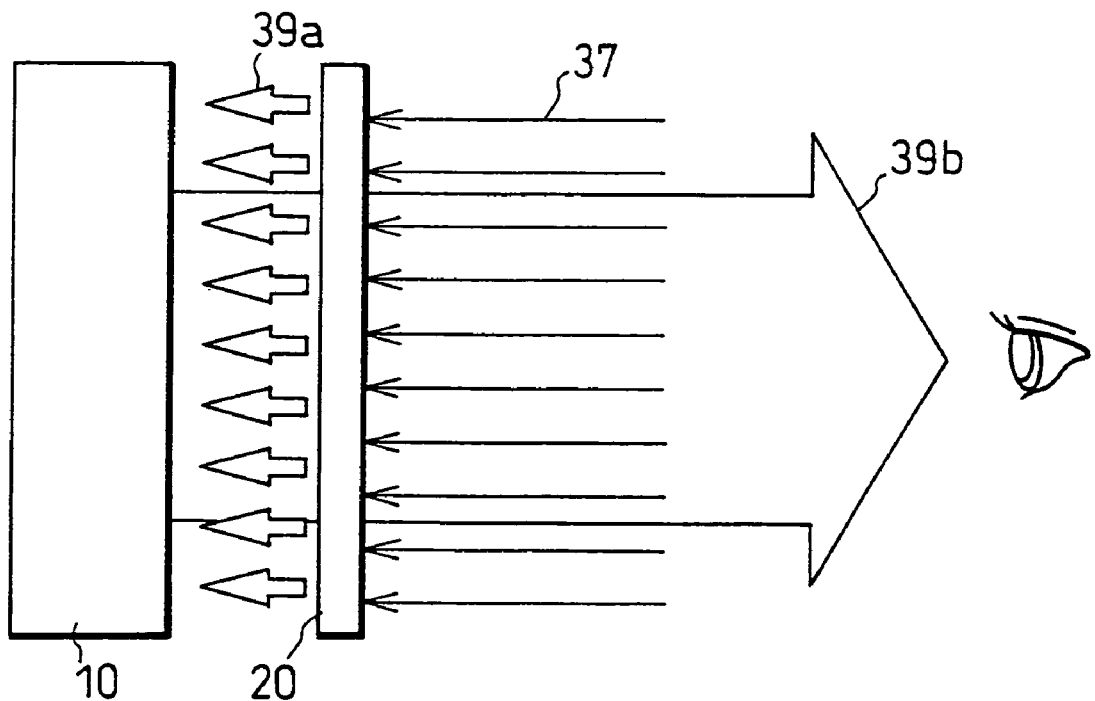

In contrast, as illustrated in FIG. 7(b), in the reflection-type LCD of the present embodiment when used in the lighting mode, auxiliary light components 39a from the front light 20 and ambient light 37 are reflected by the reflective plate (not shown) of the liquid crystal cell 10 so that components 39b corresponding to the sum of the auxiliary light components 39a and the ambient light 37 are recognized by the observer. Consequently, not only in dark places but also in bright places like, for example, outdoors in the day, it is possible to achieve brighter display.

As described above, the construction of the present embodiment, which is provided with the front light 20 having the step-shaped light-directing body 24, makes it possible to improve the efficiency of the use of light released from the light source 26. Therefore, even in the case of insufficient ambient light, it is possible to supply sufficient illuminating light to the liquid crystal cell 10, and consequently to achieve a reflection-type LCD which always provide bright display regardless of environmental conditions.

As described above, the front-illuminating device of the present invention is provided with: a light source and a light-directing body that is placed in front of an object to be illuminated, the light-directing body having an incident surface on which light from the light source is made incident, a first light-releasing surface from which light is released to the object to be illuminated and a second light-releasing surface, placed face to face with the first light-releasing surface, for releasing light reflected from the object to be illuminated, wherein the second light-releasing surface is formed into a step shape in which slanting portions for reflecting light mainly from the light source toward the first light-releasing surface and flat portions for transmitting light reflected mainly from the object to be illuminated are alternately placed.

Therefore, in the above-mentioned construction, illuminating light is released from the first light-releasing surface to the object to be illuminated, and light reflected from the object to be illuminated is again returned to the inside of the light-directing body from the first light-releasing surface, and then allowed to pass through the flat portions of the second light-releasing surface to reach the observer. In the light-directing body of the above-mentioned construction, the second light-releasing surface, which faces the first light-releasing surface, is formed into a step shape in which slanting portions and flat portions are alternately placed and the slanting portions, each of which is located between the flat portions, reflect light mainly from the light source toward the first light-releasing surface; therefore, among light rays that have been made incident from the light source, those components in parallel with the flat portions are all reflected by the slanting portions so as to be directed to the object to be illuminated from the first light-releasing surface. With this construction, as compared with conventional constructions having a light-directing body that is formed into a virtually flat-plate shape, the front-illuminating device of the present invention makes it possible to direct those light components proceeding in parallel with the flat portions onto the object to be illuminated without letting them leak outside of the light-directing body. Therefore, it becomes possible to improve the efficiency of use of light in the light source, and consequently to provide a brighter front-illuminating device.

Moreover, the above-mentioned construction is also represented as follows: In the front-illuminating device that has a light source and a light-directing body and that is placed in front of an object to be illuminated in use, the light-directing body has a flat bottom surface, a surface facing the bottom surface and an incident surface on which light from the light source is made incident, and the surface is formed into a step shape in which flat portions that are virtually parallel to the bottom surface and slanting portions that are inclined in the same direction to the flat sections are alternately placed.

In the above-mentioned construction of the front-illuminating device of the present invention, the incident surface is located on a side face of the light-directing body. Therefore, the resulting advantage is that since light is made incident on the side face of the light-directing body, the light source is not directly viewed by the observer. This prevents the light directly released from the light source from adversely affecting the image of the object to be illuminated, thereby achieving a front-illuminating device that provides sharp images of the object to be illuminated.

In the above-mentioned construction, the front-illuminating device of the present invention is designed so that the sum of projections of the slanting portions onto a flat surface perpendicular to the first light-releasing surface is virtually equal to the projection of the incident surface onto the flat surface. Therefore, among light rays that have been made incident on the incident surface of the light-directing body, those components that are parallel to the first incident surface are all made incident on the slanting portions, and reflected toward the first light-releasing surface. This construction further improves the efficiency of the use of the light-source light, thereby making it possible to provide a brighter front-illuminating device.

In the above-mentioned construction, the front-illuminating device of the present invention may be further provided with a light-converging means that allows light from the light source to be made incident only on the incident surface. Since this construction further minimizes loss of light-source light, it becomes possible to further improve the efficiency of the use of the light-source light, and consequently achieve a front-illuminating device that functions as a brighter surface light source.

In the above-mentioned construction, the front-illuminating device of the present invention is designed so that the sum of projections of the slanting portions onto the first light-releasing surface is smaller in area than the sum of projections of the flat portions onto the first light-releasing surface. Since reflected light from the object to be illuminated that has been made incident on the first light-releasing surface is released toward the observer through the flat portions on the second light-releasing surface, it is more preferable to determine so that the sum of projections of the slanting portions is made smaller than the sum of projections of the flat portions, in order to obtain brighter, sharper images. For this reason, this construction increases an apparent area of the flat portions that mainly contributes to image display for the object to be illuminated. As a result, it becomes possible to achieve a front-illuminating device which provide brighter, sharper images.

In the above-mentioned construction, the front-illuminating device of the present invention is designed so that the flat portions are set in parallel with the first light-releasing surface, or set to have an angle of inclination of not more than 10° with respect to the first light-releasing surface. In particular, when effects on the display quality of the image of the object to be illuminated are taken into consideration, it is preferable to set the angle of inclination of the flat portions on the second light-releasing surface in the range of 0 to 10° with respect to the first light-releasing surface.

In the above-mentioned construction, the front-illuminating device of the present invention satisfies the aforementioned equation 2. This is because it is preferable that light from the light source that has been made incident on the slanting portions on the second light-releasing surface is totally reflected by the slanting portions, and if the incident angle $\theta_1$ onto the slanting portions satisfies the above-mentioned conditions, the incident light onto the slanting portions are totally reflected. This makes it possible to prevent the light from the light source from leaking toward the observer through the slanting portions, thereby further improving the efficiency of use of light. As a result, it becomes possible to achieve a front-illuminating device that functions as a bright surface light source.

The reflection-type liquid crystal display of the present invention is further provided with a reflection-type liquid crystal element having a reflective plate, and the front-illuminating device having the above-mentioned construction is placed in front of the reflection-type liquid crystal element.

With this construction, in the case when there is a sufficient quantity of ambient light, like outdoors in the day, the apparatus is used with the front-illuminating device turned off. In contrast, in the case when the quantity of ambient light is insufficient, it is used with the front-illuminating device turned on. Thus, it becomes possible to provide a reflection-type liquid crystal display that always realizes bright, high-quality display regardless of environmental conditions.

Moreover, in the above-mentioned construction, the reflection-type liquid crystal display of the present invention is preferably designed so that the reflection-type liquid crystal element has scanning lines, and so that the pitch of the scanning lines and the pitch of the flat portions on the second light-releasing surface of the front-illuminating device are set virtually equal, the flat portions being placed above the scanning lines. This makes it possible to place the flat portions on pixel areas on which display is actually made in the liquid crystal element. As a result, since light reflected from the pixel areas is made incident on the flat portions without loss, it becomes possible to further improve the efficiency of use of light, and consequently to provide a reflection-type liquid crystal display that achieves high-quality display.

Embodiment 2

Referring to Figures, the following description will discuss another embodiment of the present invention. Here, those members that have the same functions and that are described in Embodiment 1 are indicated by the same reference numerals and the description thereof is omitted.

Figure 8:
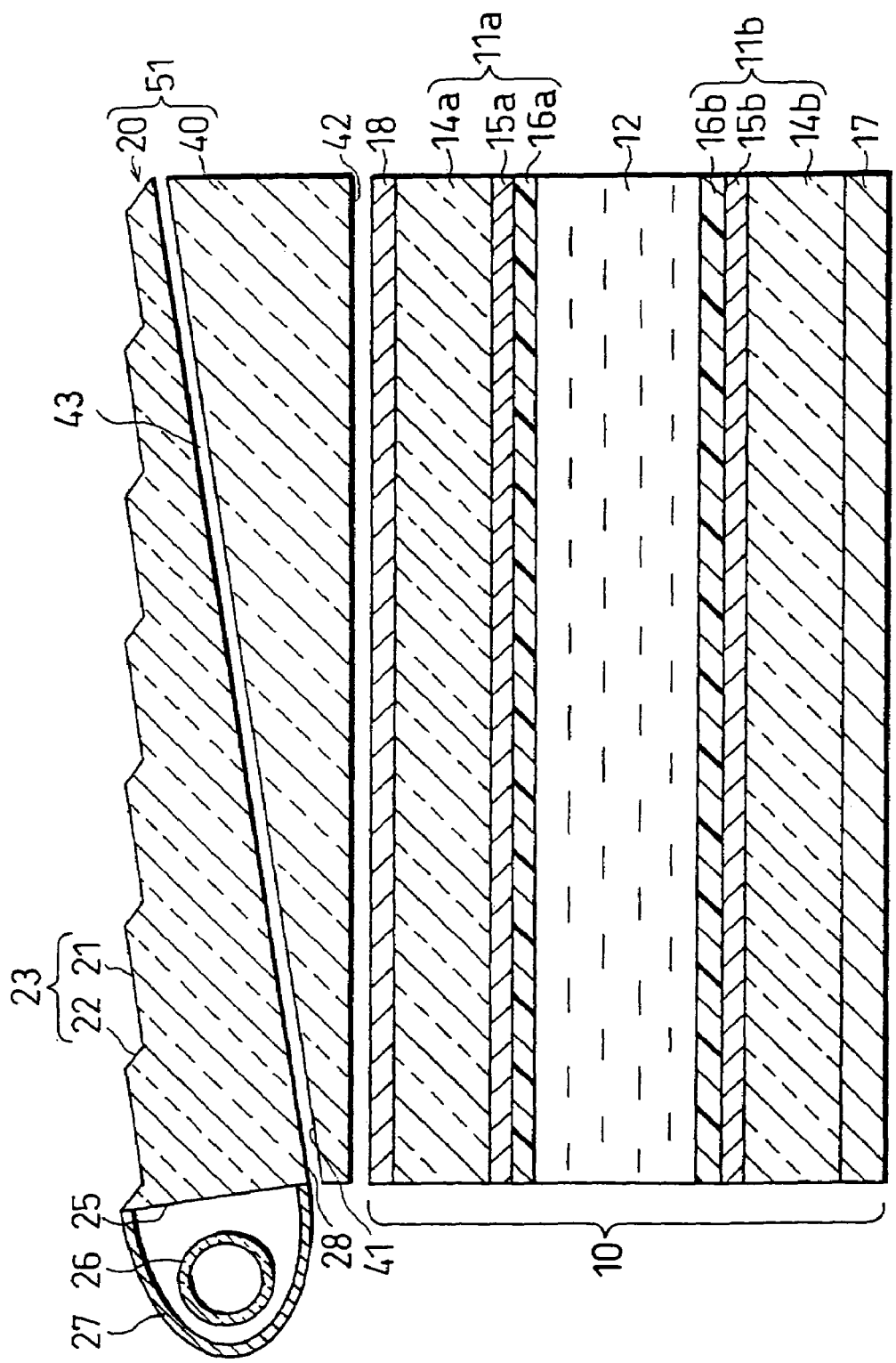
FIG. 8 is a cross-sectional view that shows a construction of a reflection-type LCD in accordance with another embodiment of the present invention.

As illustrated in FIG. 8, the reflection-type LCD in accordance with the present embodiment is characterized in that a front-light system 51, constituted by the front light 20 (the first light-directing body) described in Embodiment 1 and a wedge-type second light-directing body 40, is provided in front of the liquid crystal cell 10.

Figure 9A:
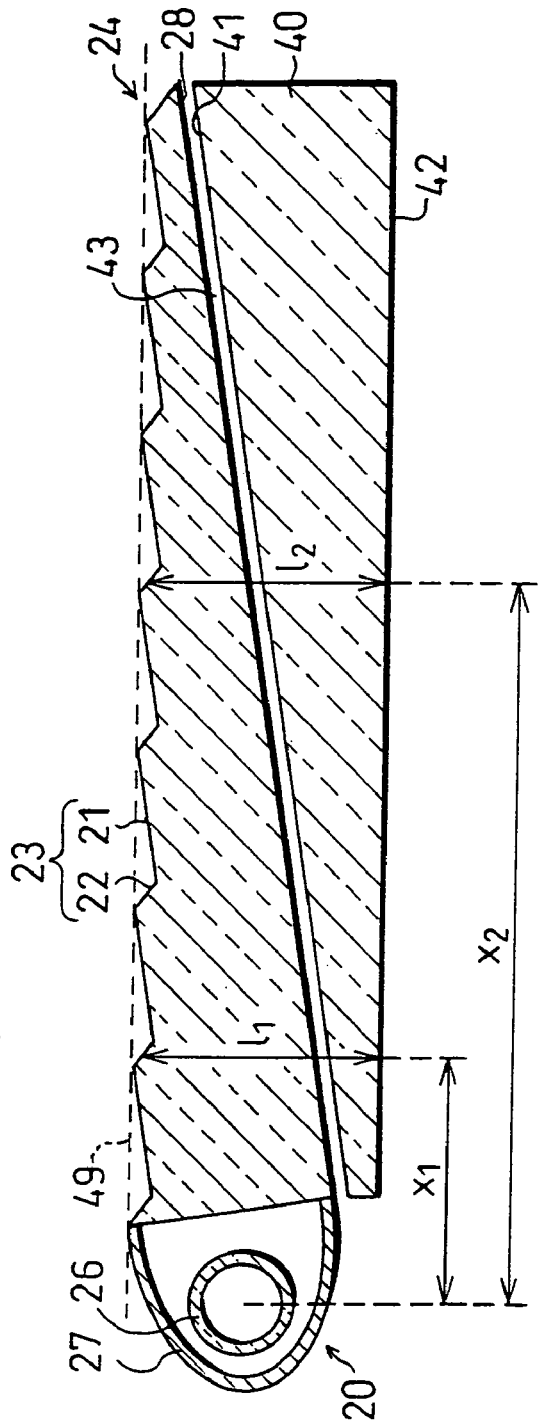
FIG. 9(*a*) is a cross-sectional view that indicates that in a front-light system installed in the reflection-type LCD of FIG. 8, the distances from the slanting portions of the light-directing body to the face forming the light-releasing surface of the front-light system are set uniform.

The second light-directing body 40 is placed between the light-directing body 24 of the front light 20 and the liquid crystal cell 10, and is designed to have a slanting face 41 that is parallel to the interface 28 of the light-directing body 24 and a bottom surface 42 that is parallel to the surface of the liquid crystal cell 10. As illustrated in FIG. 9(a), on the interface 23 of the light-directing body 24, a line 49, which connects portions at which the slanting portions 22 and the flat portions 21 contact each other to form ridges, is preferably designed to become parallel to the bottom surface 42.

Moreover, the second light-directing body 40 is preferably formed by a material which has at least the same refractive index as the light-directing body 24 that serves as a first light-directing body. The second light-directing body 40 may of course be made of the same material as the light-directing body 24. Furthermore, the manufacturing process can be simplified by forming the light-directing body 24 and the second light-directing body 40 in an integral manner by means of, for example, injection molding.

Spacers (not shown) having a particle-diameter of 50 μm are preliminarily scattered over the gap between the light-directing body 24 and the second light-directing body 40. Thus, a space 43 that is virtually equal to the particle-diameter of the spacers is formed in the gap between the light-directing body 24 and the second light-directing body 40.

The gap between the bottom surface 42 of the second light-directing body 40 and the polarizing plate 18 of the liquid crystal cell 10 is filled with filler (not shown) that is used to make the refractive indexes of the two members coincident with each other. Thus, it is possible to prevent light attenuation due to reflection on the interface between the second light-directing body 40 and the polarizing plate 18, and to further suppress loss of the light-source light. Here, UV-curing resins or methyl salicylate may be used as the filler.

Next, an explanation will be given of effects of the installation of the second light-directing body 40 between the light-directing body 24 and the liquid crystal cell 10.

Figure 9B:
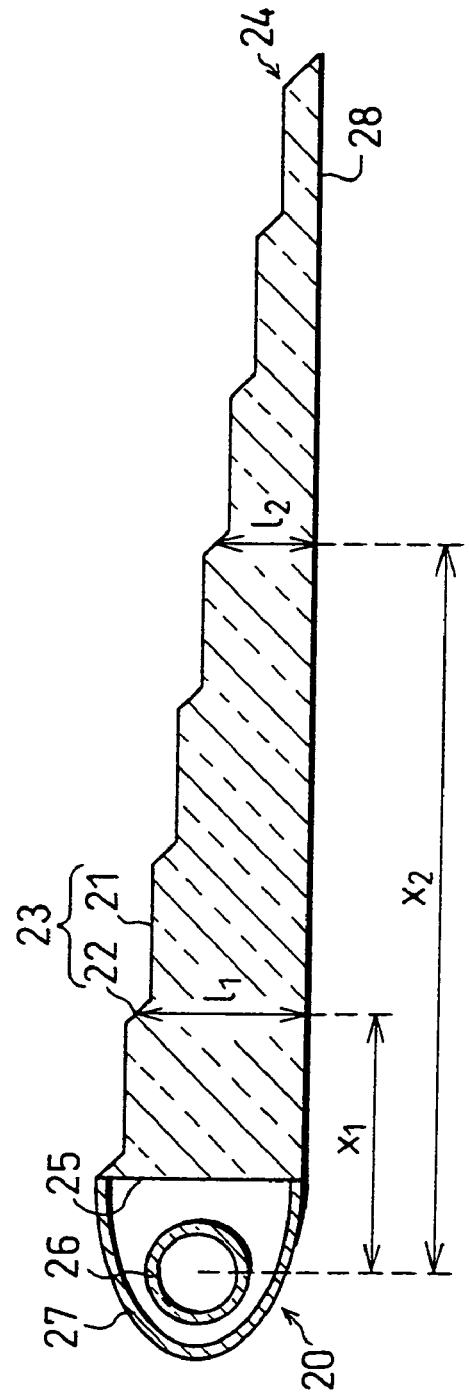

As illustrated in FIG. 9(b), in the construction (Embodiment 1) without the second light-directing body 40, the distance $l_n$ from the slanting portions 22 to the interface 28 serving as the incident surface toward the liquid crystal cell 10 becomes smaller as the distance $x_n$ from the light source 26 increases. In contrast, in the front-light system 51 of the present embodiment, as illustrated in FIG. 9(a), the distance $l_n$ from the slanting portions 22 and the bottom surface 42 of the second light-directing body 40 serving as the incident surface toward the liquid crystal cell 10 is virtually equal independent of the distance $x_n$ from the light source 26.

In other words, since the second light-directing body 40 serves so as to make constant the distance from the slanting portions 22 to the liquid crystal cell 10 in the front light 20, the front-light system 51 functions as a surface light source which releases light at a constant luminance independent of the distance from the light source 26.

Figure 10:
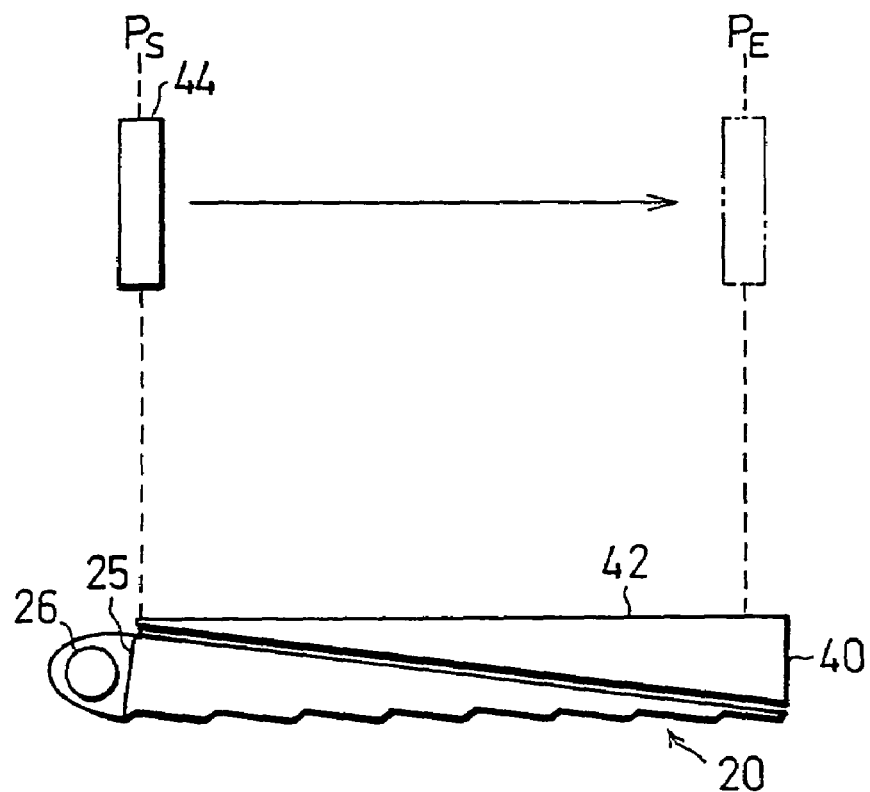
FIGS. 10(*a*) and 10(*b*) are explanatory drawings that respectively show measuring systems for measuring the luminance distributions of illuminating light by the front lights respectively shown in FIGS. 9(*a*) and 9(*b*).
Figure 10:
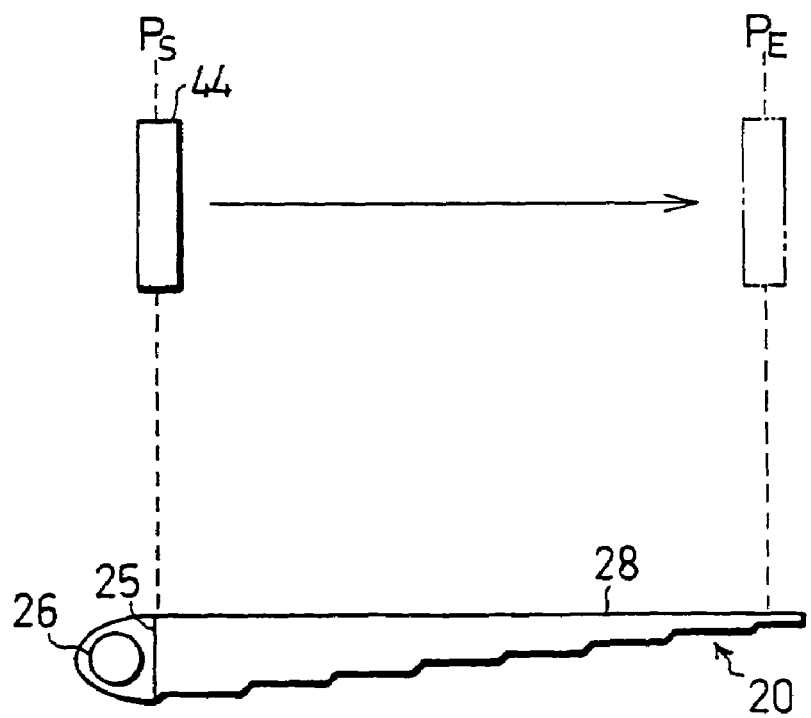

As illustrated in FIG. 10(a), in order to confirm the effects of the second light-directing body 40, measurements were made on the luminance distribution of the output light of the front-light system 51, while the detector 44 was being shifted in parallel with the bottom surface 42 of the second light-directing body 40. Here, it is supposed that a point in the vicinity of the incident surface 25 is measurement start position $P_S$ and the farthest position from the light source 26 on the bottom surface 42 is measurement end position $P_E$. FIG. 11(a) shows the results of the measurements.

For comparative purposes, as illustrated in FIG. 10(b), in order to measure the luminance distribution of the output light of the construction (in Embodiment 1) without the second light-directing body 40, measurements were carried out in the same manner, while the detector 44 was being shifted in parallel with the interface 28 of the front light 20. Here, it is supposed that a point in the vicinity of the incident surface 26 is measurement start position $P_S$ and the farthest position from the light source 26 on the interface 28 is measurement end position $P_E$. FIG. 11(b) shows the results of the measurements.

As clearly indicated by comparisons between FIG. 11(a) and FIG. 11(b), in the case when no second light-directing body 40 is installed, the pitch p of luminance peaks becomes greater as the distance to the light source 26 becomes shorter, while it becomes smaller as the distance to the light source 26 becomes longer, as illustrated in FIG. 11(b). In contrast, as illustrated in FIG. 11(a), in the front-light system 51 of the present embodiment, the pitch p of luminance peaks is virtually equal over the entire bottom surface 42 of the second light-directing body 40, and the peak of luminance is maintained uniform.

As described above, in the reflection-type LCD of the present embodiment, the front-light system 51 is installed in front of the liquid crystal cell 10, and the front-light system 51 is provided with the second light-directing body 40 that is used to make constant the distance from the slanting portions 22 of the light-directing body 24 to the liquid crystal cell 10 and that is installed between the light-directing body 24 serving as the first light-directing body and the liquid crystal cell 10; therefore, the front-light system 51 illuminates the liquid crystal cell 10 without unevenness, resulting in the effect that even in the case of insufficient ambient light, bright, high-quality display without unevenness is achieved.

As described above, the front-illuminating device of the present invention is designed so that supposing that the light-directing body of Embodiment 1 is the first light-directing body, the second light-directing body, which makes the luminance distribution of the output light from the first light-releasing surface uniform, is further installed.

Since the first light-directing body of the front-illuminating device of the present invention has the first light-directing body with a step shape, the distance from the slanting portions of the second light-releasing surface to the first light-releasing surface becomes smaller in proportion to the distance from the light source. Therefore, the luminance distribution of light released from the first light-releasing surface sometimes becomes uneven. However, the above-mentioned construction, which is provided with the second light-directing body, makes uniform the luminance distribution of output light to the object to be illuminated.

In the above-mentioned construction, the front-illuminating device of the present invention is provided with a second light-directing body that has a first surface facing the first light-releasing surface of the first light-directing body and a second surface for releasing light that has been made incident thereon through the first surface from the first light-directing body toward the object to be illuminated, and the first surface and the second surface are designed so that the distance from the slanting portions on the second light-releasing surface of the first light-directing body to the surface of the second surface is set virtually uniform.

Therefore, by installing the second light-directing body, the above-mentioned construction makes uniform the distance from the slanting portions of the second light-releasing surface on which light from the light source is reflected in the first light-directing body to the second surface of the second light-directing body serving as the light-releasing surface toward the object to be illuminated, thereby averaging the luminance distribution of the output light from the second surface. Consequently, it becomes possible to provide a front-illuminating device that functions as a surface light source free from unevenness in luminance.

In the above-mentioned construction of the front-illuminating device of the present invention, the refractive index of the first light-directing body and the refractive index of the second light-directing body are preferably set virtually the same. Since the refractive index of the first light-directing body and the refractive index of the second light-directing body are set virtually the same, light, reflected from the slanting portions of the second slanting face in the first light-directing body, is released with an angle as it is toward the object to be illuminated. Consequently, this eliminates the necessity of having to take them into consideration changes in locus of light due to refractions upon incident onto the second light-directing body or upon release from the second light-directing body, thereby making the design simpler.

In the above-mentioned construction of the front-illuminating device of the present invention, the first light-directing body and the second light-directing body may be formed in an integral manner. The integral formation of the first light-directing body and the second light-directing body makes the production easier.

In the above-mentioned construction of the front-illuminating device of the present invention, a filler is introduced into the gap between the first light-directing body and the second light-directing body so as to alleviate the difference of refractive indexes on the optical interface located between these light-directing bodies.

As compared with the case in which an air layer exists between the first light-directing body and the second light-directing body, the above-mentioned construction makes it possible to suppress attenuation of light due to reflection on the optical interface located between the first light-directing body and the second light-directing body. As a result, it becomes possible to achieve a front-illuminating device that has a further improved efficiency of use of the light source and that serves as a brighter surface light source. Additionally, by making the refractive index of the filler equal to at least one of the refractive indexes of the first light-directing body and the second light-directing body, the number of the optical interfaces between the first light-directing body and the second light-directing body can be reduced, thereby providing a more effective device.

Embodiment 3

Referring to Figures, the following description will discuss still another embodiment of the present invention. Here, those members that have the same functions and that are described in the aforementioned Embodiments are indicated by the same reference numerals and the description thereof is omitted.

Figure 12:
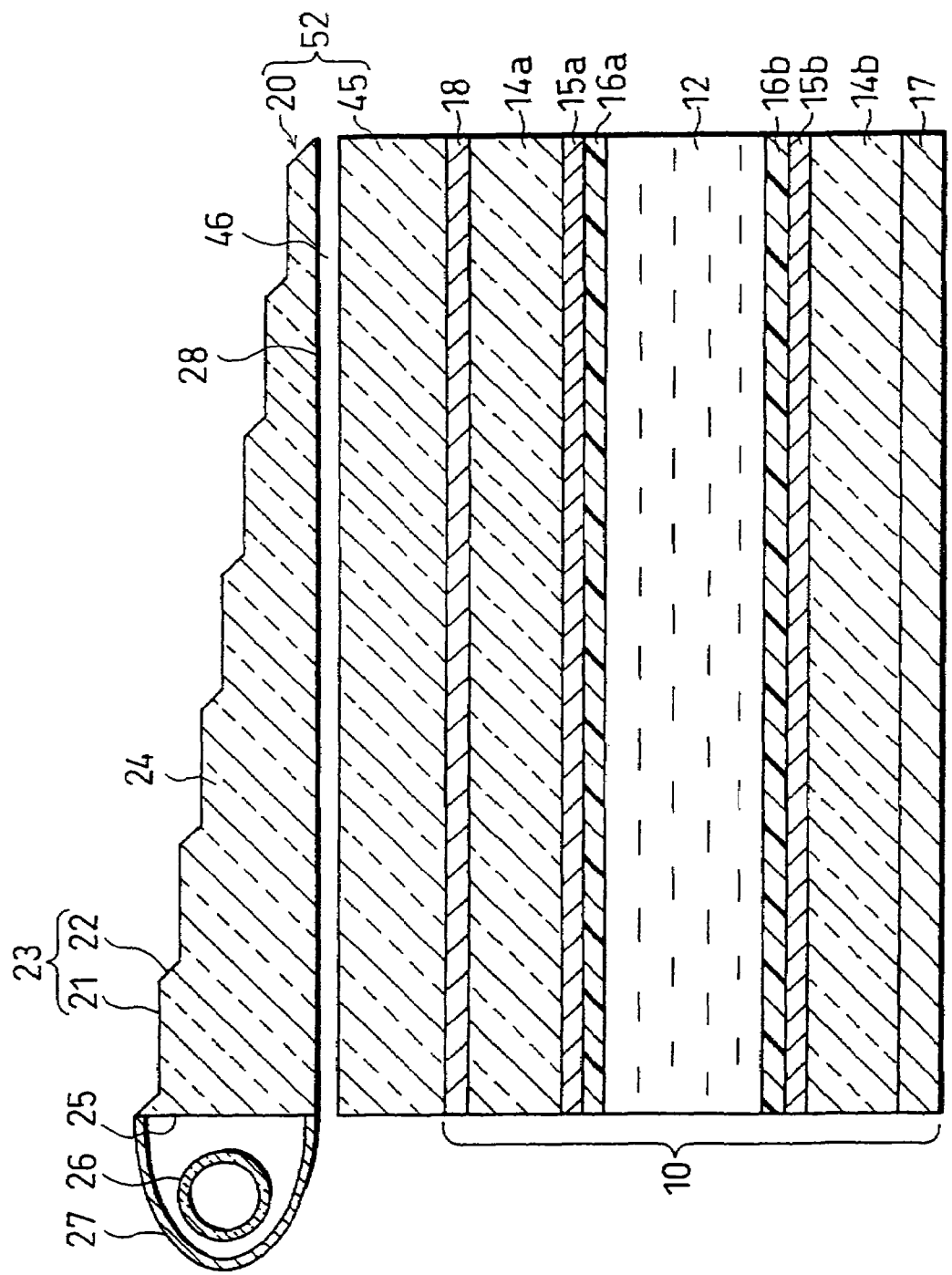
FIG. 12 is a cross-sectional view showing a construction of a reflection-type LCD in accordance with still another embodiment of the present invention.

As illustrated in FIG. 12, the reflection-type LCD in accordance with the present embodiment is characterized in that a front-light system 52, constituted by the front light 20 and a light-directing body 45, is provided in front of the liquid crystal cell 10.

Figure 13:
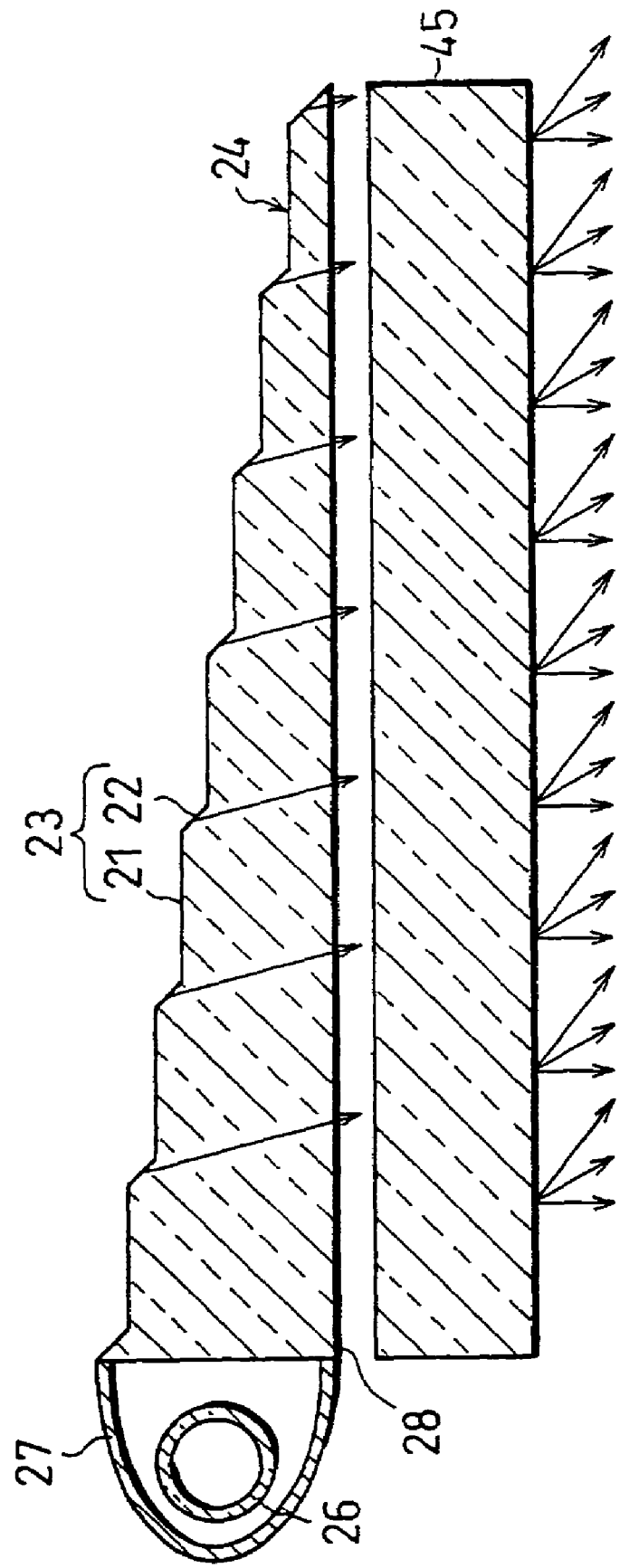
FIG. 13 is a schematic drawing that shows behaviors of light in the front-light system installed in the reflection-type LCD shown in FIG. 12.

As illustrated in FIG. 13, the second light-directing body 45 functions as a front-diffusing plate for diffusing light that is made incident thereon from the light-directing body 24 only in its proceeding direction, and also functions as an anisotropic diffusing plate for diffusing only light that is incident thereon from within a predetermined angle range, while transmitting light that is incident thereon from out of the predetermined angle range. With respect to the second light-directing body 45 satisfying such conditions, for example, a viewing-angle control plate (Brand Name: lumisty) made by Sumitomo Chemical Co., Ltd. is available as an article on the market.

Here, the angle range in which the second light-directing body 45 diffuses the incident light is preferably set so as to completely include the angle range within which light from the light-directing body 24 is made incident. This arrangement allows the released light from the light-directing body 24 to diffuse without loss, thereby making it possible to improve the efficiency of use of the light-source light. Further, since the second light-directing body 45 functions as an anisotropic diffusing plate for diffusing only light that is incident thereon from within a predetermined angle range, while transmitting light that is incident thereon from out of the predetermined angle range, the second light-directing body 45 does not have effects on the incident light from out of the predetermined angle range; therefore, it is possible to prevent degradation in the display quality due to unnecessary diffused light.

Spacers (not shown) having a particle-diameter of 50 μm are preliminarily scattered over the gap between the light-directing body 24 and the second light-directing body 45. Thus, as illustrated in FIG. 12, a space 46 that is virtually equal to the particle-diameter of the spacers is formed in the gap between the light-directing body 24 and the second light-directing body 45.

The gap between the second light-directing body 45 and a polarizing plate of the liquid crystal cell 10 is filled with filler (not shown) that is used to make the refractive indexes of the two members coincident with each other. Thus, it is possible to prevent light attenuation due to reflection on the interface between the second light-directing body 45 and the liquid crystal cell 10, and to further suppress loss of the light-source light.

Figure 14:
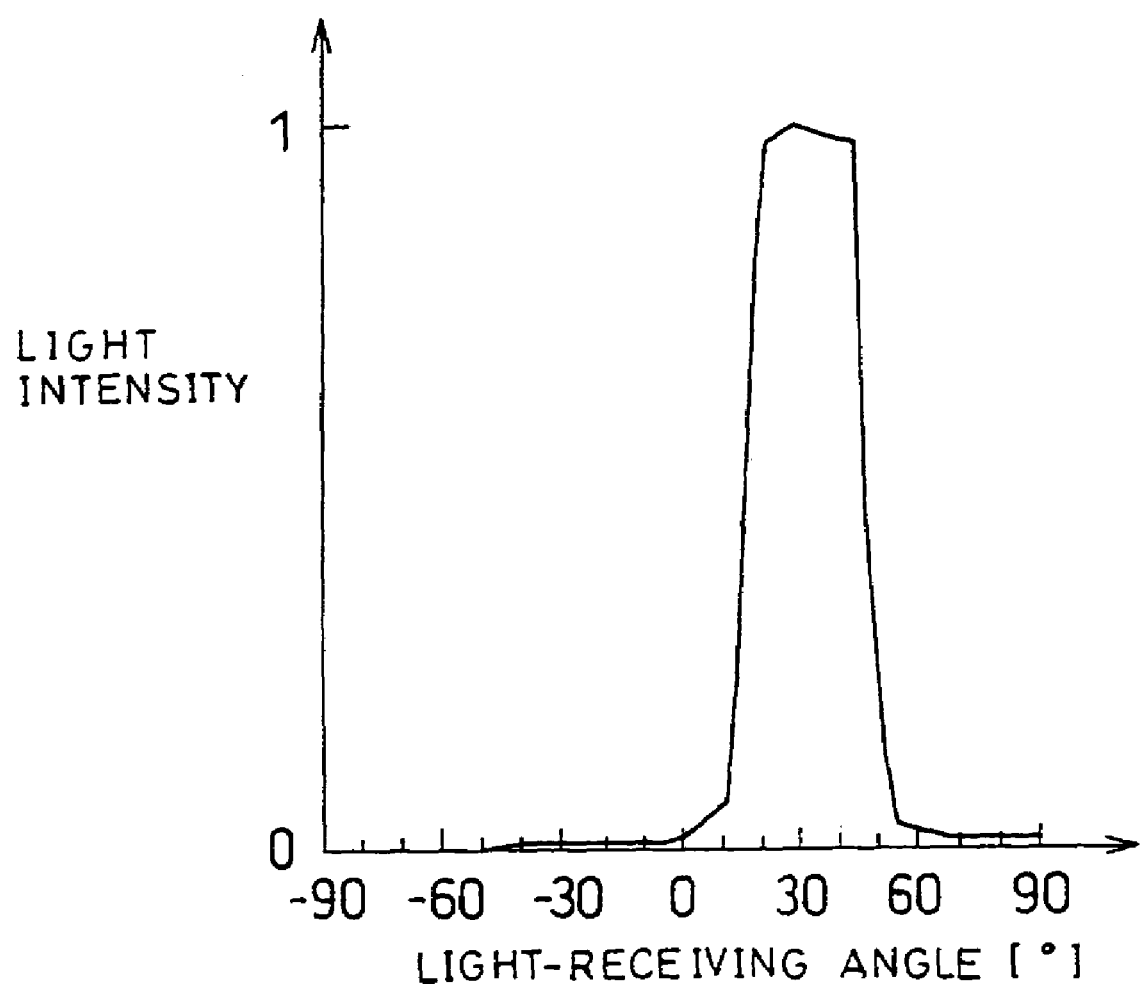
FIG. 14 is a graph that shows the results of measurements of the luminance distribution of illuminating light of the front-light system installed in the reflection-type LCD shown in FIG. 12.

Next, an explanation will be given of measurement results on the intensity of illuminating light of the front-light system 52. In order to measure the intensity of illuminating light of the front-light system 52, the same measuring system as that had been used in Embodiment 1 (see FIG. 5) was used. Here, supposing that the normal direction to the second light-directing body 45 of the front-light system 52 is 0°, the light intensity with respect to the surface located on the liquid crystal cell 10 side of the second light-directing body 45 was measured within the range of 0°±90° by using the detector 34. FIG. 14 shows the results of measurements.

As clearly shown by FIG. 14, the front-light system 52 of the present embodiment has a flat angular characteristic as compared with Embodiment 1, because light released from the light-directing body 24 functioning as the first light-directing body is diffused by the second light-directing body 45.

Thus, the construction as described in the present embodiment, which is provided with the second light-directing body 45 for diffusing the released light from the light-directing body 24, averages the luminance distribution of light that is to be released toward the liquid crystal cell 10, thereby making it possible to illuminate the liquid crystal cell 10 without unevenness.

Here, instead of the anisotropic diffusing plate, a hologram, etc. may be used as the second light-directing body 45.

As described above, the front-illuminating device of the present invention may be modified so that the second light-directing body, shown in Embodiment 2, may be provided as a light-diffusing body that diffuses light from the first light-releasing surface of the first light-directing body.

In this arrangement, the light-diffusing body, which serves as the second light-directing body, diffuses the released light from the first light-directing body so that the luminance distribution of light released toward an object to be illuminated is averaged. As a result, it is possible to achieve a front-illuminating device that functions as a surface light source without unevenness in luminance.

In the above-mentioned arrangement of the front-illuminating device of the present invention, the light-diffusing body is an anisotropic diffusing body that diffuses only light that is incident thereon from within a predetermined angle range, and at least one portion of the angle range within which light released from the first light-directing body is made incident on the second light-directing body is included within the predetermined angle range.

Therefore, with the above-mentioned arrangement, the anisotropic diffusing body, which functions as the light-diffusing body, does not have any effects on the incident light coming from within the predetermined angle range such as, for example, light that is released toward the observer; therefore, it is possible to suppress degradation in images of the object to be illuminated due to unnecessary diffusing light. Further, since light released from the first light-directing body is made incident within the angle range in which the incident light is diffused by the light-diffusing body serving as the second light-directing body, it is possible to diffuse the incident light more effectively. Consequently, it becomes possible to achieve a front-illuminating device that functions as a bright surface light source without unevenness in luminance and that provides a sharp image of the object to be illuminated.

In the above-mentioned arrangement of the front-illuminating device of the present invention, the light-diffusing body also functions as a front-diffusing body. In other words, since the light-diffusing body, provided as the second light-directing body, functions as the front-diffusing body that diffuses light that is made incident thereon from the first light-directing body only in the light proceeding direction, the incident light from the first light-directing body is not subject to rear diffusing. This further improves the efficiency of use of light, as well as preventing degradation in an image of the object to be illuminated due to the rear diffusing. Consequently, it is possible to achieve a front-illuminating device that functions as a bright surface light source without unevenness in luminance and that provides a sharp image of the object to be illuminated.

Embodiment 4

Referring to Figures, the following description will discuss still another embodiment of the present invention. Here, those members that have the same functions and that are described in the aforementioned Embodiments are indicated by the same reference numerals and the description thereof is omitted.

As explained in Embodiment 1, in the case where the interface 23 on the observer's side of the light-directing body 24 is constituted by the slanting portions 22 and the flat portions 21, when light which has been again made incident on the light-directing body 24 after having been reflected by the liquid crystal cell 10 is allowed to pass through the interface 23, blurredness and fogs tend to occur in an image to be displayed.

In other words, as illustrated in FIG. 15, the output light 48a, released from the liquid crystal cell 10, is transmitted toward the observer side not only from the flat portions 21, but also from the slanting portions 21. At this time, light rays 48b released from the slanting portions 22 and light rays 48c released from the flat portions 21, which have been released in different directions, intersect each other, with the result that blurredness and fogs appear on an image to be displayed.

Figure 16:
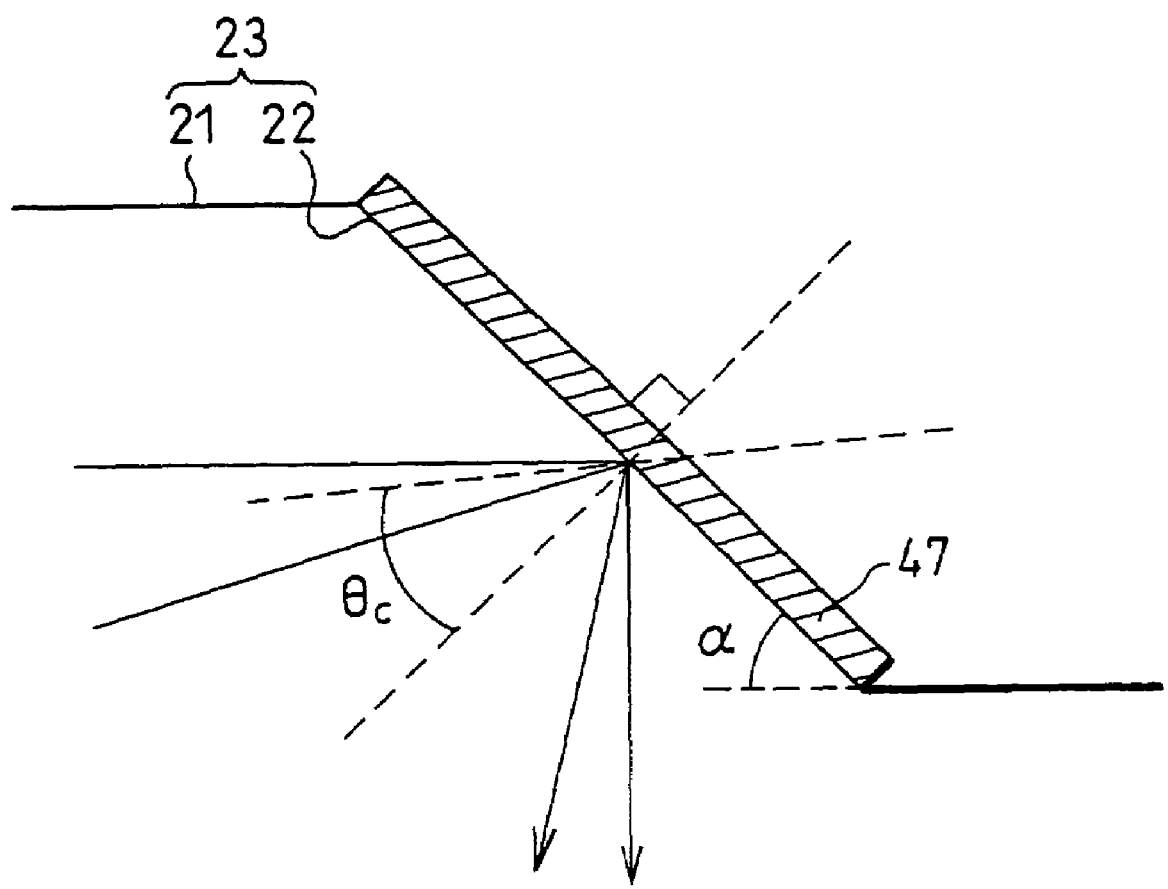
FIG. 16, which is a cross-sectional view showing one portion of the slanting portions of the light-directing body of the above-mentioned reflection-type LCD, shows a construction in which a metal reflective film is placed on each of the slanting portions.

In order to solve the above-mentioned problems, as illustrated in FIG. 16, the reflection-type LCD of the present embodiment is provided with a metal reflective film 47 (a reflective member) for reflecting light that is added to the surface of the slanting portions 22 on the interface 23 of the light-directing body 24. As illustrated in FIG. 16, the metal reflective film 47 reflects all light that is made incident on the slanting portions 22 independent of its incident angle. Thus, the light that is to be released toward the observer from the interface 23 only consists of light that has passed through the flat portions 21. As a result, it becomes possible to provide a sharp image without blurredness and fogs.

Next, an explanation will be given of an example of a method for manufacturing the above-mentioned metal reflective film 47, in which aluminum is used as the material. Here, not limited to aluminum, for example, a metal such as silver may be used as the material of the metal reflective film 47.

Figure 17A:
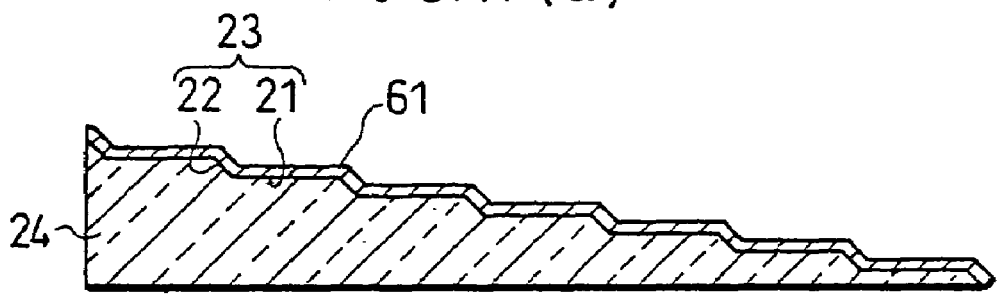
FIGS. 17(*a*) through 17(*e*) are cross-sectional views that show processes for forming the metal reflective film.
Figure 17B:
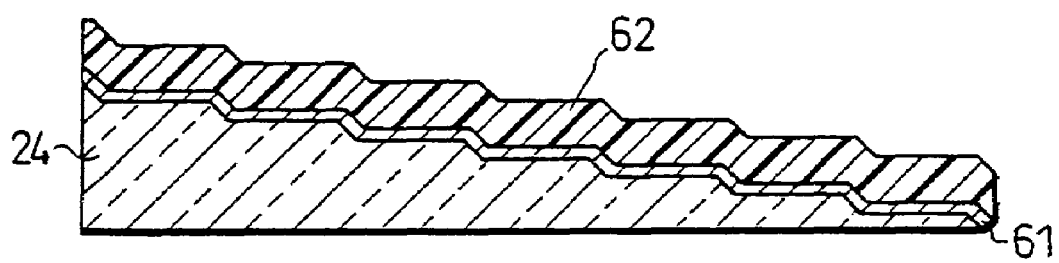
Figure 17C:
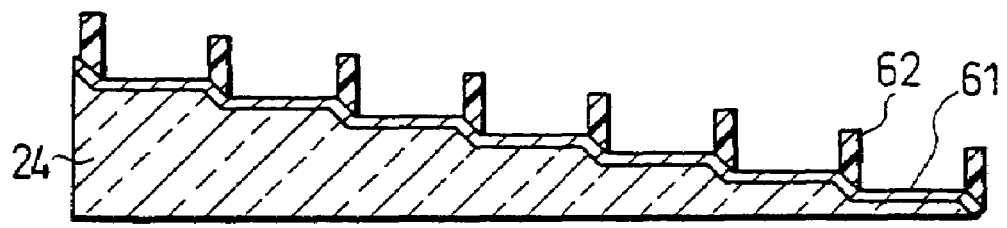
Figure 17D:
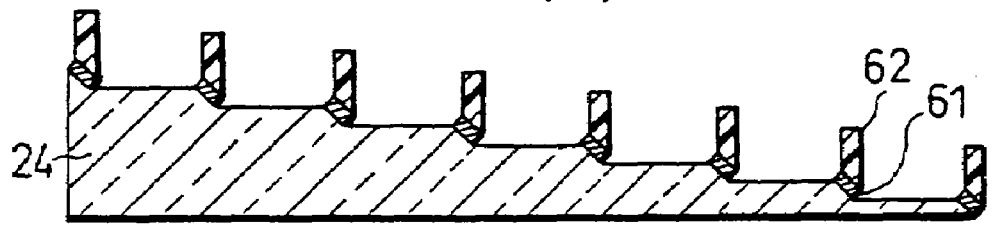
Figure 17E:
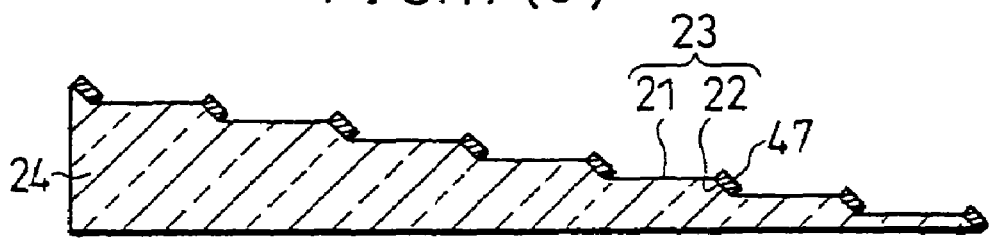

First, as illustrated in FIG. 17(a), an aluminum film 61 is formed on the entire surface of the interface 23 of the light-directing body 24 by sputtering. Further, as illustrated in FIG. 17(b), photoresist 62 is applied to the surface of the aluminum film 61. Next, as illustrated in FIG. 17(c), the photoresist is patterned through an exposure process. Then, as illustrated FIG. 17(d), the aluminum film 61 is etched by using the patterned photoresist 62 as a mask. Thereafter, as illustrated in FIG. 17(e), by removing the photoresist 62, a metal reflective film 47 made of aluminum is formed on the surface of the slanting portions 22 of the interface 23.

Figure 18:
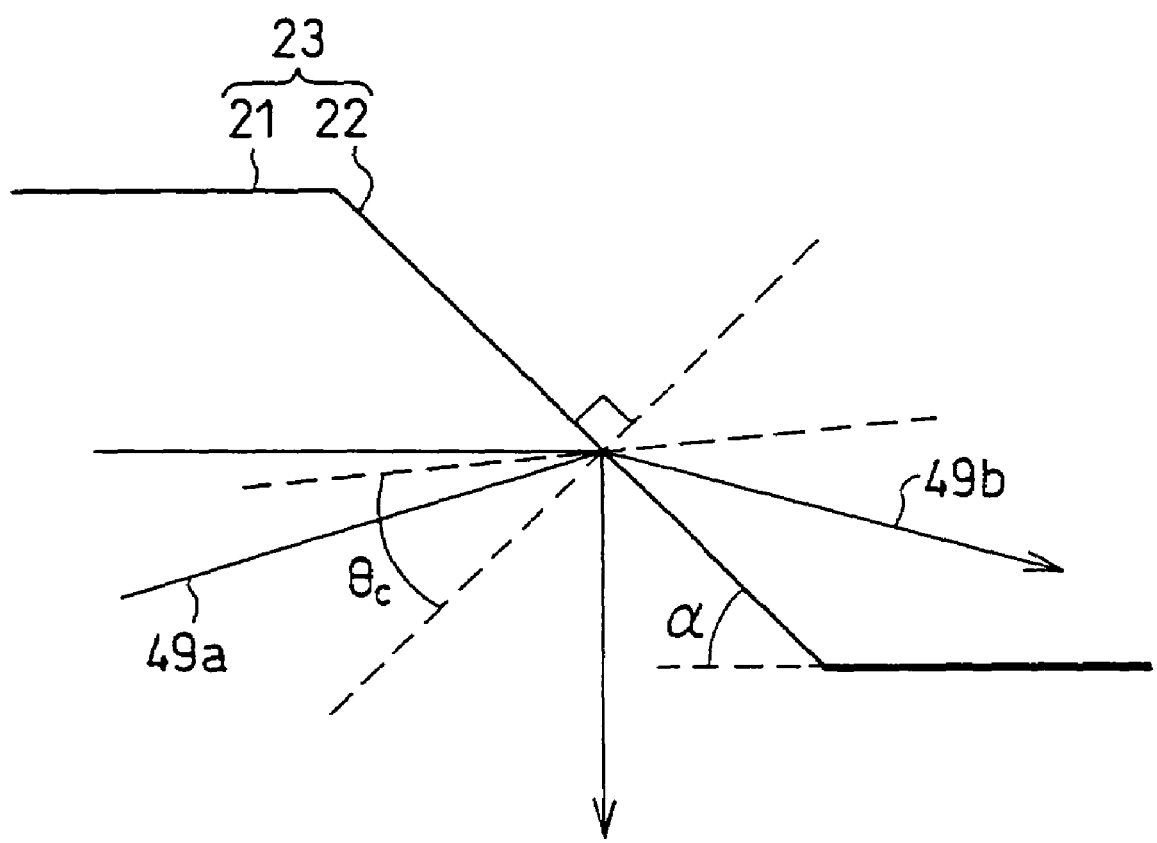
FIG. 18 is a schematic drawing that shows behaviors of light in the case when no metal reflective film is placed in the light-directing body of FIG. 16.

As described above, since the metal reflective film 47 is formed on the surface of the slanting portions 22, it becomes possible to increase the angle of inclination a with respect to the flat portions 21, as illustrated in FIG. 16. For example, as illustrated in FIG. 18, in the case of a construction without the metal reflective film 47 on the slanting portions 22, when the angle of inclination a is set as large as 60°, a light ray 49a that has been made incident on the slanting portion 22 with an incident angle smaller than the critical angle $\theta_C$ forms a light ray 49b that is transmitted toward the observer through the slanting portion 22. Such a light ray 49b is not desirable since it reduces the display quality.

In contrast, with the construction of the present embodiment, since the metal reflective film 47 is formed on the slanting portions 22, even if the angle of inclination a is set larger, no light ray, such as the light ray 49b that passes through the slanting portion 22, exists, thereby allowing all light to be reflected from the slanting portions 22.

As described above, since the angle of inclination a of the slanting portions 22 can be set larger, the slanting portions 22 are hardly visualized when viewed in the normal direction to the flat portions 21 so that the display quality is further improved.

Figure 19:
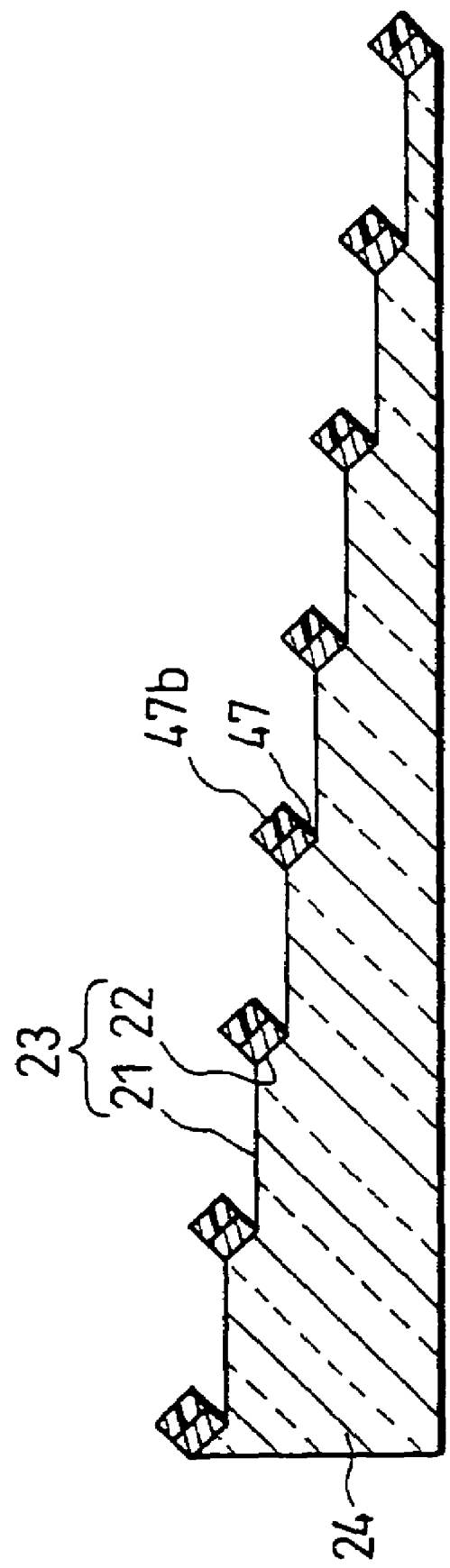
FIG. 19 is a cross-sectional view that shows a modified example of the construction shown in FIG. 16.

Additionally, as illustrated in FIG. 19, a black matrix 47b (a light-shielding member) for preventing reflection of ambient light may be stack on the surface of the metal reflective film 47; thus, it is possible to prevent ambient light from being reflected toward the observer. This arrangement is more preferable since it prevents degradation in the display quality due to ambient light being reflected toward the observer.

In this manner, the front light 20 of the present embodiment is characterized in that the metal reflective film 47, used for eliminating transmitted light from the slanting portions 22 toward the observer, is formed on the slanting portions 22. Thus, the light that is released from the interface 23 toward the observer only consists of light released from the flat portions; therefore, it becomes possible to obtain a sharp display image without blurredness and fogs in a reflection-type LCD provided with the front light 20 in front of the liquid crystal cell 10 thereof.

As described above, in the front-illuminating device of the present invention, the reflective member for reflecting light is installed on the surface of the slanting sections of the first light-directing body. It is preferable for light that is made incident on the slanting portions of the second light-releasing surface from the light source to be totally reflected from the slanting sections. For this reason, by installing the reflective member on the slanting portions, the incident light onto the slanting portions is totally reflected independent of its incident angle. This prevents light from the light source from leaking toward the observer through the slanting portions, thereby further improving the efficiency of use of light. Consequently, it is possible to achieve a front-illuminating device that functions as a brighter surface light source.

In the above-mentioned construction of the front-illuminating device of the present invention, the light-shielding member is placed on the surface of the reflective member. This prevents ambient light reflected by the reflective member from entering the eyes of the observer and causing degradation in the display quality of an image of the object to be illuminated; therefore, it becomes possible to provide a front-illuminating device for providing a sharper image of the object to be illuminated.

In the above-mentioned construction, the slanting portions of the front-illuminating device of the present invention functions effectively even in the case when, supposing that the refractive index of the light-directing body is $n_2$ and that the refractive index of the external medium contacting the slanting portions is $n_1$, the incident angle $\theta$ of light that is to be made incident on the slanting portions from the light source is set in the range represented by the following inequality:

$$\theta < \arcsin(n_2/n_2)$$

The incident angle $\theta$ of light that is to be made incident on the slanting portions from the light source becomes smaller as the angle of inclination of the slanting portions with respect to the flat portions becomes greater. By placing the reflective member on the slanting portions of the second light-releasing surface, the incident light onto the slanting portion is totally reflected independent of its incident angle, and is never allowed to pass through the slanting portions to reach the observer's side. Thus, as long as the incident angle θ of the light that is to be made incident on the slanting portions from the light source is located within the range satisfying the above-mentioned inequality, the angle of inclination of the slanting sections with respect to the flat portions can be set as large as possible. Consequently, the slanting portions, which do not contribute to the image display of the object to be illuminated, become hardly recognizable, thereby improving the display quality of the image of the object to be illuminated.

Embodiment 5

Referring to Figures, the following description will discuss still another embodiment of the present invention. Here, those members that have the same functions and that are described in the aforementioned Embodiments are indicated by the same reference numerals and the description thereof is omitted.

Figure 20:
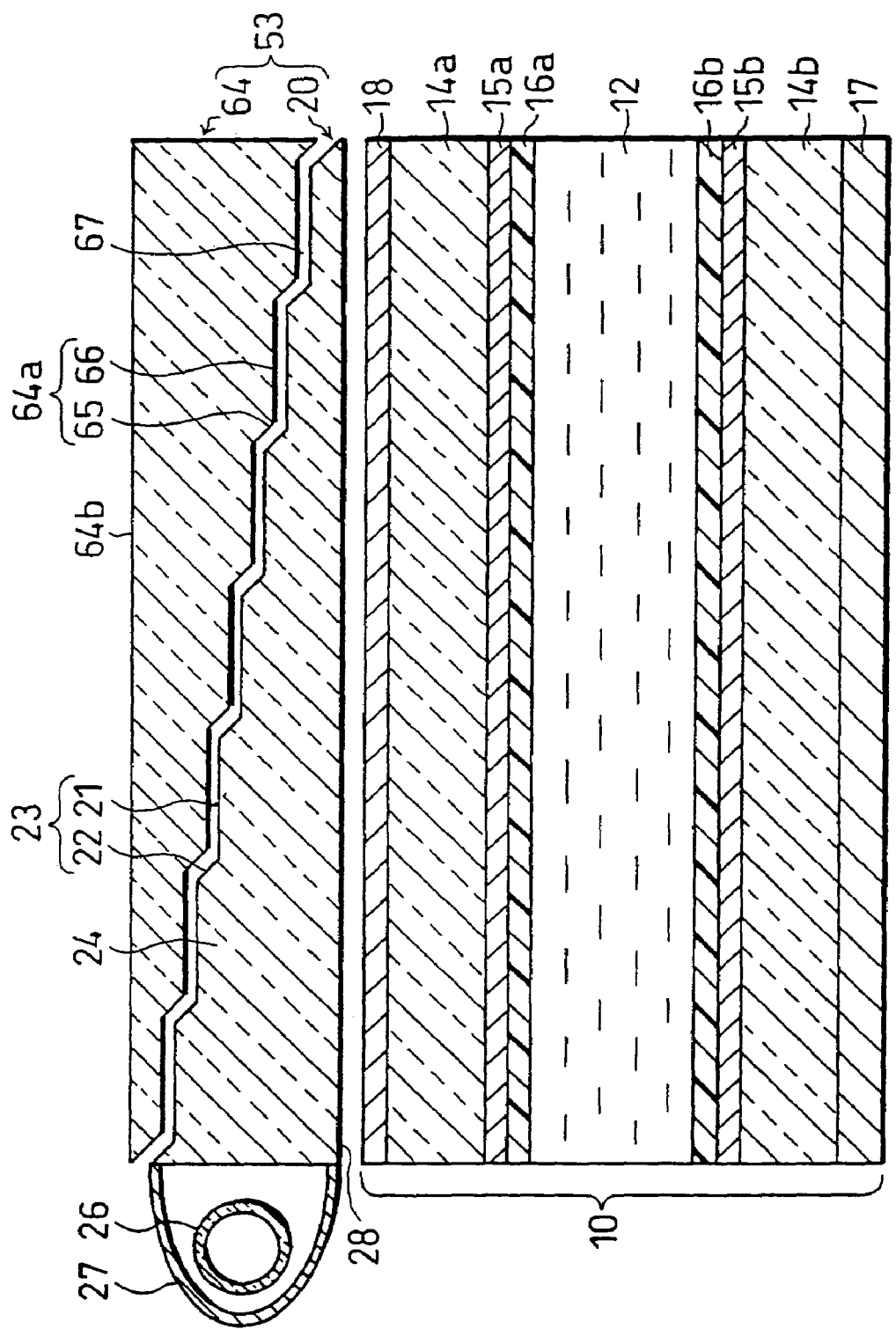
FIG. 20 is a cross-sectional view that shows a construction of a reflection-type LCD in accordance with still another embodiment of the present invention.

As illustrated in FIG. 20, the reflection-type LCD in accordance with the present embodiment is characterized in that a front-light system 53, constituted by the front light 20 explained in Embodiment 1 and an optical compensating plate 64 (compensating means) installed on the interface 23 of the front light 20, is provided in front of the liquid crystal cell 10.

In the optical compensating plate 64, the bottom surface 64a, which is a face opposing to the light-directing body 24 of the front light 20, has a step shape that conforms to the interface 23 of the light-directing body 24, as illustrated in FIG. 20. In other words, the bottom surface 64a is provided with slanting portions 65 parallel to the slanting portions 22, located at positions corresponding to the slanting portions 22 of the light-directing body 24, and also provided with flat portions 66 parallel to the flat portions 21, located at positions corresponding to the flat portions 21. In the optical compensating plate 64, a surface 64b, which is a surface located on the observer's side, is on the other hand formed into a flat face in parallel with the interface 28 of the light-directing body 24.

The optical compensating plate 64 is formed by using, for example, PMMA by means of injection molding in the same manner as the light-directing body 24. The optical compensating plate 64 and the light-directing body 24 are arranged so as to place the respective slanting portions and flat portions face to face with each other as described above, and joined through spacers having a particle-diameter of 20 μm (not shown). Thus, an air layer 67 with a virtually uniform thickness is provided between the bottom surface 64a of the optical compensating plate 64 and the interface 23 of the light-directing body 24.

With this arrangement in which the optical compensating plate 64 is placed in front of the light-directing body 24 with the air layer 67 being located between the light-directing body 24 and the optical compensating plate 64, the following effect is obtained:

As explained in Embodiment 4 with reference to FIG. 15, the light rays 48a that have been again made incident on the light-directing body 24 from the liquid crystal cell 10, even if they are allowed to proceed in the same direction inside the light-directing body 24, are released from the interface 23 of the light-directing body in directions different from each other by being transmitted through the slanting portion 22 or the flat portion 21 of the interface 23, causing blurredness and fogs in the image.

Figure 21:
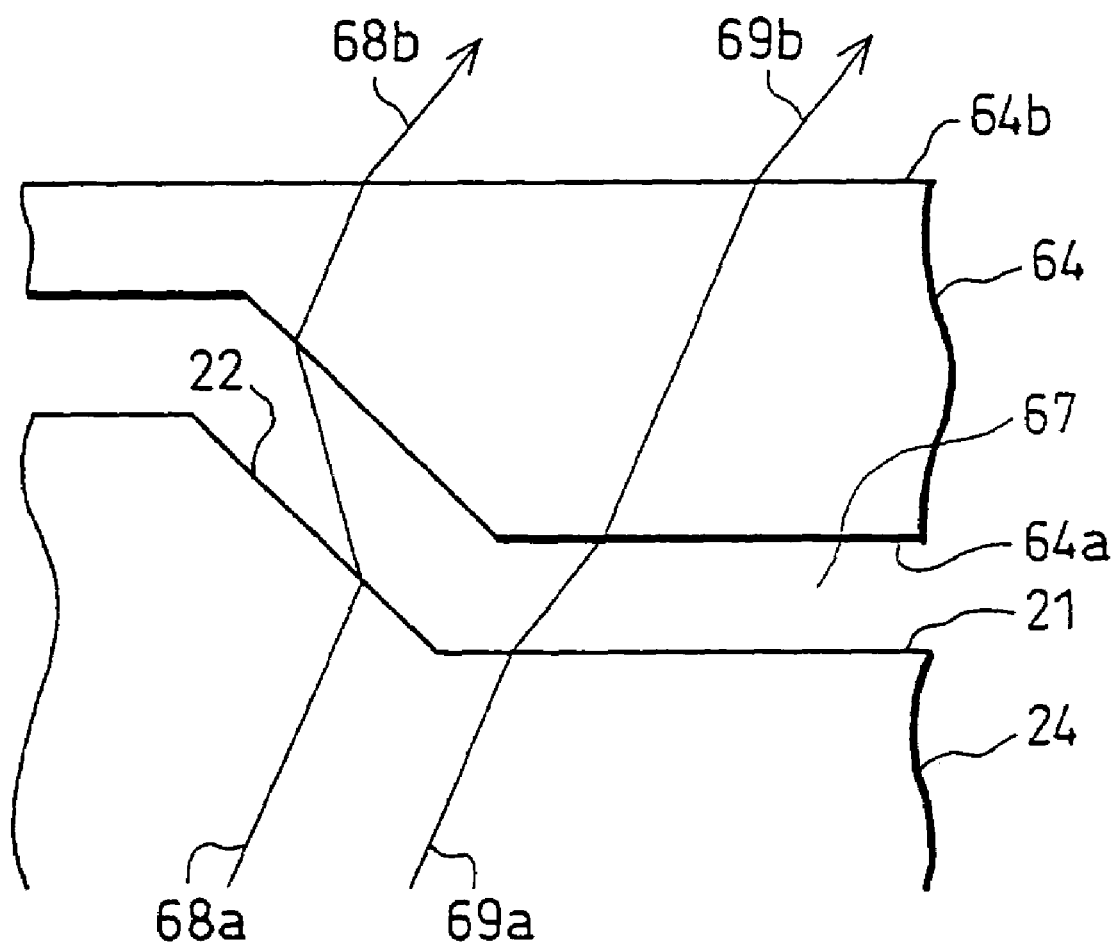
FIG. 21 is a schematic drawing that shows behaviors of light between the light-directing body and the optical compensating plate of the reflection-type LCD.

In contract, as illustrated in FIG. 21, in the front-light system 53 of the present embodiment, light rays 68a and 69a that have been made incident on the light-directing body 24 from the liquid crystal cell 10 in the same direction, after having been released from the light-directing body 24, are again allowed to form light rays proceeding in the same direction by being refracted by the bottom surface 64a that is an interface between the air layer 67 and the optical compensating plate 64, and are released in the same direction from the surface 64b of the optical compensating plate 64, as shown by light rays 68b and 69b. Consequently, when viewed from the observer's side, a sharp image free from blurredness and fogs is obtained.

Figure 22A:
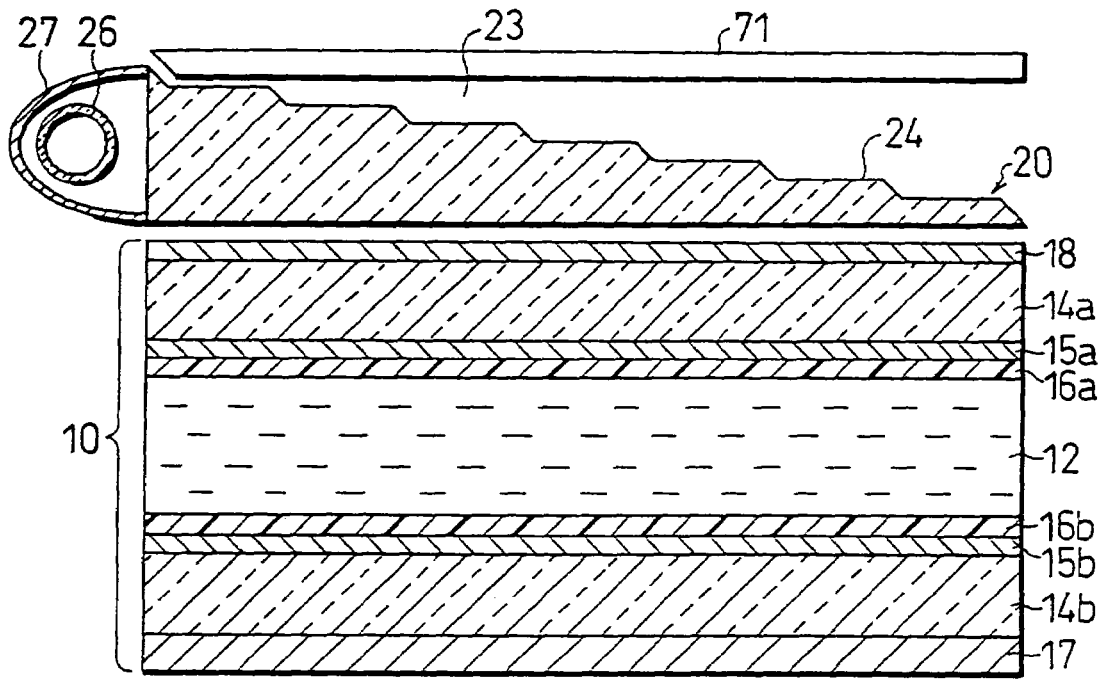
FIGS. 22(*a*), 22(*b*) and 22(*c*) show modified examples of the construction of the reflection-type LCD shown in FIG. 20.
Figure 22B:
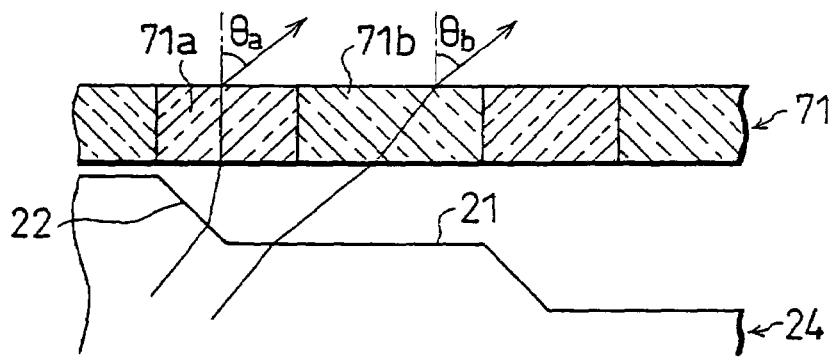

Here, in addition to the above-mentioned optical compensating plate 64, as illustrated in FIG. 22(a), an optical compensating plate 71, formed into a flat-plate shape, may be placed in front of the light-directing body 24. In this case, as illustrated in FIG. 22(b), the optical compensating plate 71 functions so that an area 71a on which a light ray released from the slanting portion 22 of the light-directing body 24 is made incident and an area 71b on which a light ray released from the flat portion 21 of the light-directing body 24 is made incident have mutually different refractive indexes; therefore, light rays which are released from the respective surfaces of the areas 71a and 71b toward the observer have virtually the same light-releasing angles $\theta_a$ and $\theta_b$. Alternatively, the area 71a may be formed by a member (for example, a diffraction element) having a diffracting function in order to diffract the light ray passing through the area 71a to the same direction as the light ray passing through the area 71b.

Figure 22C:
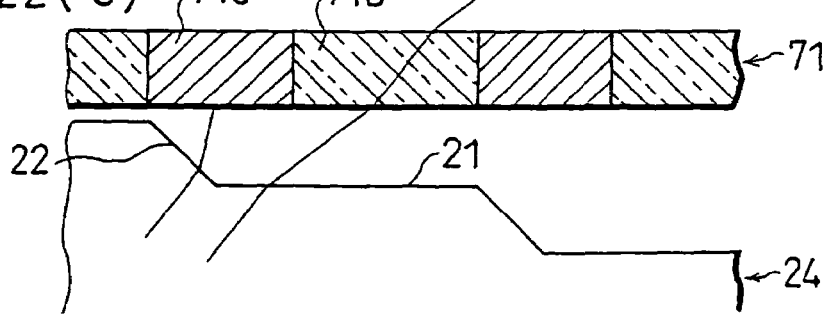

Further, as illustrated in FIG. 22(c), in the optical compensating plate 71, the area on which the light ray released from the slanting portion 22 of the light-directing body 24 is made incident may be formed by a black mask 71c for blocking light so that the light ray released from the slanting portion 22 does not reach the observer.

As described above, with the arrangement of the present invention, since the light-releasing directions of the light rays released from the respective slanting portions 22 and the flat portions 21 of the interface 23 of the light-directing body 24 are aligned by the optical compensating plate 64 (or the optical compensating plate 71), it is possible to achieve a reflection-type LCD for providing sharp display free from blurredness and fogs.

In the front-illuminating device of the present invention, the aforementioned construction is further provided with a compensating means for aligning the light-releasing directions of the light ray released from the flat portion and the light ray released from the slanting portion on the second light-releasing surface.

Since the second light-releasing surface is formed into a step shape in which flat portions and slanting portions are alternately placed, light rays reflected from the object to be illuminated and made incident on the light-directing body from the first light-releasing surface are released from the flat portions and the slanting portions of the second light-releasing surface in directions different from each other, possibly resulting in blurredness and fogs. For this reason, by installing the compensating means for aligning the light-releasing directions of the light ray released from the flat portion and the light ray released from the slanting portion on the second light-releasing surface, it becomes possible to obtain a sharp image of the object to be illuminated.

In the front-illuminating device of the present invention which has the above-mentioned arrangement, the compensating means has a first surface facing the second light-releasing surface of the light-directing body and a second surface facing the first surface, and the first surface of the compensating means is formed into a step shape in which slanting faces virtually parallel to the slanting portions of the second light-releasing surface of the light-directing body and flat faces virtually parallel to the flat portions of the second light-releasing surface are alternately placed in a manner so as to conform to the second light-releasing surface, and the second surface of the compensating means is placed virtually in parallel with the first light-releasing surface of the light-directing body.

Therefore, in the above-mentioned arrangement, light rays that have been released toward the object to be illuminated from the first light-releasing surface of the light-directing body are reflected by the object, and again returned to the inside of the light-directing body from the first light-releasing surface, and then, as illustrated in FIG. 21, released respectively from the flat portions (21) and the slanting portions (22) of the second light-releasing surface in directions different from each other. In this case, since the first surface (64a) of the compensating means (64), placed face to face with the second light-releasing surface, is formed into a step shape that confirms to the second light-releasing surface of the light-directing body, the light ray (69a) released from the flat portion (21) is made incident on the flat face of the first surface of the compensating means and the light ray (68a) released from the slanting portion (22) is made incident on the slanting face of the first surface; thus, the respective light rays form light rays (68b and 69b) that are released virtually in the same direction, and released from the second surface. In this manner, since the light-releasing directions of the light ray released from the flat portion and the light ray released from the slanting portion are aligned, it becomes possible to obtain a sharp image of the object to be illuminated without blurredness or fogs.

In the front-illuminating device of the present invention which has the above-mentioned arrangement, the compensating means is provided with areas on which light rays mainly released from the slanting portions of the second light-releasing surface are made incident and areas on which light rays mainly released from the flat portions of the second light-releasing surface are made incident, and the respective areas have refractive indexes different from each other.

Therefore, in the above-mentioned arrangement, the compensating means, which is arranged so that the areas on which light rays mainly released from the slanting portions are made incident and the areas on which light rays mainly released from the flat portions are made incident have refractive indexes different from each other, aligns the light-releasing directions of the light rays respectively released from the slanting portions and the flat portions. Consequently, it becomes possible to provide a front-illuminating device for producing a sharp image of the object to be illuminated without blurredness or fogs.

In the front-illuminating device of the present invention which has the above-mentioned arrangement, the compensating means may be provided with diffraction elements that are placed on the areas on which light rays mainly released from the slanting portions of the second light-releasing surface are made incident. In this arrangement, since the diffraction elements are placed on the areas on which light rays mainly released from the slanting portions are made incident, the light-releasing directions of the light rays respectively released from the slanting portions and the flat portions are aligned. Thus, it becomes possible to achieve a front-illuminating device for producing a sharp image of the object to be illuminated without blurredness or fogs.

In the front-illuminating device of the present invention which has the above-mentioned arrangement, the compensating means may be provided with light-shielding members that are placed on the areas on which light rays mainly released from the slanting portions of the second light-releasing surface are made incident. In this arrangement, since the light-shielding members for blocking light are placed on the areas on which light rays mainly released from the slanting portions are made incident, the light rays released from the second light-releasing surface of the light-directing body are limited to those light rays from the flat portions. Thus, it becomes possible to provide a front-illuminating device for producing a sharp image of the object to be illuminated without blurredness or fogs.

Embodiment 6

Referring to Figures, the following description will discuss still another embodiment of the present invention. Here, those members that have the same functions and that are described in the aforementioned Embodiments are indicated by the same reference numerals and the description thereof is omitted.

The reflection-type LCD in accordance with the present embodiment is characterized in that a touch-panel function is added to the front-light system 53 (see FIG. 20) explained in the aforementioned Embodiment 5.

Figure 23:
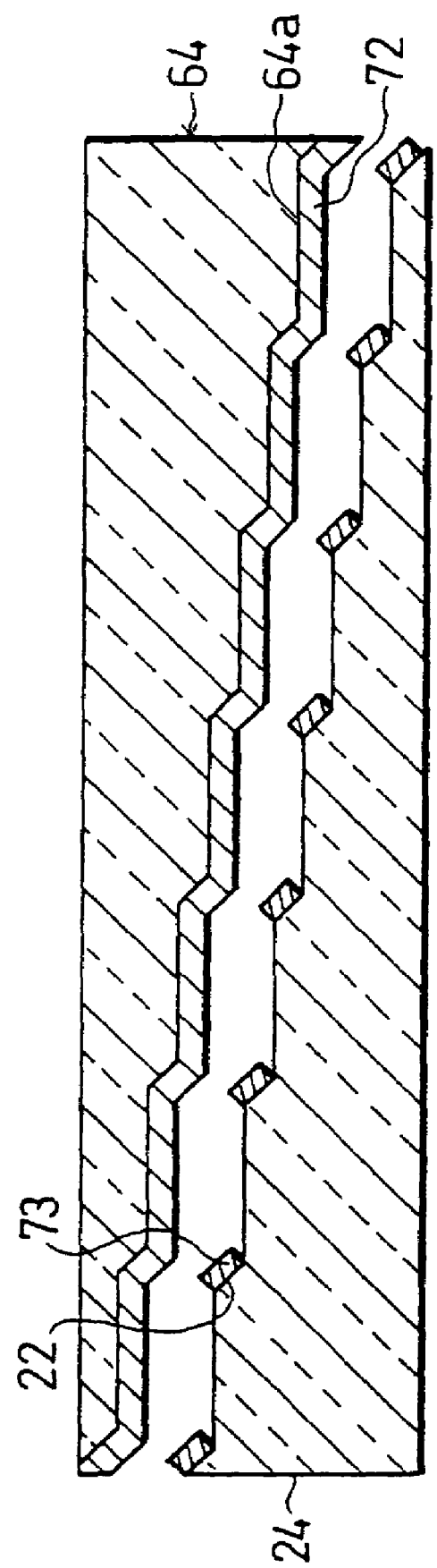
FIG. 23 is a cross-sectional view that shows a construction of a touch panel that is installed in a reflection-type LCD in accordance with another embodiment of the present invention.

As illustrated in FIG. 23, in order to achieve the touch-panel function, the reflection-type LCD of the present embodiment is provided with a transparent electrode 72 that is made of, for example, ITO and placed on the bottom surface 64a of the optical compensating plate 64, and a reflective electrode 73 that is made of a material such as aluminum that reflects light and has a conductive property and that is placed on the slanting portions 22 of the light-directing body 24. The transparent electrode 72 and the reflective electrode 73 constitute a position-detecting means.

Figure 24:
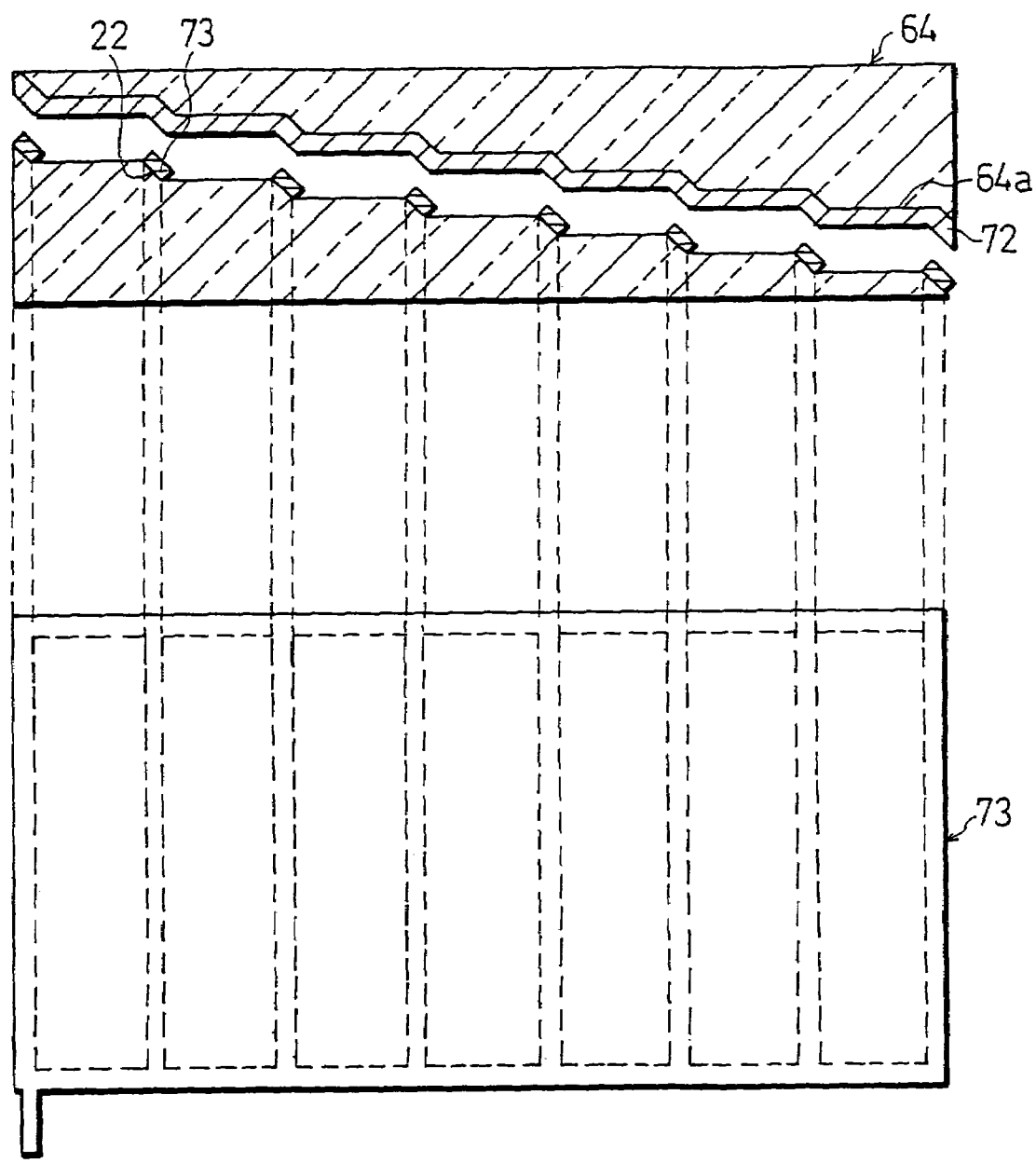
FIG. 24 is an explanatory drawing that shows reflective electrodes installed in the touch panel.
Figure 25:
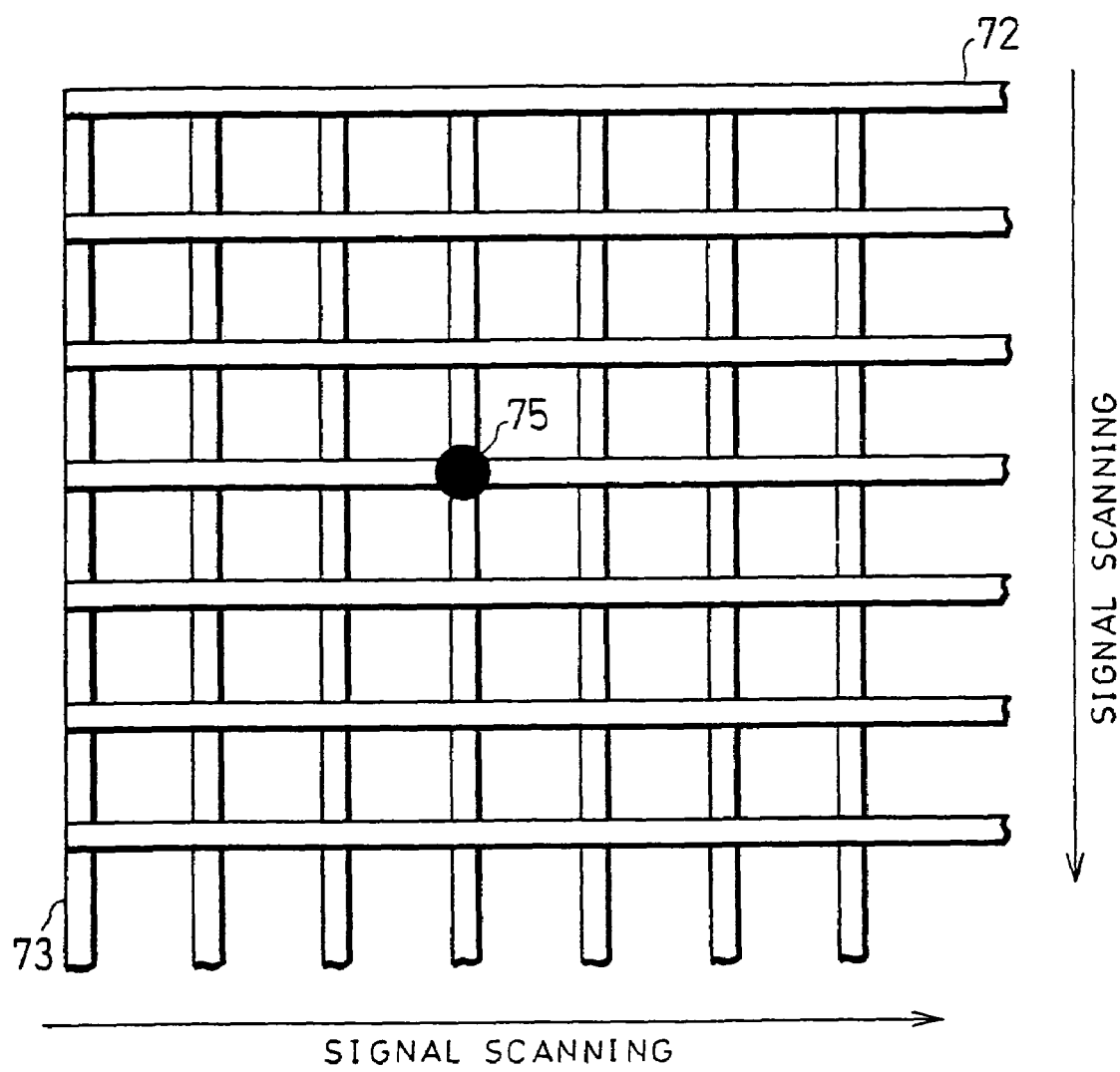
FIG. 25 is a plan view that shows a construction for detecting coordinates of a position on which a pen is pressed in the touch panel.

The drawing shown at the lower part of FIG. 24 is a plan view that shows the shape of the reflective electrode 73, when viewed from the normal direction to the flat portions 21 of the light-directing body 24. As illustrated in FIG. 24, since the reflective electrode 73 is placed over the entire surface of the slanting portions 22 of the light-directing body 24, it is formed a striped shape when viewed in the normal direction to the flat portions of the light-directing body 24. Further, as illustrated in FIG. 25, the transparent electrode 72, formed on the optical compensating plate 64, is also formed into a striped shape; thus, the reflective electrode 73 and the transparent electrode 72 are orthogonal to each other, forming a matrix shape.

Moreover, plastic beads spacers (not shown) having a particle-diameter of 10 μm are scattered between the reflective electrode 73 of the light-directing body 24 and the transparent electrode 72 of the optical compensating plate 64 so that a space that is virtually equal to the particle-diameter is formed.

Figure 26:
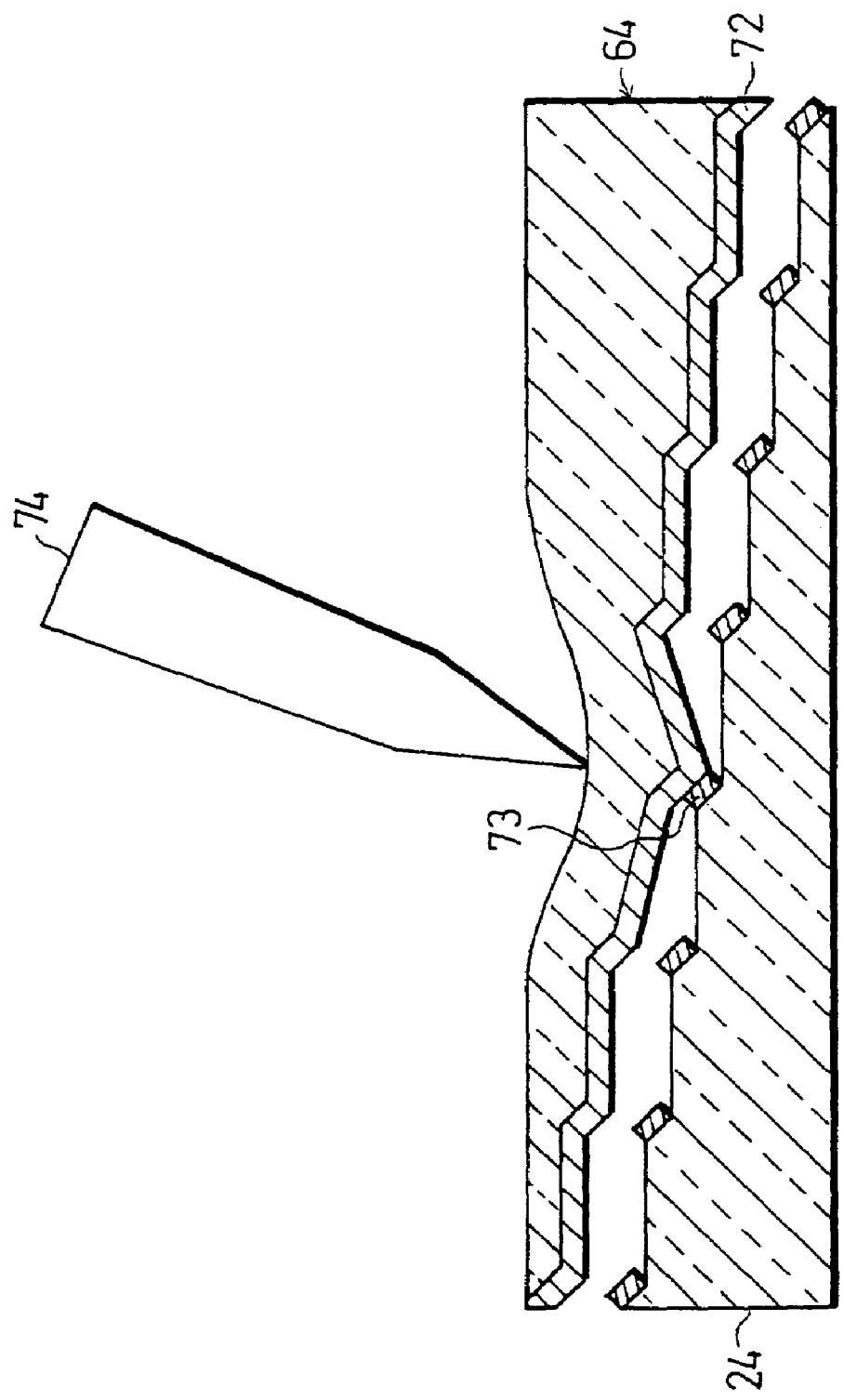
FIG. 26 is a cross-sectional view showing a state in which one portion of the touch panel is depressed by the pen.

The optical compensating plate 64 is flexible so that, as illustrated in FIG. 26, when pressed by a pen 74, the transparent electrode 72 and the reflective electrode 73 are allowed to contact. The coordinates of a position pressed by the pen 74 are recognized as follows: As illustrated in FIG. 25, by carrying out signal scanning on the transparent electrode 72 and the reflective electrode 73 in a line-sequential manner, the X-coordinate and the Y-coordinate of a contact point 75 are detected, with the result that the coordinates of the position pressed by the pen 74 are specified within the plane of the touch panel.

Additionally, in this embodiment, an explanation was given by exemplifying a case in which the striped transparent electrode 72 was formed on the optical compensating plate 64; however, the transparent electrode may be formed over the entire bottom surface 64a of the optical compensating plate 64. However, the striped transparent electrode 72, formed as described above, is more advantageous in that it provides a higher efficiency of use of light.

As described above, in the arrangement of the present embodiment, since the optical compensating plate 64 functions as a touch panel, it is possible to provide a reflection-type LCD that allows pen-entry with respect to the contents displayed on the liquid crystal cell 10.

As described above, in the reflection-type liquid crystal display of the present invention which is a reflection-type liquid crystal display provided with the front-illuminating device described in Embodiment 5 in front of the reflection-type liquid crystal element having a reflective plate, the compensating means has a flexibility in response to a predetermined pressure, and a pair of position-detecting means, which detect a position on which pressure is applied by contacting each other, are installed on the compensating means and the second light-releasing surface respectively.

Therefore, in the above-mentioned arrangement, the front-illuminating device functions as a so-called touch panel. In other words, when a certain position on the surface of the compensating means is pressed by, for example, a pen, the compensating means is distorted so that the paired position-detecting means, installed on the compensating means and the second light-releasing surface respectively, are allowed to contact each other at the above-mentioned position. By allowing the position-detecting means to recognize the position as coordinates, it becomes possible to achieve a reflection-type liquid crystal display that enables pen-entry with respect to the contents displayed on the liquid crystal cell 10.

Moreover, in the reflection-type liquid crystal display of the present invention having the above-mentioned arrangement, the reflection-type liquid crystal element has scanning lines, the position-detecting means have transparent electrodes that are formed on the flat portions of the second light-releasing portions, the pitch of the scanning lines and the pitch of the transparent electrodes are virtually equal, and the transparent electrodes are placed above the scanning lines.

Therefore, in the above-mentioned arrangement, the transparent electrodes of the position-detecting means can be placed on the pixel region on which display is actually carried out on the liquid crystal element. As a result, the resolution of the touch panel and the resolution of the liquid crystal element are set equal to each other. The resulting effect is that upon inputting through the touch panel, conformity between the input image and a displayed image can be improved.

Embodiment 7

Referring to Figures, the following description will discuss still another embodiment of the present invention. Here, those members that have the same functions and that are described in the aforementioned Embodiments are indicated by the same reference numerals and the description thereof is omitted.

Figure 27:
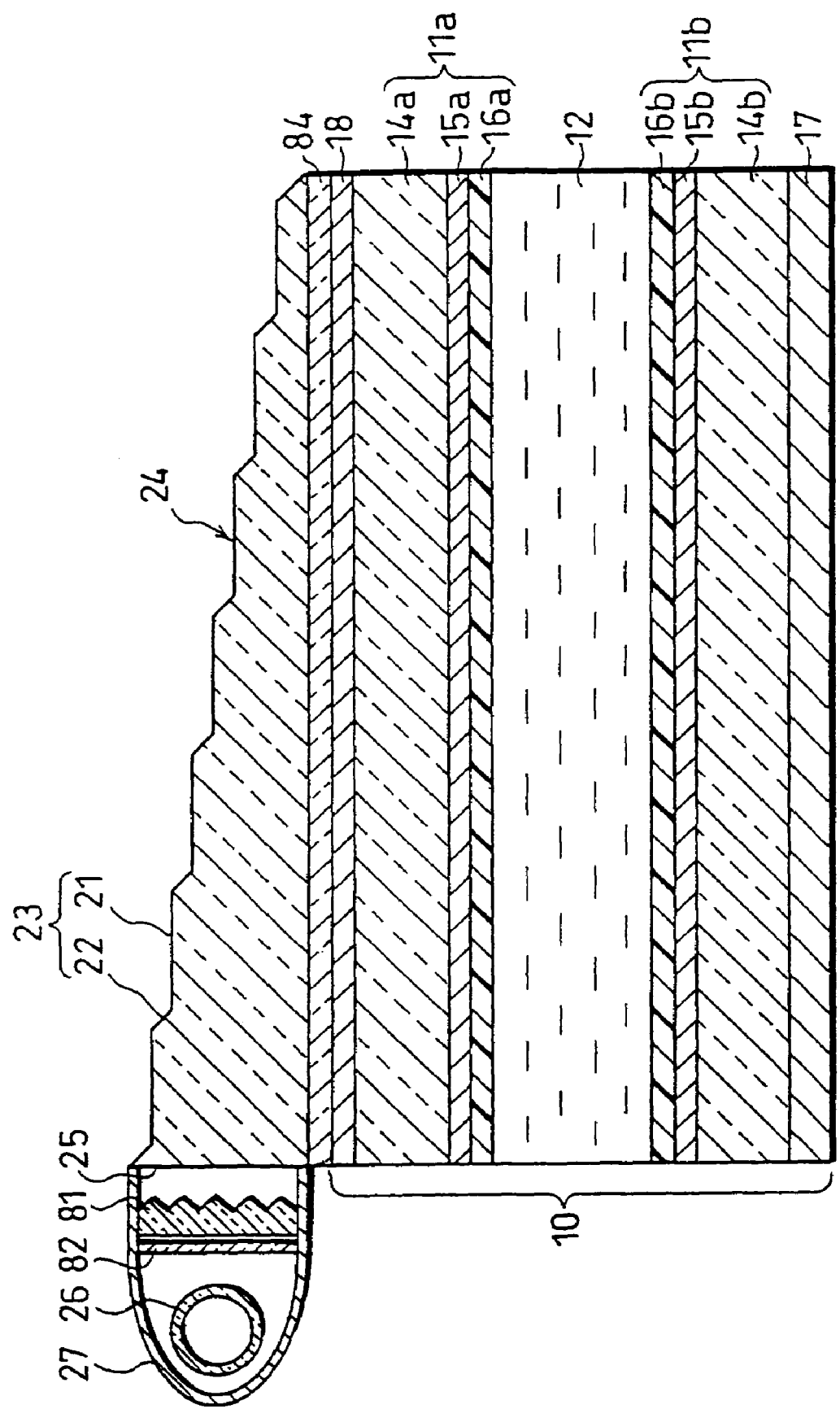
FIG. 27 is a cross-sectional view that shows a construction of a reflection-type LCD in accordance with still another embodiment of the present invention.

As illustrated in FIG. 27, the front light installed in the reflection-type LCD of the present embodiment is characterized in that in addition to the construction explained in Embodiment 1, it has a prism sheet 81 and a diffusing plate 82 that serve as a light-controlling means for controlling the angle of spread of light that is made incident on the incident surface 25 from the light source 26 and that are placed between the light source 26 and the incident surface 25 of the light-directing body 24. Here, in this case, the apex angle of the prism of the prism sheet 81 is set at 100°. Moreover, the gap between the light-directing body 24 and the polarizing plate 18 of the liquid crystal cell 10 is filled with filler 84 for alleviating the difference between the refractive indexes.

Here, the light source 26 is formed by, for example, a florescent tube, and the output light from the florescent tube does not particularly have directivity, and is randomly generated. For this reason, there are light rays that are made incident on the slanting portions 22 of the light-directing body 24 with angles greater than the critical angle, resulting in leakage light from the slanting portions 22, which might cause degradation in the display quality.

Taking it into consideration that PMMA, preferably used as the material of the light-directing body 24, has a refractive index of approximately 1.5, light rays whose incident angles onto the slanting portions 22 are not more than the critical angle (approximately 42°) form leakage light. In order to eliminate such leakage light, the angle of spread of the output light from the light source 26 is preliminarily controlled so that the light rays that are to form leakage light are not made incident on the light-directing body 24.

Figure 28:
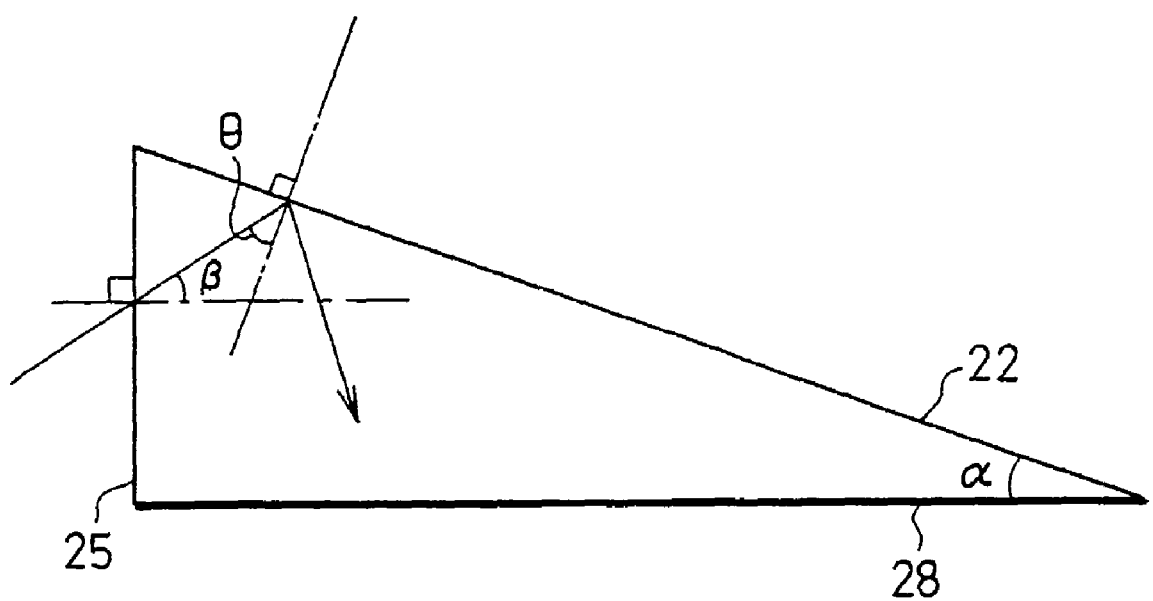
FIG. 28 is an explanatory drawing that shows conditions under which light, made incident on the incident surface, is totally reflected by the slanting portions in the light-directing body of the reflection-type LCD of FIG. 27.

Here, as illustrated in FIG. 28, it is supposed that the angle of inclination of the slanting portions 22 with respect to the interface 28 is $\alpha$. Additionally, in FIG. 28, for convenience of explanation, the positional relationships among the slanting portions 22, the interface 28 and the incident surface 25 in the light-directing body 24 are extracted so as to show them; and in fact, the light-directing body 24 is not necessarily formed into such a shape.

Further, supposing that the angle of spread of light that is made incident on the incident surface 25 of the light-directing body 24 is in the range of $\pm\beta$, and that the critical angle of the slanting portions 22 is $\theta_C$, the incident angle $\theta$ of the light onto the slanting portions 22 is represented as follows:

$$\theta = 90° - \alpha - \beta.$$

Therefore, conditions required for preventing the light made incident on the slanting portions 22 from the incident surface 25 from passing through the slanting portions 22 are represented by:

$$\theta_C < \theta = 90° - \alpha - \beta,$$

that is, $$\beta < 90° - (\theta_C + \alpha). \tag{Inequality 3}$$

Here, in the present embodiment, it is supposed that the angle $\alpha$ of inclination of the slanting portions 22 is 10°. Based upon this value and the value 42° of the critical angle $\theta_C$, $\beta < 38°$ is obtained from Equation 3.

Figure 29:
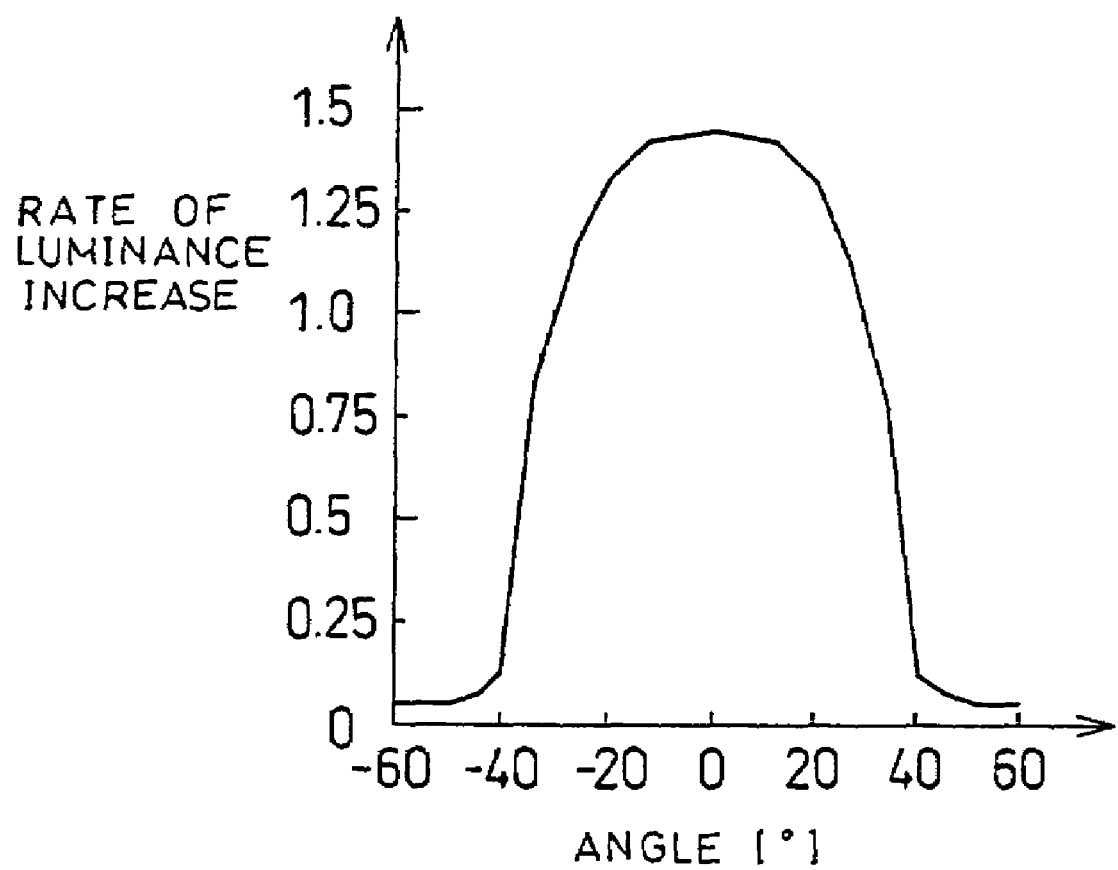
FIG. 29 is a graph that indicates the light-converging characteristic of a prism sheet installed in the reflection-type LCD of FIG. 27.

The output light from the light source 26 is first diffused by the diffusing plate 82, and then made incident on the prism sheet 81. The prism sheet 81 has a function for converging diffused light within a predetermined angle range; and in the case of a prism apex angle of 100°, the diffused light is converged within an angle range of approximately ±40° as shown in FIG. 29. The light, converged within the angle range of approximately ±40°, is further converged by the refraction of the incident surface 25 when made incident on the light-directing body 24 so that it forms light spreading within a range of approximately ±25.4°. In other words, the angle of spread of light that is made incident on the incident surface 25 is sufficiently restricted within the range of β<38°, which indicates that no leakage light is generated from the slanting portions 22.

In this manner, the reflection-type LCD of the present embodiment, which has the prism sheet 81 placed between the light source 26 and the incident surface 25 of the light-directing body 24 so as to suppress the spread of the light-source light, eliminates leakage light from the slanting portions 22, thereby further improving the display quality.

Figure 30A:
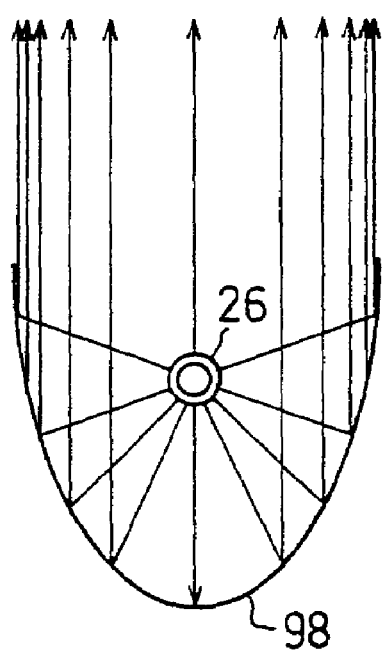
FIGS. 30(*a*) and 30(*b*) are explanatory drawings that show other structural examples applicable to the reflection-type LCD of FIG. 27 so as to restrict incident light from spreading.
Figure 30B:
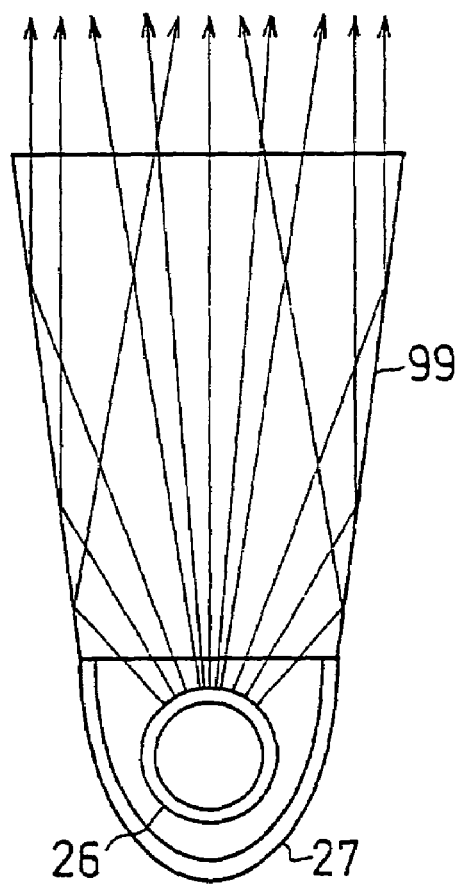

Additionally, in the present embodiment, the apex angle of the prism sheet 81 is set at 100°; however, the angle is not necessarily limited to this angle. Further, the prism sheet 81 is used as the light-controlling means for restricting the spread of the light-source light; however, not limited to this member, for example, a collimator, etc. may be used, as long as the same effect can be obtained. Moreover, as illustrated in FIG. 30(*a*), the surrounding portion of the light source 26 may be covered with an ellipsoidal mirror 98, and the light source 26 may be placed at the focus of the ellipsoidal mirror 98; this arrangement also provides the same effect. Furthermore, as described in SID DIGEST P. 375(1995), a light pipe 99, as shown in FIG. 30(*b*), may be used to restrict the spread of illuminating light from the light source 26.

As described above, the front-illuminating device of the present invention is further provided with the light-controlling means for restricting the spread of light from the light source that is placed between the light source and the incident surface.

The light rays from the light source are mainly reflected by the slanting portions of the second light-releasing surface, and in order to reduce the components that are not totally reflected by the slanting portions and leak outside the light-directing body, it is preferable to allow the light rays from the light source to have directivity to a certain extent so as to reduce those components that are made incident on the slanting portions with angles smaller than the critical angle. Thus, the above-mentioned arrangement, which has the light-controlling means for restricting the spread of light from the light source, reduces leakage light from the slanting portions, thereby further improving the efficiency of use of light and preventing blurredness and fogs in the image of the object to be illuminated. Consequently, it is possible to achieve a front-illuminating device that serves as a surface light source for providing a bright, sharp image of the object to be illuminated.

In the above-mentioned arrangement of the front-illuminating device of the present invention, the light-controlling means limits the spread of light from the light source to a range in which the incident angles of the light rays directly made incident on the slanting portions of the second light-releasing surface from the incident surface are made greater than the critical angle.

For this reason, the above-mentioned arrangement makes it possible to eliminate those components that are made incident with angles smaller than the critical angle among light rays that are directly made incident on the slanting portions from the incident surface, by allowing the light-controlling means to restrict the spread of the light rays from the light source. This makes it possible to reduce leakage light from the slanting portions, thereby further improving the efficiency of use of light and preventing blurredness and fogs in the image of the object to be illuminated. Consequently, it is possible to achieve a front-illuminating device that serves as a surface light source for providing a bright, sharp image of the object to be illuminated.

Moreover, the front-illuminating device of the present invention is further provided with the light-controlling means that is placed between the light source and the incident surface and that restricts the spread of light rays from the light source within a range in which those components directly made incident on the first light-releasing surface of the first light-directing body from the incident surface are virtually eliminated.

With the above-mentioned arrangement, since the filler, which alleviates the difference of refractive indexes occurring in the optical interface between the first light-directing body and the second light-directing body, is injected, those components made incident on the second light-directing body after passing through the first light-releasing surface are increased among light rays that are directly made incident on the first light-releasing surface from the light source, as compared with the case in which an air layer is located between the first light-directing body and the second light-directing body. Among these components, there are some components that are made incident on the second light-directing body with comparatively great incident angles so that they do not contribute to the illumination of the object to be illuminated. For this reason, in the above-mentioned arrangement, by allowing the light-controlling means to restrict the spread of light rays from the light source, it is possible to eliminate most of the components directly made incident on the first light-releasing surface among those components made incident on the light-directing bodies from the incident surfaces. Thus, it becomes possible to reduce those components that are made incident on the second light-directing body from the first light-releasing surface with comparatively great incident angles. As a result, it is possible to further improve the efficiency of use of light, and consequently to achieve a brighter front-illuminating device.

Embodiment 8

Referring to Figures, the following description will discuss still another embodiment of the present invention. Here, those members that have the same functions and that are described in the aforementioned Embodiments are indicated by the same reference numerals and the description thereof is omitted.

In the reflection-type LCD of the present embodiment that is any of the reflection-type LCDs described in the aforementioned embodiments, the gap between the front light (or the front-light system) and the liquid crystal cell 10 is filled with filler (matching agent) for preventing attenuation of light due to the difference in refractive indexes.

Here, an explanation will be given by exemplifying a case in which the filler is applied to the reflection-type LCD described in Embodiment 1. As explained with reference to FIG. 1, the light-directing body 24 of the front light 20 is stacked on the polarizing plate 18 of the liquid crystal cell 10 with spacers having a particle-diameter of 50 μm interpolated in between. Thus, the space 29 is formed with a uniform thickness that is virtually equal to the particle-diameter of the spacers between the liquid crystal cell 10 and the light-directing body 24.

Figure 32:
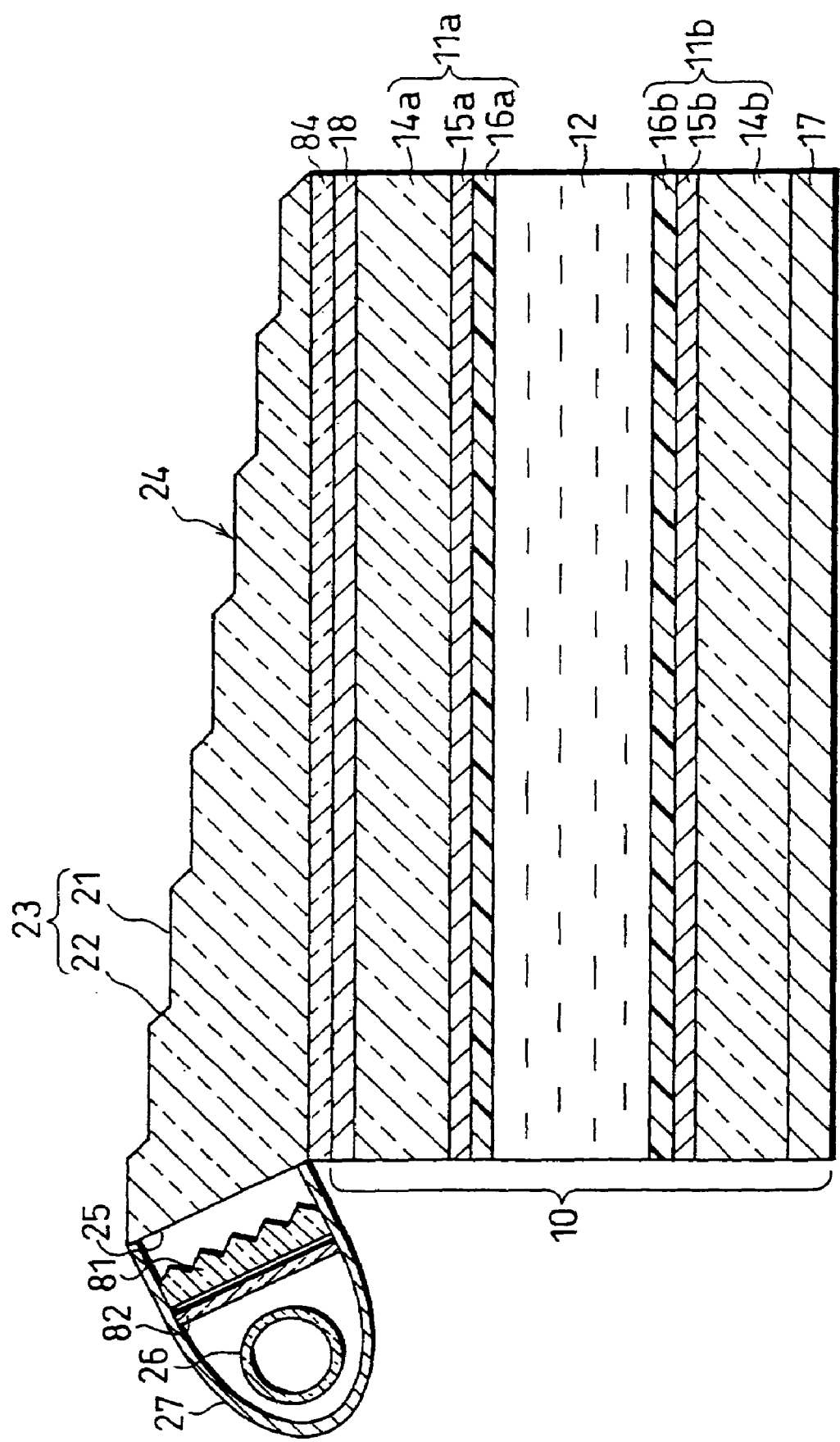
FIG. 32 is a cross-sectional view that shows a construction of a reflection-type LCD in accordance with still another embodiment of the present invention.

In the reflection-type LCD of the present embodiment, as illustrated in FIG. 32, the space 29 is filled with the filler 84. Here, with respect to the filler 84, for example, UV-curing resins or methyl salicylate may be used. Thus, the interface 28 of the light-directing body 24 is made contact not with air, but with the filler 84 having a refractive index higher than air. The filler 84 is preferably set so as to have a refractive index virtually equal to the refractive index of the light-directing body 24.

Behaviors of light at the interface 28 are different depending on cases where the interface 28 of the light-directing body 24 contacts the filler 84 as described above and where the interface 28 of the light-directing body 24 contacts air as described in the aforementioned embodiments.

Figure 31A:
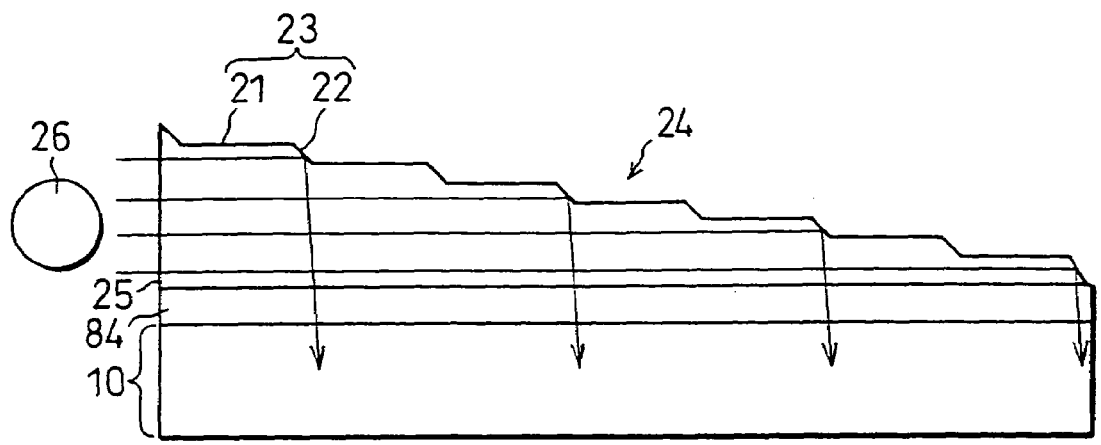
FIGS. 31(*a*), 31(*b*) and 31(*c*) are cross-sectional views that show constructions of light-directing bodies, as well as behaviors of light inside the light-directing bodies, that are installed in a reflection-type LCD in accordance with still another embodiment of the present invention.

As illustrated in FIG. 31(a), among incident light rays from the light source 26, those components, which are made incident virtually perpendicularly on the incident surface 25, are made incident on the liquid crystal cell 10 through the interface 28 and the filler 84, after having been directly made incident on the slanting portions 22 from the incident surface 25 and then reflected. In this case, the behaviors of the light rays at the interface 28 are the same as those in the case in which the interface 28 is made contact with air (see FIG. 3(a)).

Figure 31B:
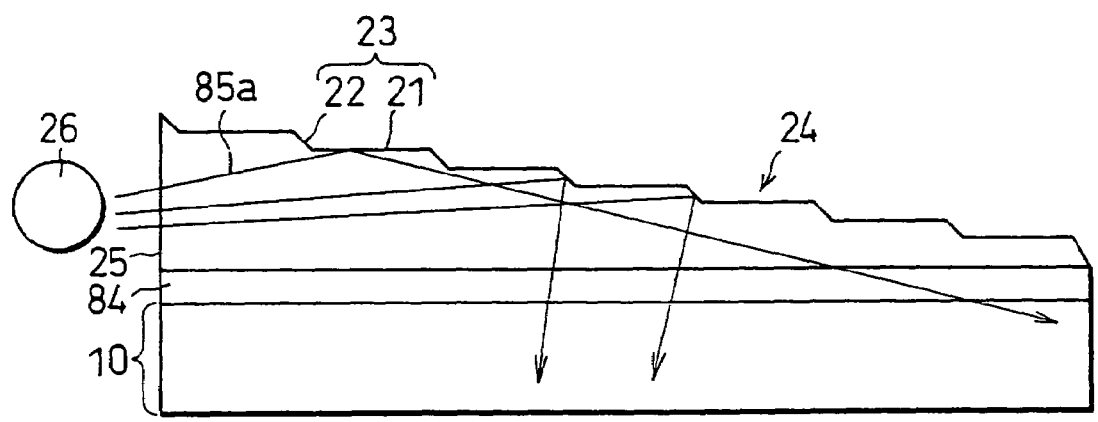
Figure 31C:
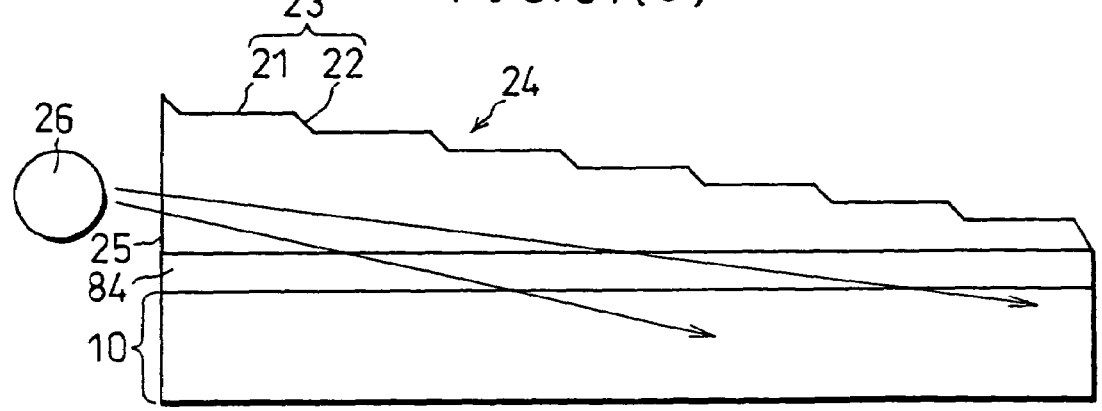

As illustrated in FIG. 31(b), among the incident light rays from the light source 26, of those components first made incident on the incident surface 25, some components are made incident on the interface 28 after having been reflected by the flat portions 21 as a light ray 85a. Such a light ray 85a and those components first made incident on the interface 28 from the incident surface 25 among the incident light rays from the light source 26, as illustrated FIG. 31(c), are allowed to pass without being affected by the interface 28 since the interface 28 is made contact with the filler 84 having a refractive index virtually equal to that of the light-directing body 24.

These light rays are made incident on the liquid crystal layer 12 of the liquid crystal cell 10 with very large incident angles; however, since they are reflected by the reflective plate 17 and again made incident on the interface 28 of the light-directing body 24 with the above-mentioned large incident angles, they do not reach the observer.

However, in order to improve the efficiency of use of the light-source light, it is preferable to eliminate the components directly made incident on the interface 28 from the light source 26. For this reason, as illustrated in FIG. 32, the components directly made incident on the interface 28 from the light source 26 can be eliminated by inclining the incident surface 25 so that the incident surface 25 and the interface 28 make an obtuse angle.

Figure 33:
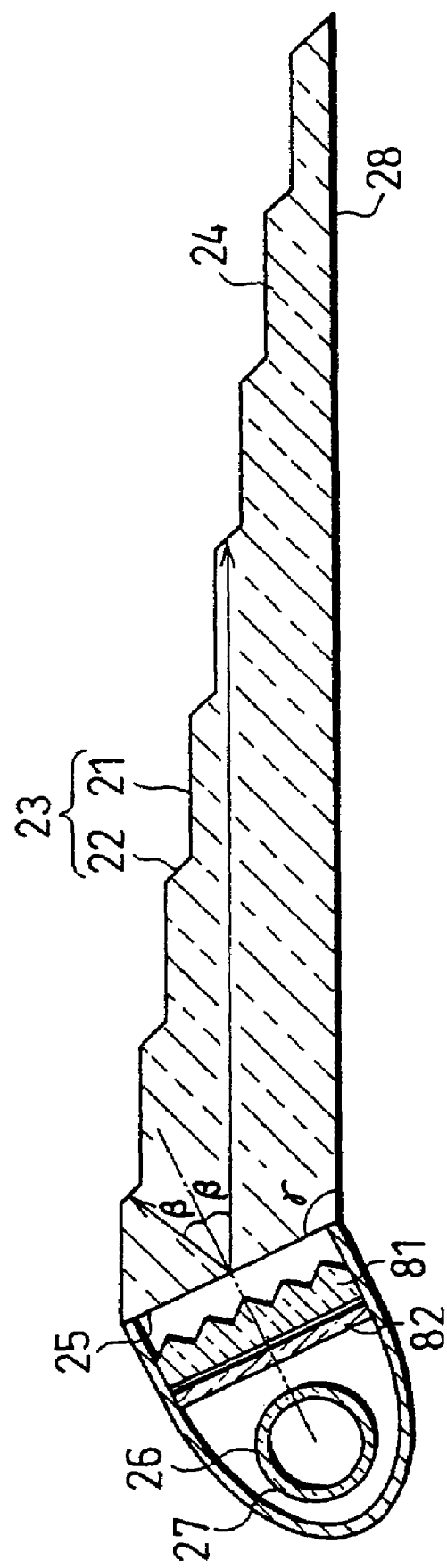
FIG. 33 is an explanatory drawing that indicates conditions required for the angle of inclination of the incident surface of the front light of the reflection-type LCD shown in FIG. 32.

Here, as illustrated in FIG. 33, taking into consideration the angle of expansion $\beta$ of light from the light source 26 after it has been made incident on the incident surface 25, the size of the angle $\gamma$, made by the incident surface 25 and the interface 28, is preferably set so as to satisfy the following inequality:

$$\gamma \geq 90°+\beta.$$

Thus, almost all the light-source light rays made incident on the incident surface 25 are directed toward interface 23 so that the efficiency of the use of the light-source light is further improved.

As described above, in the front-illuminating device of the present invention, the filler for alleviating the difference of refractive indexes in the optical interface between the first and second light-directing bodies is injected between these light-directing bodies. Therefore, as compared with the case in which an air layer exists between the first light-directing body and the second light-directing body, attenuation of light due to reflection by the optical interface between the first light-directing body and the second light-directing body is suppressed. As a result, it is possible to further improve the efficiency of the use of the light-source light, and consequently to achieve a front-illuminating device serving as a brighter surface light source. Here, as described earlier, when the refractive index of at least one of the first light-directing body and the second light-directing body is set equal to the refractive index of the filler, the device becomes more effective, since the number of the optical interfaces between the first light-directing body and the second light-directing body can be reduced.

Moreover, in addition to the above-mentioned arrangement, the front-illuminating device of the present invention has an arrangement wherein the incident surface and the first light-releasing surface are set so as to make an obtuse angle. With this arrangement, since the incident surface and the first light-releasing surface are designed to have the obtuse angle, it is possible to reduce the light components directly made incident on the first light-releasing surface among the light-source light rays that have been made incident on the incident surface. Thus, it is possible to further improve the efficiency of the use of the light-source light, and consequently to achieve a front-illuminating device serving as a brighter surface light source.

Embodiment 9

Referring to Figures, the following description will discuss still another embodiment of the present invention. Here, those members that have the same functions and that are described in the aforementioned Embodiments are indicated by the same reference numerals and the description thereof is omitted.

The reflection-type LCD of the present embodiment is characterized in that the front light 20 is formed into a lid-like shape so as to be freely opened and closed with respect to the liquid crystal cell 10.

In the aforementioned embodiments, various modes of front lights serving as front-illuminating devices and front-light systems have been described; and particularly in the case when the metal reflective film 47 is placed on the slanting portions 22 of the light-directing body 24, like the arrangement as described in Embodiment 4, the metal reflective film 47 tends to block ambient light from being made incident on the light-directing body 24. For this reason, when the reflection-type LCD is used in a state where, although it's not so dark as to require the lighting mode, it's not so bright as to obtain sufficient ambient light in the reflection mode, the display in the reflection mode tends to become dark.

Figure 34:
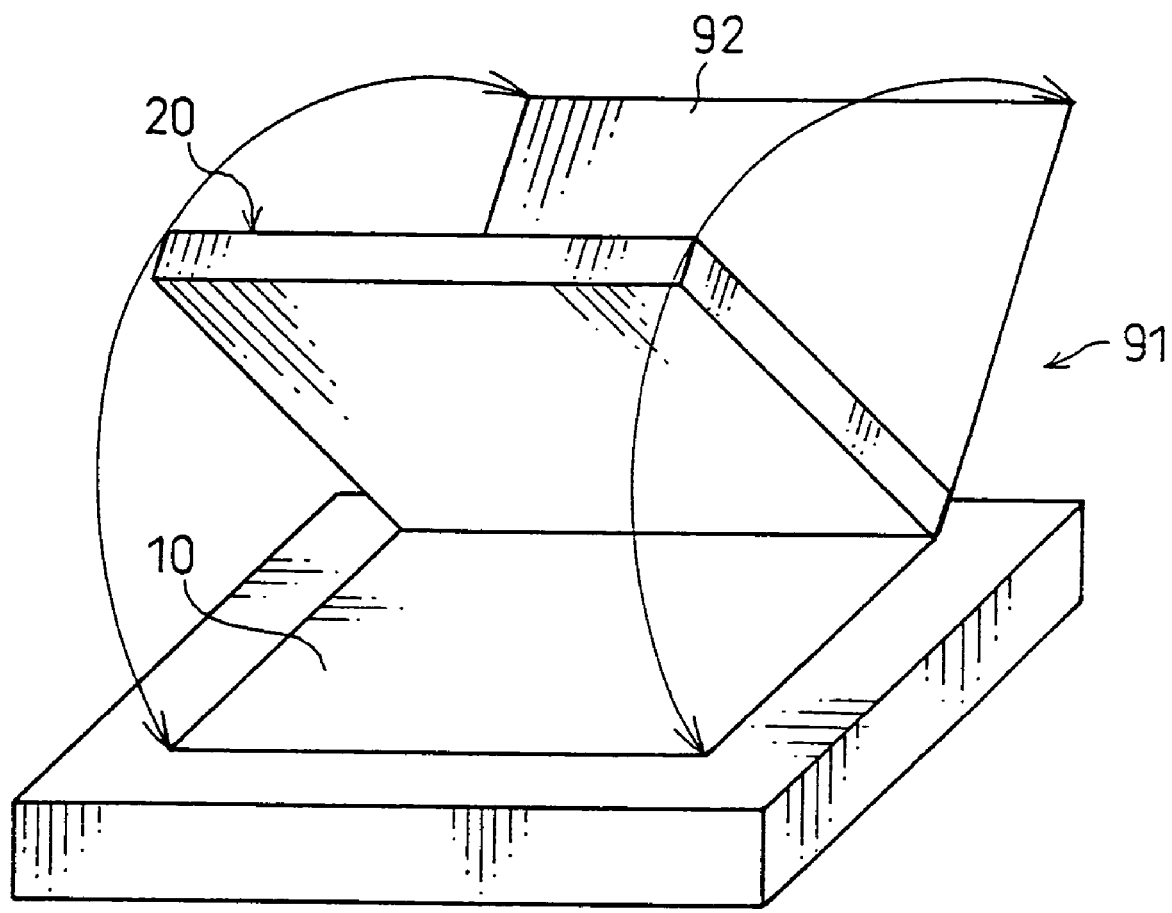
FIG. 34 is a perspective view showing a construction of a reflection-type LCD in accordance with still another embodiment of the present invention.

For this reason, as illustrated in FIG. 34, in the reflection-type LCD 91 of the present embodiment, the front light 20 is secured by, for example, a hinge (not shown) in its one side so as to be freely opened and closed with respect to the liquid crystal cell 10. The front light 20 is provided as an inside lid that can be opened and closed separately from a lid 92 that covers the liquid crystal cell 10 and the front light 20.

Therefore, when the LCD 91 is used in the lighting mode, it is used with the front light 20 being placed on the surface of the liquid crystal cell 10, that is, with only the lid 92 being opened, while when the LCD 91 is used in the reflection mode, it is used with the front light 20 being opened with respect to the liquid crystal cell 10.

This arrangement makes it possible to avoid loss of light due to the front light 20 in the case of use in the reflection mode, thereby achieving a reflection-type LCD that can always provide brighter display.

Additionally, the above-mentioned description exemplifies a case in which at least one portion of the front light 20 is secured to the liquid crystal display; however, a front light 20, which is provided as a completely separate unit, may be removably attached to the liquid crystal cell 10. In this case, however, it is necessary to take it into consideration how to keep the front light 20 that has been removed from the liquid crystal cell 10.

Moreover, in the present embodiment, an explanation has been given to the reflection-type LCD in which the front light in the inside lid form is installed; however, any of the front-light systems as explained in the aforementioned embodiments may be installed as an inside lid.

As described above, in the reflection-type liquid crystal display of the present invention, any of the front-illuminating devices as explained in the aforementioned Embodiments is attached to the reflection-type liquid crystal element so as to be freely opened and closed. Therefore, in this arrangement, when the reflection-type liquid crystal display is used with the front-illuminating device turned on, it is used with the front-illuminating device being placed on the liquid crystal element, and when the front-illuminating device is not required, it is used with the front-illuminating device being opened with respect to the liquid crystal element. Thus, in the case when the front-illuminating device is not required, the front-illuminating device is removed so as not to prevent ambient light from being incident; thus, it is possible to provide a reflection-type liquid crystal display that always achieves bright display.

Embodiment 10

Referring to Figures, the following description will discuss still another embodiment of the present invention. Here, those members that have the same functions and that are described in the aforementioned Embodiments are indicated by the same reference numerals and the description thereof is omitted.

The aforementioned Embodiments discussed reflection-type LCDs having arrangements in which front lights or front-light systems serving as the front-illuminating device and a reflection-type liquid crystal serving as the object to be illuminated are combined. However, the front lights or the front-light systems serving as the front-illuminating device of the present invention are not merely used in combination with the reflection-type liquid crystal cell. For example, as illustrated in FIG. 35, in the illuminating device 95 of the present embodiment, the front lights or the front-light systems, explained in the aforementioned embodiments, are formed as independent units so that they can illuminate various objects.

Figure 35:
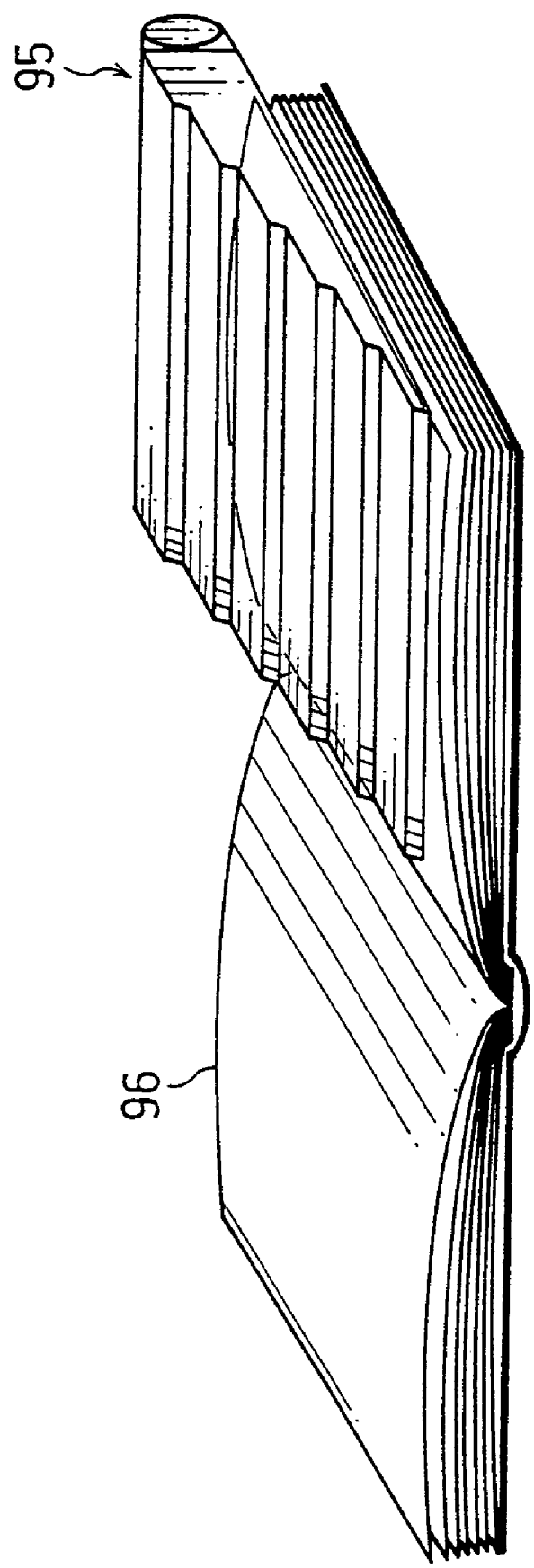
FIG. 35 is a perspective view showing an example of the use of an illuminating device in accordance with still another embodiment of the present invention.
Figure 36:
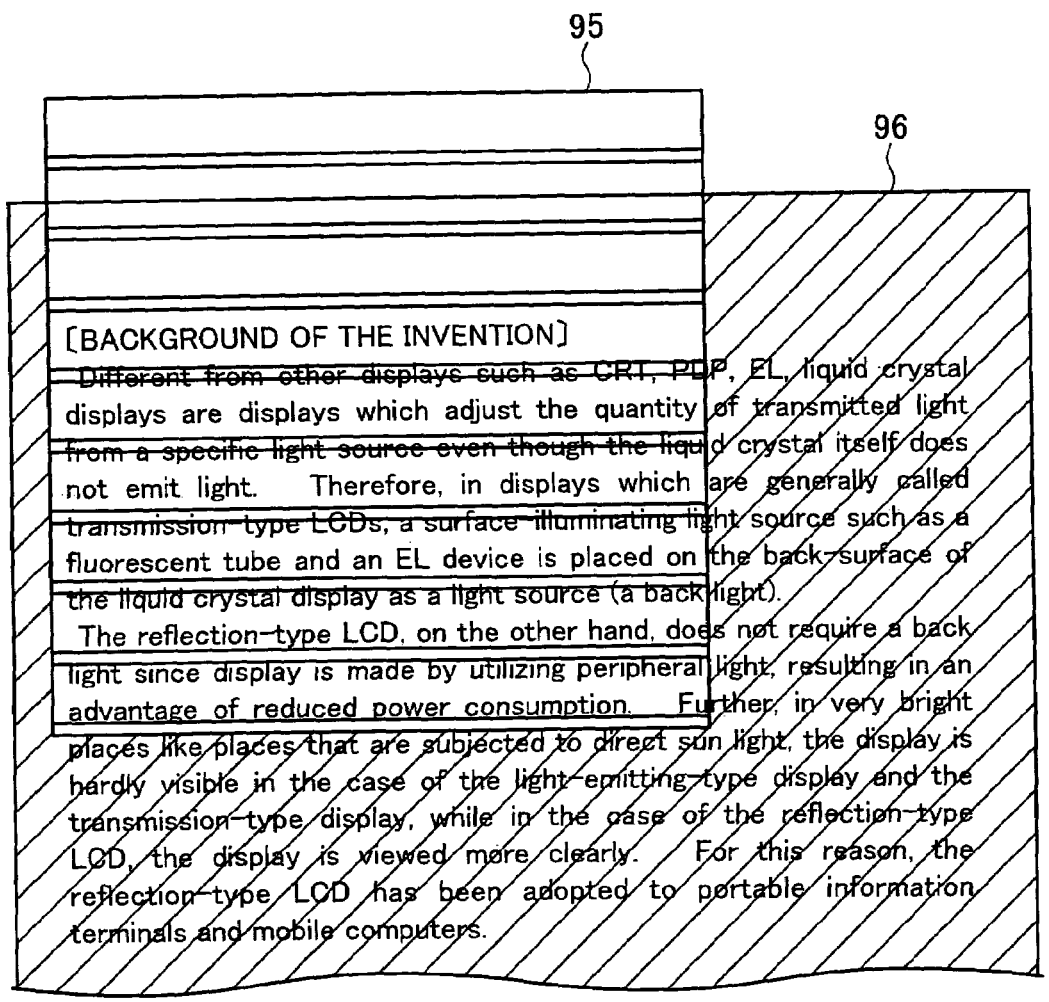
FIG. 36 is a plan view showing an example of the use of the illuminating device shown in FIG. 35.

For example, as illustrated in FIG. 35, the illuminating device 95 is placed over a book 96 when used. Thus, as illustrated in FIG. 36, since only the region virtually right under the illuminating device 95 can be illuminated, the resulting effect is that, for example, you can read a book in a bed room without bothering other people around you.

Additionally, the present invention is not intended to be limited by the above-mentioned embodiments; and various modifications can be made within the scope of the invention. For example, with respect to the material of the light-directing body, PMMA is specifically exemplified; however, other materials, such as, for example, glass, polycarbonate, polyvinyl chloride and polyester, may be used, as long as it can uniformly direct light without attenuation and has a refractive index of an appropriate value. Moreover, the aforementioned dimensions, etc. of the slanting portions and the flat portions of the light-directing body were merely given as one example, and they are freely designed within a range in which identical effects are obtained.

Moreover, with respect to the liquid crystal cell, various LCDs, such as passive-matrix-type LCDs and active-matrix-type LCDs, may be used. In the above-mentioned embodiments, a liquid crystal cell of the ECB mode (single-polarizing-plate mode), which uses one polarizing plate that serves both as a polarizer and as an analyzer, is adopted; however, another element, such as PDLCs and PC-GHs without using a polarizing plate, may be adopted.

As described above, the front-illuminating device of the present invention is not limited to the reflection-type liquid crystal display element as an object to be illuminated as exemplified in the aforementioned embodiments, but is generally applied to display media for recognizing display by utilizing illumination of external light. Therefore, in the arrangement for removably attaching the front-illuminating device to the reflection-type liquid crystal display, if the reflection-type liquid crystal display is not used, the front-illuminating device can be removed therefrom on demand so as to use it for another display medium.

Embodiment 11

Referring to Figures, the following description will discuss still another embodiment of the present invention. Here, those members that have the same functions and that are described in the aforementioned Embodiments are indicated by the same reference numerals and the description thereof is omitted.

Figure 37:
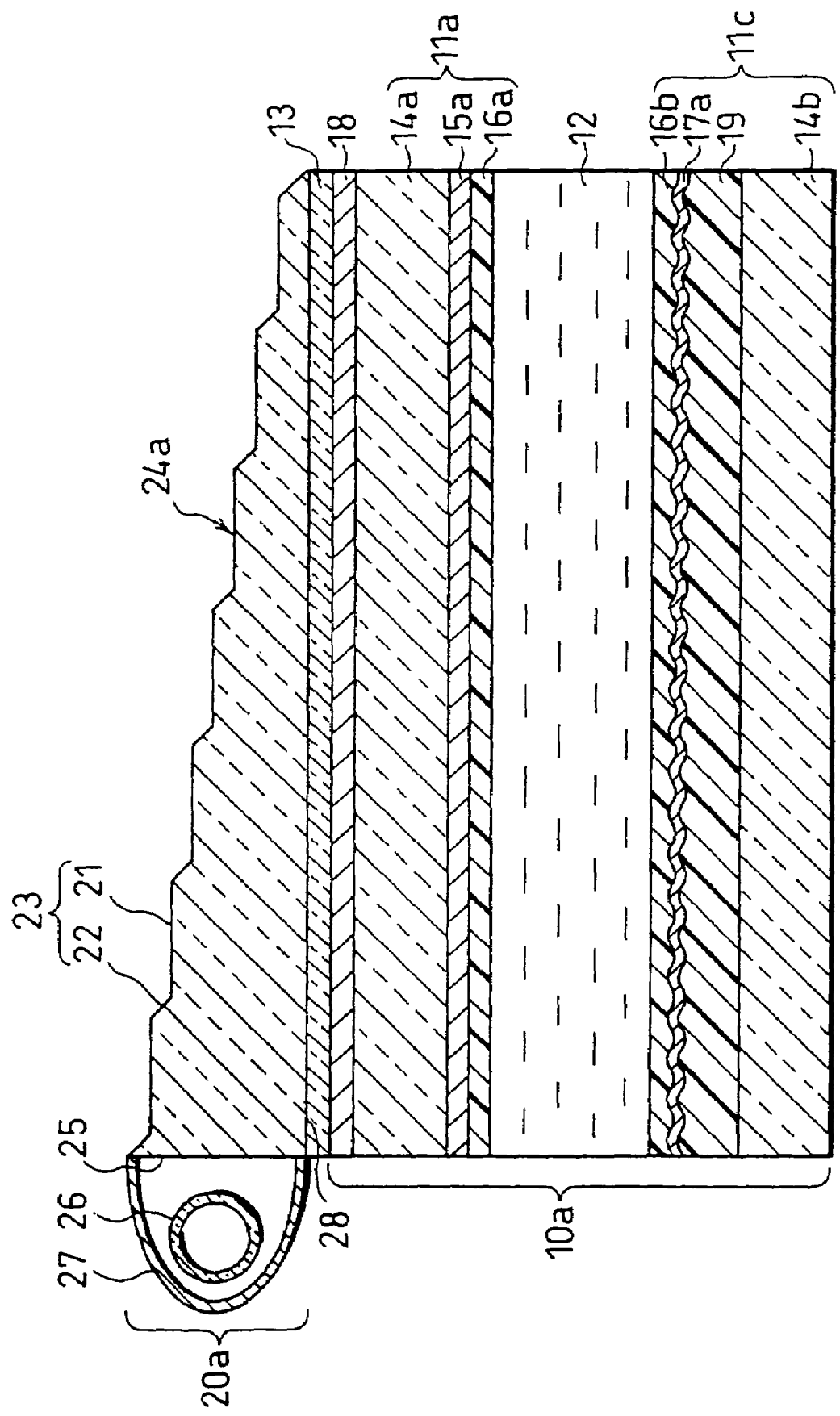
FIG. 37 is a cross-sectional view that shows a construction of a reflection-type LCD in accordance with still another embodiment of the present invention.

As illustrated in FIG. 37, the reflection-type LCD of the present invention is the same as the aforementioned Embodiment 1 in that the front light 20a is installed in front of the reflection-type liquid crystal cell 10a; however, it differs from the aforementioned Embodiment 1 in that an anti-reflection film (anti-reflection film) 13, which serves as a second light-directing body (an optical means), is placed between the reflection-type liquid crystal cell 10a and the front light 20a, in that the widths (the pitches) of the flat portions 21 and the slanting portions 22 formed in the light-directing body 24 are different, and in that a reflective electrode (a reflective plate) 17a is formed inside the reflection-type liquid crystal cell 10a.

First, an explanation will be given of the front light 20a more specifically. The front light 20a is mainly constituted by the light source 26 and the light-directing body 24a in the same manner as Embodiment 1, and the light source 26, which is a line-shaped light source covered with a reflection mirror 27, is placed in a manner so as to contact the incident surface 25 of the light-directing body 24.

The interface (the first light-releasing surface) 28 on the liquid crystal cell 10a side of the light-directing body 24 is formed into a flat shape, and an interface (a second light-releasing surface) 23 facing this interface is formed such that flat portions 21, formed in parallel with or virtually in parallel with the interface 28, and slanting portions 22, inclined with a constant angle in the same direction with respect to the flat portions 21, are alternately placed thereon.

In this manner, as illustrated in FIG. 37, the light-directing body 24a is formed into a step shape that lowers as the distance from the light source 26 increases in a cross-section whose normal corresponds to the length direction of the light source 26, in the same manner as the aforementioned Embodiment 1.

Figure 38:
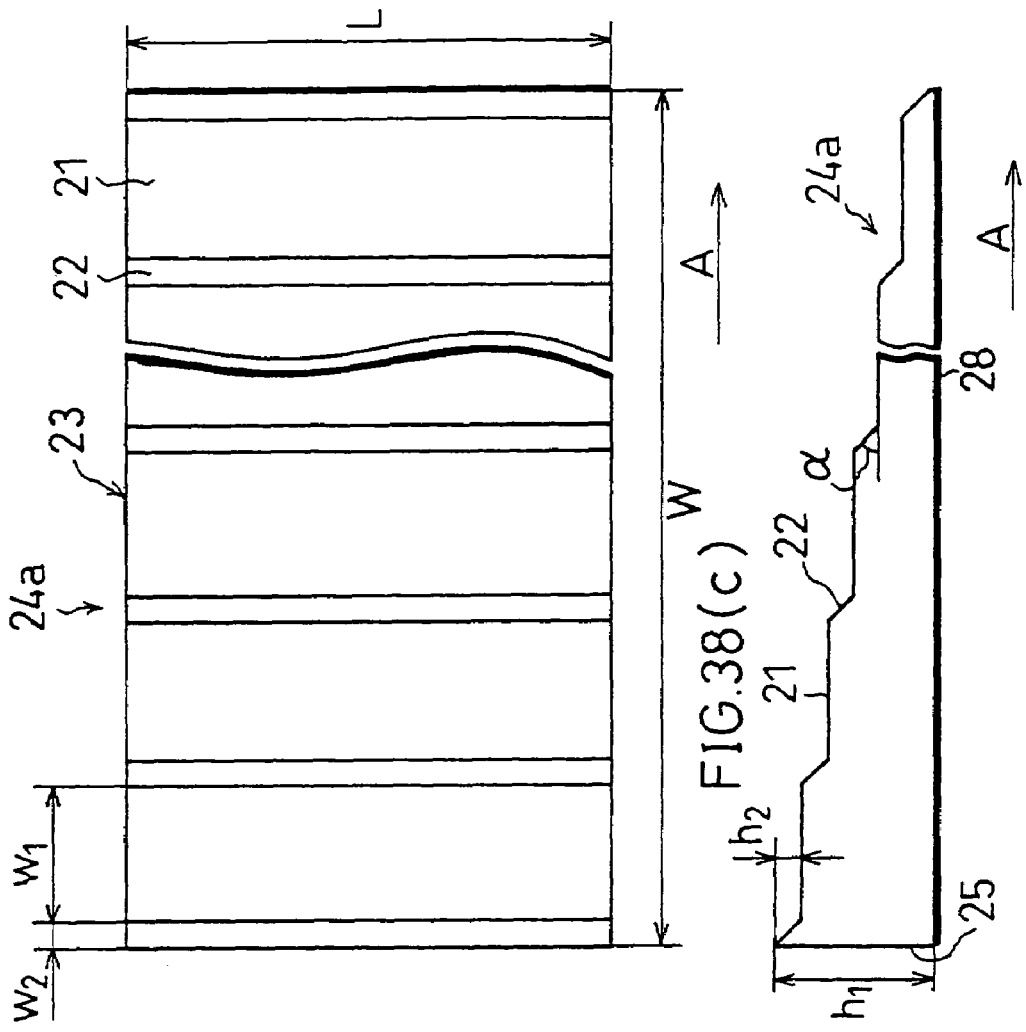
FIGS. 38(*a*), 38(*b*) and 38(*c*) show a shape of a light-directing body of a front light that is installed in the reflection-type LCD of in FIG. 37.

Referring to FIGS. 38(a) through 38(c), an explanation will be given of the shape of the light-directing body 24a in more detail. FIG. 38(a) is a plan view in which the light-directing body is viewed from above in the normal direction to the incident surface; FIG. 38(b) is a side view in which the light-directing body is viewed in the normal direction to the incident surface; and FIG. 38(c) is a cross-sectional view in which the light-directing body is sliced with a cross section whose normal line corresponds to the length direction of a light source.

In the present embodiment, an acryl plate is used as the material of the light-directing body 24a, and the acryl plate is metal-molded so that the light-directing body 24a is formed into a step shape. In the present embodiment, the dimensions of the light-directing body 24a are: the width W=75 mm, the length L=170 mm, the thickness $h_1$ of the incident-surface 25 portion=2.0 mm, and the width $w_1$ of the flat portions 21=0.2 mm. Moreover, the width $w_2$ of the slanting portions is set at approximately 10 μm with the following dimensions: the step gap $h_2$ of the slanting portions 22=10 μm, and each angle α with respect to the flat portions 21=45°.

Here, it is preferable to set the width $w_2$ of the slanting portions 22 smaller than the width $w_1$ of the flat portions 21. In other words, it is preferable to satisfy the relationship, $w_2<w_1$. Moreover, it is preferable to set the ratio $w_2/w_1$ of the width $w_2$ of the slanting portions 22 to the width $w_1$ of the flat portions 21 in the range from not less than 0.01 to not more than 0.20 ($0.01 \leq w_2/w_1 \leq 0.2$). This arrangement allows the observer to view images mainly on the flat portions 21, thereby making it possible to eliminate double images.

Moreover, in the present embodiment, the addition $w_3$ ($=w_1+w_2$) of the width $w_1$ of the flat portions 21 and the width $w_2$ of the slanting portions 22 in the light-directing body 24a is preferably set in the range from not less than 0.05 mm to not more than 1.0 mm ($0.05 \text{ mm} \leq w_3 \leq 1.0 \text{ mm}$). This arrangement allows the roughness of the periodic construction consisting of the flat portions 21 and the slanting portions 22 formed on the interface 23 of the light-directing body 24a to become less conspicuous, and also prevents light diffraction.

Further, in the present embodiment, the light-directing body 24a is designed so that the sum $w_3$ (=0.21 mm) of the width $w_1$ of the flat portions 21 and the width $w_2$ of the slanting portions 22 is gradually decreased toward the incident surface 25, that is, in the departing direction from the light source 26. In other words, the ratio $w2/w1$ of the width $w2$ of the slanting portions 22 to the width $w1$ of the flat portions 21 is allowed to increase as it departs from the light source 26. With respect to the construction of the flat portions 21 and the slanting portions 22, an explanation will be given in more detail with reference to FIG. 39 in addition to FIGS. 38(a) through 38(c). Here, in the light-directing body 24a, the direction which is orthogonal to the length direction of the light source 26, that is, the departing direction from the light source 26, is defined as the first direction, and indicated by arrow A in the Figures.

Figure 39:
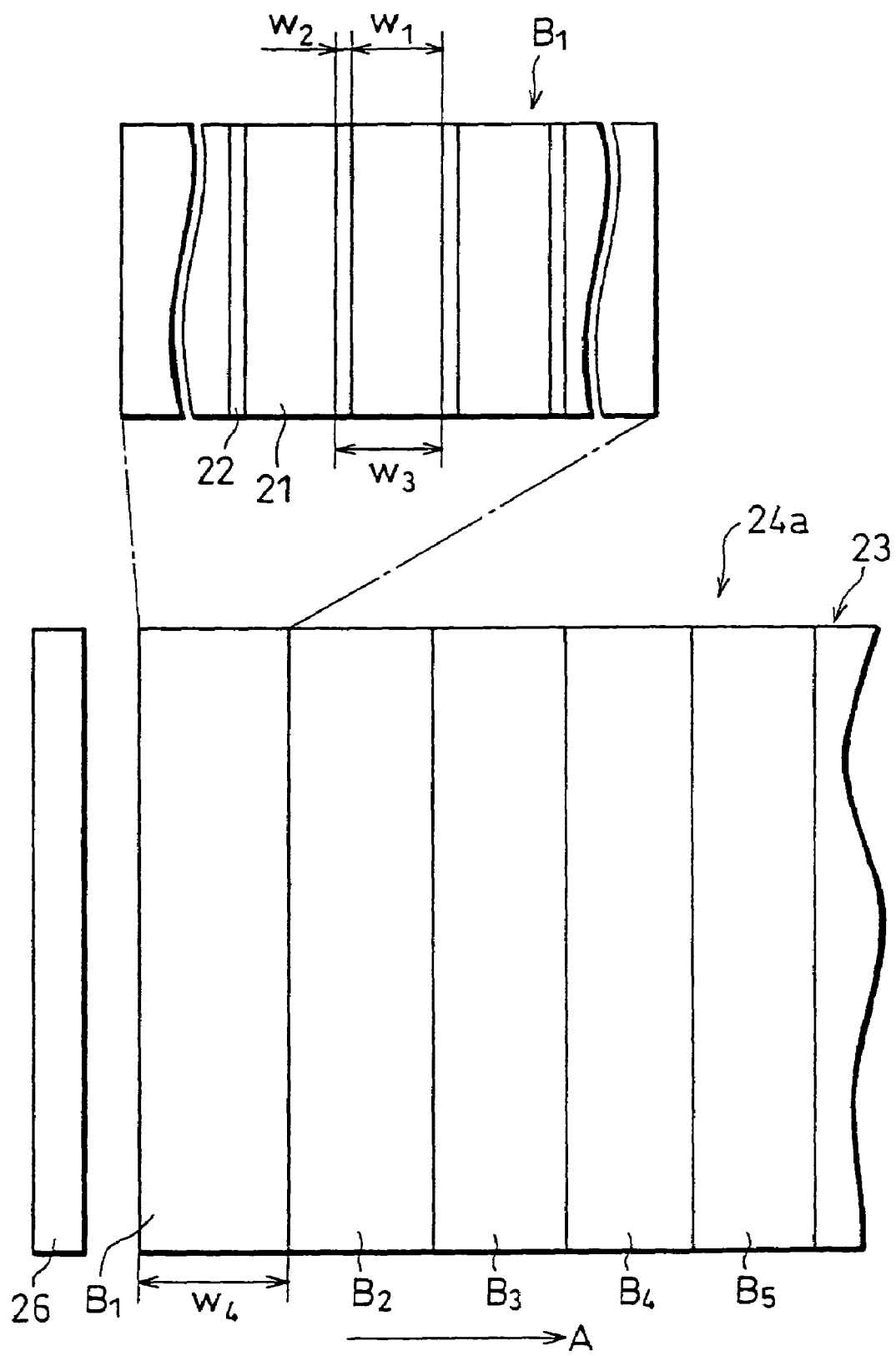
FIG. 39 is an explanatory drawing that indicates the construction of flat portions and slanting portions in the light-directing body shown in FIG. 38.

As illustrated in FIG. 39, a pair is formed by combining each flat portion 21 and each slanting portion 22 one by one, and 100 pairs of the flat portions 21 and the slanting portions 22 from the side closest to the light source 26 is defined as the first block $B_1$. Then, the interval $w_4$ in the first block $B_1$ in the direction along the first direction is set to 21 mm.

The interval $w_4$ of the second block $B_2$ that is a block of the next 100 pairs is set to 20 mm. Moreover, the interval $w_4$ of the third block $B_3$ is set to 19 mm, the interval $w_4$ of the fourth block $B_4$ is set to 18 mm, and the interval $w_4$ of the fifth block $B_5$ is set to 17 mm.

Therefore, in the present embodiment, the light-directing body 24a is designed so that the interval $w_4$ of the blocks is decreased block by block by 1 mm from the end face on the light-source 26 side to the end face on the side without the light source 26 in the first direction block. In other words, as the distance from the light source 26 increases, the sum of the pitches of the flat portions 21 and the pitches of the slanting portions 22 (the sum $w_3$ of the width $w_1$ of the flat portions 21 and the width $w_2$ of the slanting portions 22) decreases by 10 μm (1/100 mm) in each of the 100 pairs of the flat portions 21 and the slanting portions 22. Additionally, for convenience of explanation, FIGS. 38(a) through 38(c) do not indicate the decrease in the pitches of the flat portions 21 and the slanting portions 22.

In the light-directing body 24a, the slanting portions 22 function as minute light-source portions that are faces for mainly reflecting light from the light source 26 toward the interface 28. The flat portions, on the other hand, function as faces which, when illuminating light from the front light 20a returns as reflected light from the liquid crystal cell 10a, mainly transmit the reflected light toward the observer. The functions of these portions are the same as those described in the aforementioned Embodiment 1.

Moreover, in addition to this step-shaped construction, the light-directing body 24a in the front light 20a is designed so that the pitch of one pair is decreased, for example, by 10 μm in each 100 pairs of the flat portions 21 and the slanting portions 22. In other word, the pitch of the steps is decreased as the distance from the light source 26 increases. For this reason, as illustrated in FIG. 40(a), the number of the slanting portions 22 per unit area increases as the distance from the light source 26 increases.

Light from the light source 26 that has been made incident on the incident surface 25 is reflected by the slanting portions 22 functioning as the minute light-source portions. Here, since the number of the slanting portions 22 per unit area increases as the distance from the light source 26 increases, the reflection-type liquid crystal cell 10a, which is an object to be illuminated by the front light 20a, has its luminance increased as the distance from the light source 26 increases. Since the luminance normally tends to decrease as the distance from the light source 26 increases, the construction of the light-directing body 24a in the present embodiment cancels the reduction in luminance due to a long distance from the light source 26 on the interface 28 (the first light-releasing surface), with the result that the light from the light source 26 can be directed to the entire object to be illuminated efficiently with high angles. Consequently, it becomes possible to average the luminance distribution on the interface 28 side, that is, on the interface (the first light-releasing surface) on the object side.

In contrast, in a conventional front light 120 having a light-directing body 124 formed into a wedge-shaped flat plate as shown in FIG. 40(b), light from the light source 26 that has been made incident on the incident surface 125 is reflected, as it is, by the interface 123. Therefore, the luminance on the first light-releasing surface (the interface 128 in the front light 120) decreases as the distance from the light source 26 increases.

Figure 41:
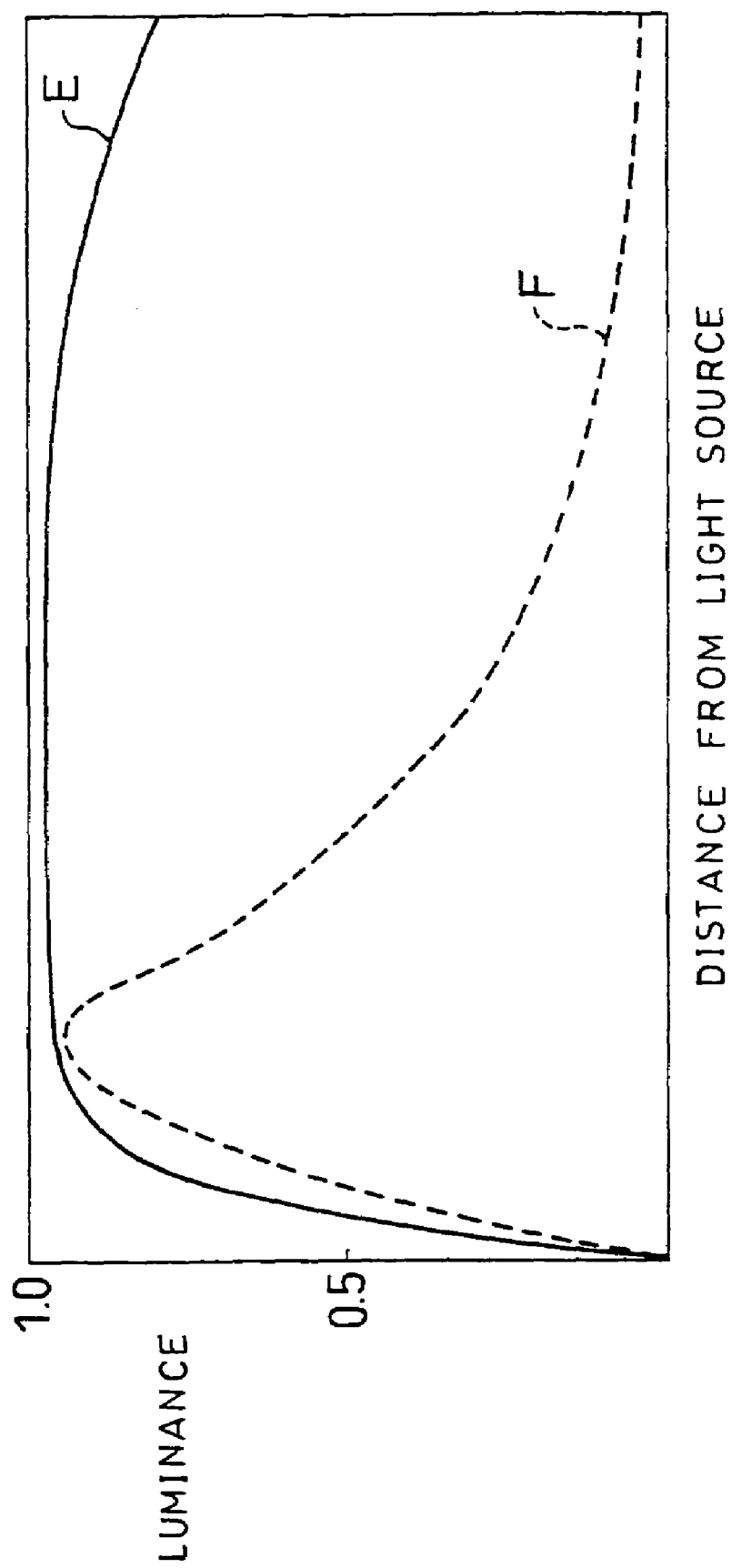
FIG. 41 is a graph that shows the relationship between the distance from the light source and the luminance in the front light installed in the reflection-type LCD shown in FIG. 37.

Further, as illustrated in FIG. 41, with respect to the distribution state of luminance on the first light-releasing surface, as compared with graph F showing the luminance distribution of the conventional front light 120, graph E, which shows the luminance distribution of the front light 20a of the present embodiment, shows virtually constant values even at positions where the distance from the light source 26 is great. This indicates that the front light 20a of the present embodiment is superior in the uniformity in luminance distribution on the first light-releasing surface (the interface 28).

Moreover, in the light-directing body 24a having the above-mentioned construction, since the pitch of the steps is set to 0.21 mm, the pitch of the black matrix formed around the pixels of the reflection-type liquid crystal cell 10a corresponding to the light-directing body 24a is offset from the pitch of the grooves of the slanting portions 22. As a result, since the occurrence of Moire fringes due to interference between the black matrix and the slanting portions 22 can be suppressed, it becomes possible to improve the display quality of a reflection-type LCD that is to be produced. Additionally, a further description will be given on this point later.

Figure 42:
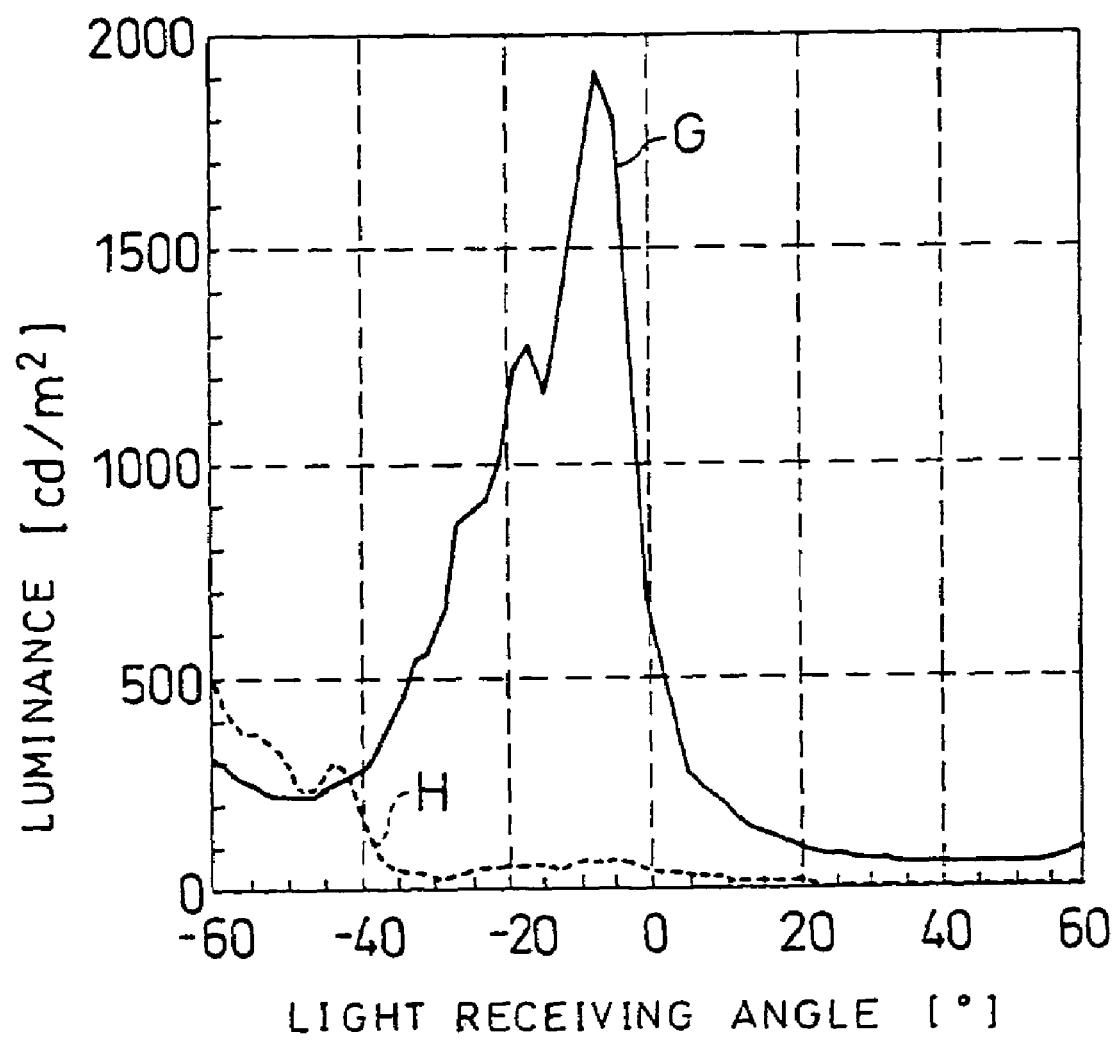
FIG. 42 is a graph that indicates characteristics of the angle of released light in the front light installed in the reflection-type LCD shown in FIG. 37.

As illustrated in FIG. 42, with respect to the results of the light-releasing angle characteristic of the light-directing body 24a, in graph G concerning the reflection-type LCD side (the interface 28 side), that is, the object side, the luminance increases until it reaches 2,000 cd/m$^2$ with a peak within the range of light-receiving angles from −10° to −5°. In contrast, in graph H concerning the observer side (the interface 23 side), the luminance is not more than 100 cd/m$^2$ in the vicinity of 0° that are angles at which the reflection-type LCD is viewed, although the luminance has a maximum luminance of 500 cd/m$^2$ when the light-receiving angle is −60°.

In this manner, the light from the light source 26 placed at the end face of the light-directing body 24a is released from the interface 28 with an angle virtually perpendicular to the object to be illuminated (the reflection-type LCD). Consequently, hardly any light leakage is observed on the observer side, that is, on the interface 23 side, thereby making it possible to direct the light from the light source 26 efficiently with high angles.

Additionally, in the present embodiment, a fluorescent tube is used as the light source 26; however, the light source 26 is not intended to be limited thereby, and for example, LEDs (light-emitting diodes), EL elements or tungsten lamps may be used.

Next, an explanation will be given of the liquid crystal cell 10a. As illustrated in FIG. 37, the liquid crystal cell 10a has a basic construction similar to that of the liquid crystal cell 10 in the aforementioned Embodiment 1, but is different from it in that the reflective plate is formed inside the liquid crystal cell 10a.

Figure 43:
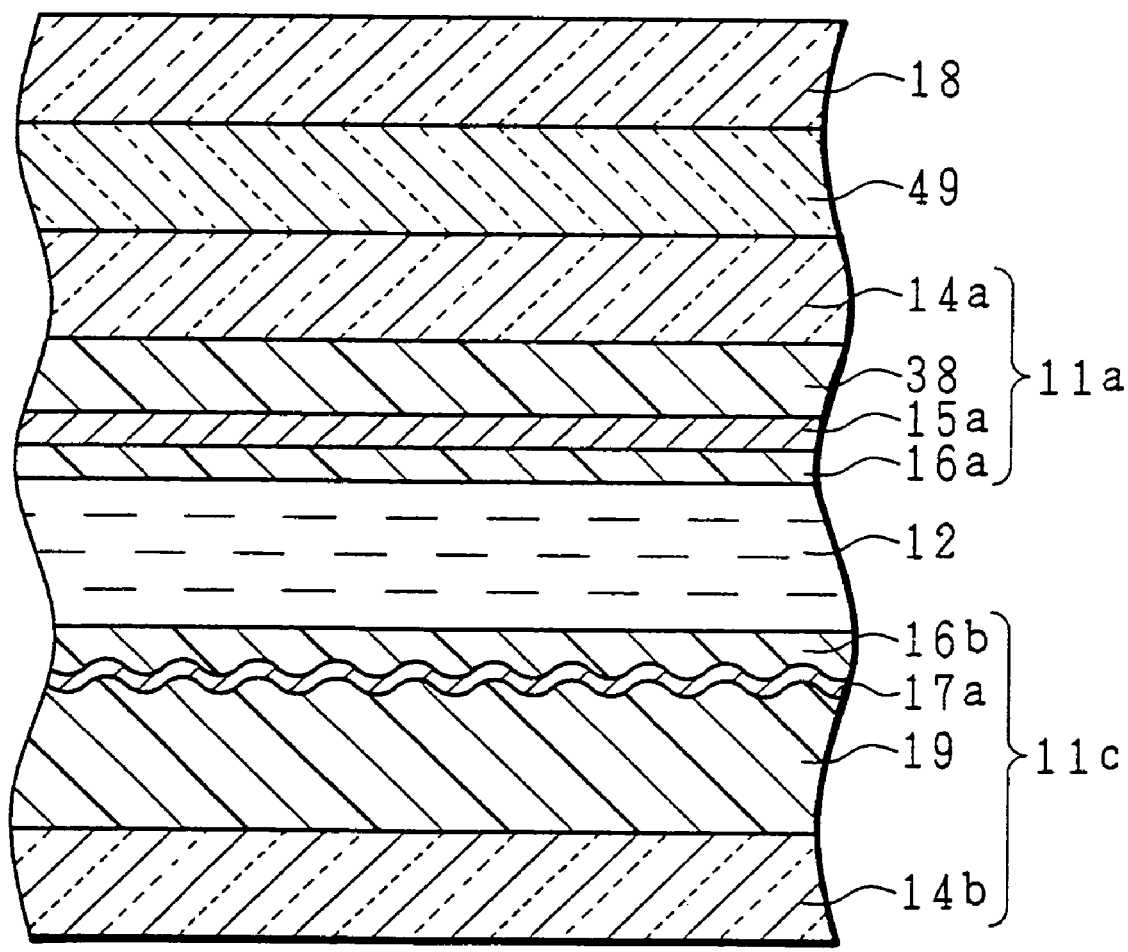
FIG. 43 is a cross-sectional view that shows the construction of a reflection-type liquid crystal cell installed in the reflection-type LCD shown in FIG. 37.

As also illustrated in FIG. 43, the liquid crystal cell 10 has a construction in which: a liquid crystal layer 12 is sandwiched by a pair of electrode substrates 11a and 11c and a phase-difference plate 49 and a polarizing plate 18 are installed on the electrode-substrate 11a side, that is, on the display surface side. Here, only one phase-difference plate 49 (not shown in FIG. 37) is shown in FIG. 43; however, not less than two of them may be installed, or no phase-difference plate 49 may be installed.

The electrode substrate 11a is constructed as follows: A color filter 38 is placed on a glass substrate 14a having a light-transmitting property, a transparent electrode 15a (scanning lines) is placed thereon, and a liquid crystal alignment film 16a is formed in a manner so as to cover the transparent electrode 15a. Here, an insulating film, etc., may be formed on the electrode substrate 11a, if necessary. Additionally, the color filter 38 is not shown in FIG. 37.

The electrode substrate 11c is, on the other hand, constructed as follows: An insulating film 19 is formed on a glass substrate 14b, a reflective electrode (a reflective plate) 17a is formed thereon, and a liquid crystal alignment film 16b is formed in a manner so as to cover the reflective electrode 17a. A plurality of protrusions and recesses are formed on the surface of the insulating film 19, and a plurality of protrusions and recesses are also formed on the surface of the reflective electrode 17a covering the insulating film 19.

The reflective electrode 17a serves both as an liquid crystal driving electrode for driving the liquid crystal layer 12 and as a reflective plate. With respect to the reflective electrode 17a, an aluminum (Al) reflective electrode having a superior reflection characteristic is used. Further, the insulating film 19 is formed of organic resist, and contact holes and protrusions and recesses in the insulating film 19 are formed by photolithography process, which will be described later. The materials and forming methods of the glass substrates 14a and 14b, the transparent electrodes 15a and 15b and the liquid crystal alignment films 16a and 16b are the same as those in the aforementioned Embodiment 1.

Referring to FIGS. 44(a) through 44(e), an explanation will be given in more detail of the forming method of the electrode substrate 11c.

Figure 44A:
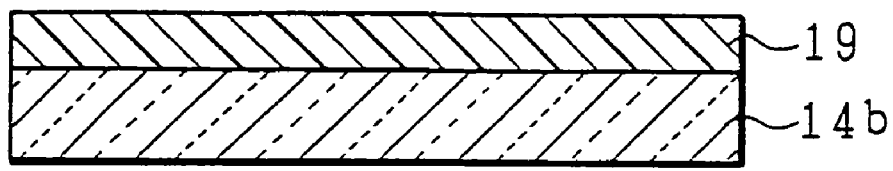
FIGS. 44(a) through 44(e) are drawings that show processes for forming the reflective electrodes in the reflection-type liquid crystal cell shown in FIG. 43.
Figure 44B:
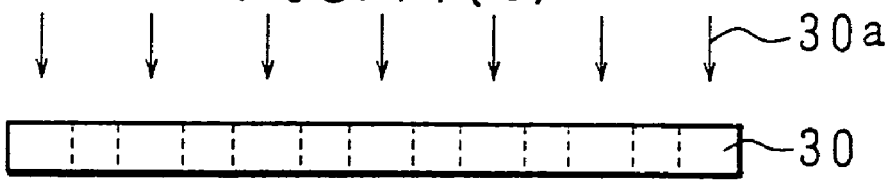
Figure 44C:
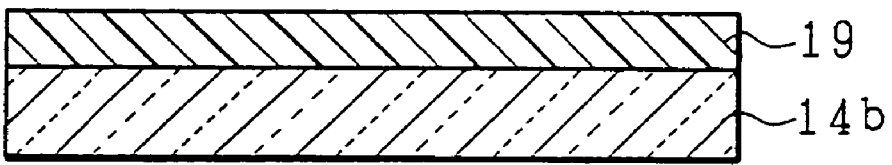

First, as illustrated in FIG. 44(a), organic resist is applied to the entire surface of the glass substrate 14b, and the insulating film 19 is formed by curing it. Then, as illustrated in FIG. 44(b), the insulating film 19 is irradiated with ultraviolet rays 30a through a mask 30 so that as illustrated in FIG. 44(c), the portions irradiated by the ultraviolet rays 30a are formed into a predetermined pattern by removing those portions irradiated by the ultraviolet rays 30a.

Figure 44D:
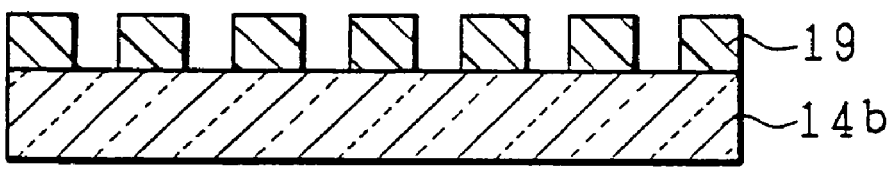

Next, as illustrated in FIG. 44(d), the insulating film 19, formed into a predetermined pattern, is cured by applying a heating treatment at 180° so as to cause thermal deformation in the organic resist. Thus, protrusions and recesses 19a are formed through the thermal deformation.

Figure 44E:
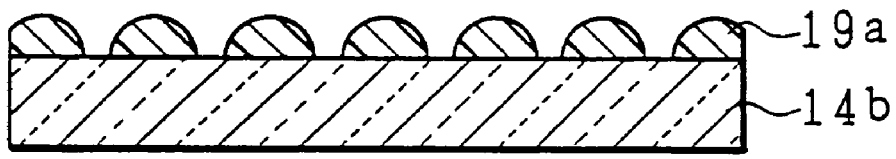

Finally, as illustrated in FIG. 44(e), aluminum (Al) is subject to vacuum evaporation so as to cover the protrusions and recesses 19a. Thus, the reflective electrode 17a, which has protrusions and recesses formed on its surface along the protrusions and recesses 19a, is provided.

The electrode substrate 11c and the electrode substrate 11a, thus obtained, are arranged so that the respective liquid crystal alignment films 16a and 16b are aligned face to face with each other, with the directions of the rubbing treatment in antiparallel with each other, and joined by using a bonding agent. In this case, a space is formed between the electrode substrates 11a and 11c with a uniform gap by preliminarily scattering glass-beads spacers (not shown) having a particle diameter of 4.5 μm. Then, a liquid crystal layer 12 is formed in this gap by introducing liquid crystal therein by means of vacuum deaeration. Here, the material of the liquid crystal layer 12 is also the same as those described in the aforementioned Embodiment 1.

The reflection-type liquid crystal cell 10a of the present embodiment is manufactured as described above, and since the manufacturing processes and manufacturing conditions other than those described above are the same as those described in the reflection-type liquid crystal cell 10 of the aforementioned Embodiment 1, the descriptions thereof are omitted.

The pattern of the protrusions and recesses, formed on the reflective electrode 17a of the electrode substrate 11c (that is, the pattern of the protrusions and recesses 19a of the insulating film 19) are formed irregularly so that light that has been made incident on the reflection-type liquid crystal cell 10a is diffused and reflected in a specific direction.

The protrusions and recesses on the insulating film 19 are preferably formed with the difference between the apex of each protrusion and the bottom face of each recess being set in the range from 0.1 μm to 2 μm. When the difference between the apex of each protrusion and the bottom face of each recess is set in this range, the incident light is diffused without giving adverse effects on the orientation of liquid crystal molecules and the cell thickness of the liquid crystal cell.

Figure 45:
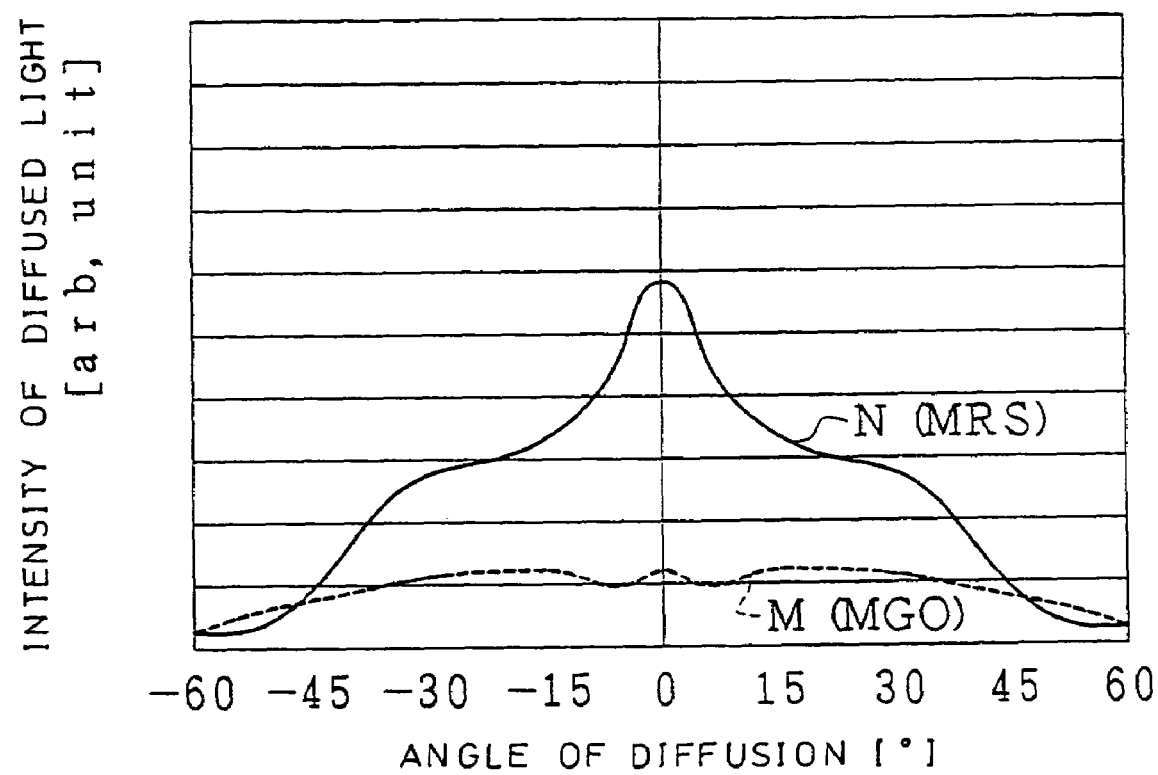
FIG. 45 is a graph that indicates the dependence of the reflective electrodes on the angle of reflectivity in the reflection-type liquid crystal cell shown in FIG. 43.

Referring to FIG. 45, an explanation will be given of a case in which the reflection property of the reflective electrode 17a formed as described above is compared with the reflection property of a reference white board (MGO) showing diffusion and reflection characteristics virtually similar to those of paper. As shown in graph M indicated by a broken line in the Figure, the MGO (and paper, etc.) has a reflection property exhibiting an isotropic property. In contrast, as shown in graph N indicated by a solid line in the Figure, the reflective electrode 17a (MRS) has diffusion and reflection properties exhibiting directivity in an angle range of ±30°.

Even if light rays other than those in the positive reflection direction are made incident on the reflection-type liquid crystal cell 10a provided with such a reflective electrode 17a, the resulting image can be observed. Here, the reflection property of the reflective electrode 17a is not intended to be limited to the property shown in FIG. 45, and can be appropriately adjusted to properties required for the kinds of equipment in which the reflection-type LCD is used.

Moreover, since the reflective electrode 17a is formed in a manner so as to adjoin the liquid crystal layer 12 inside the reflection-type liquid crystal cell 10a, it is possible to eliminate the occurrence of parallax due to the glass substrate 14b, as compared with a case in which the reflective plate is formed on the back-surface side (the surface facing the surface contacting the light-directing body 24a) of the reflection-type liquid crystal cell 10a. For this reason, in the resulting reflection-type LCD, it becomes possible to suppress double images of an object. Furthermore, the construction of the reflection-type liquid crystal cell 10a can be simplified.

Figure 46:
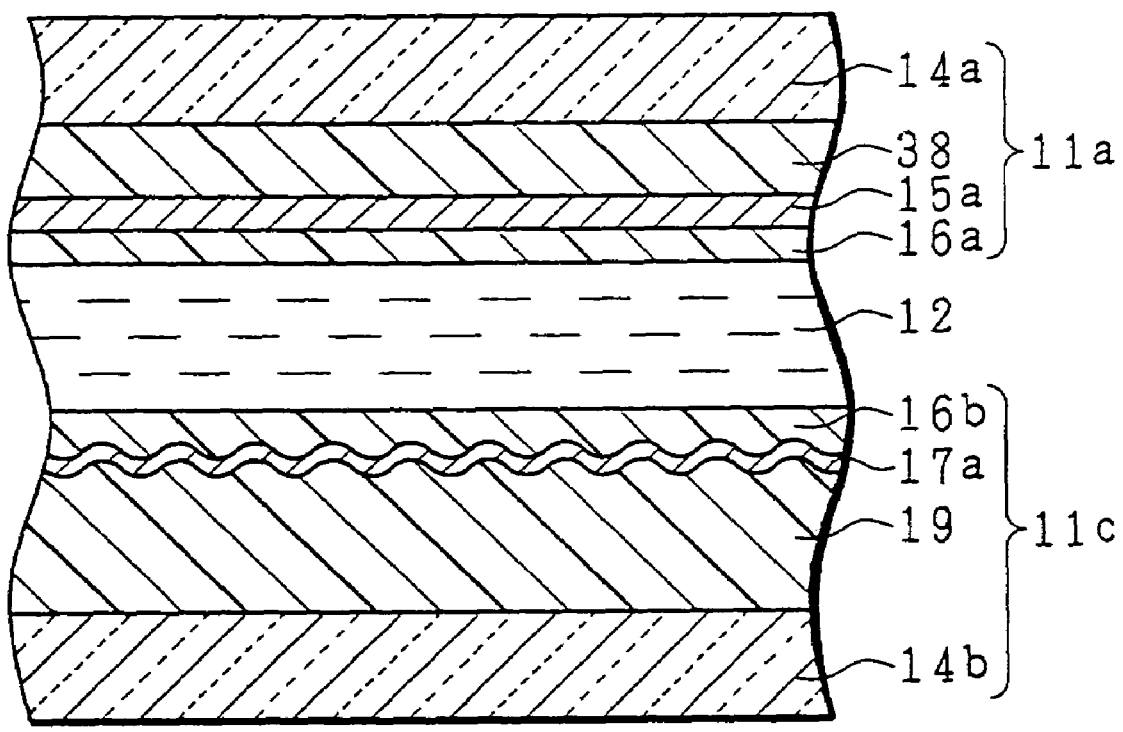
FIG. 46 is a cross-sectional view showing another example of the reflection-type liquid crystal cell shown in FIG. 43.

Additionally, as illustrated in FIGS. 37 and 43, the reflection electrode 17a of the present embodiment may be provided as those having a polarizing mode in which the polarizing plate 18 is provided in the display mode of the reflection-type liquid crystal cell 10a, or, as illustrated in FIG. 46, may be provided as those having the guest-host mode (without a polarizing plate). In addition, with respect to the reflection-type liquid crystal cell, since its basic construction is almost the same as the reflection-type liquid crystal cell 10a, the detailed description thereof is omitted.

Figure 47:
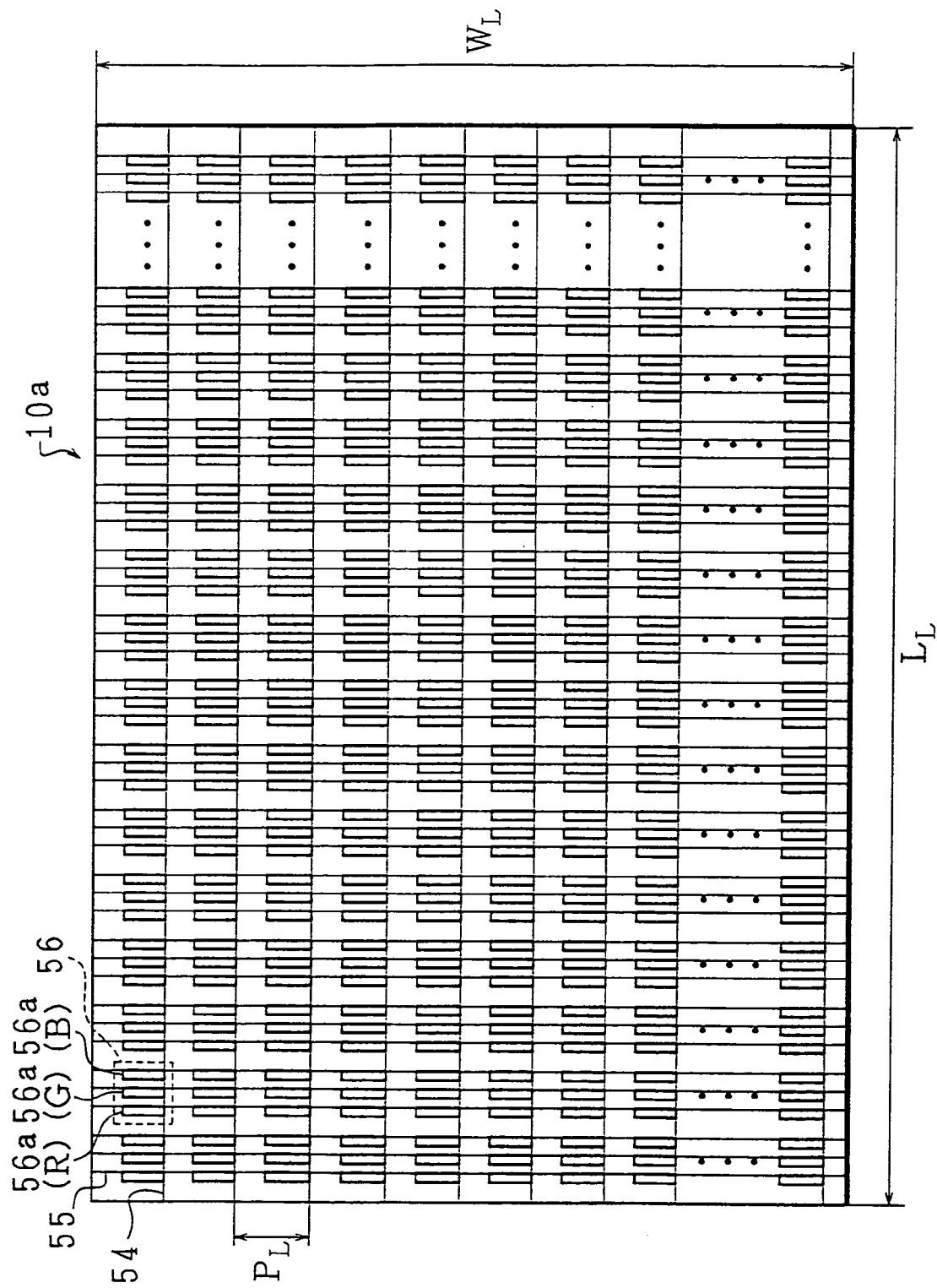
FIG. 47 is a plan view that shows an arrangement of pixels, scanning lines and signal lines in the reflection-type liquid crystal cell shown in FIG. 43.

Next, an explanation will be given of a pixel construction placed in the liquid crystal cell 10a. As illustrated in FIG. 47, in the reflection-type liquid crystal cell 10a, a plurality of scanning lines 54 are formed in the length direction of the reflection-type liquid crystal cell 10a, and a plurality of signal lines 55 are formed in the direction orthogonal to the direction in which the scanning lines 54 are formed. Then, a plurality of pixels 56 are formed in a manner so as to correspond to the grating pattern formed by the scanning lines 54 and the signal lines 55.

Each pixel 56 is constituted by pixel electrodes 56a that correspond to three color filters of red (R), green (G) and blue (B). These pixel electrodes 56a are placed in the order of R, G and B in the direction in which the scanning lines 54 are formed.

In the present embodiment, the shape of the reflection-type liquid crystal cell 10a is described as follows: the size: 6.5 type in diagonal distance (longitudinal length $W_L$=58 mm, lateral length $L_L$=154.5 mm), the number of scanning lines 54 Xm=240, and the number of signal lines 55 Yn=640. Further, the pitch $P_L$ of the pixels 56 placed in the reflection-type liquid crystal cell 10a=0.24 mm (R, G and B). On the periphery of the pixels 56, a black matrix, not shown, (hereinafter, referred to as BM) is formed with a width of 8 μm.

The reflection-type LCD of the present embodiment is constructed by combining the reflection-type liquid crystal cell 10a and the front light 20a. Here, in the front light 20a, the pitch of the flat portions 21 and the slanting portions 22 of the light-directing body 24a is set to 0.21 mm, which is smaller than the pitch of the scanning lines 54, that is, the pitch of the BM. For this reason, it is possible to offset the pitch of the BM from the pitch of the grooves of the slanting portions. When these pitches are offset from each other, it becomes possible to suppress the occurrence of Moire fringes due to interference between the black matrix and the slanting portions 22. Therefore, it becomes possible to improve the display quality of a reflection-type LCD that is to be produced.

In the above-mentioned construction of the light-directing body 24a, the pitch of the flat portions 21 and the slanting portions 22 is set smaller than the pitch of the scanning lines 54; however, the above-mentioned pitch may be set bigger than the pitch of the scanning lines 54. In other words, in order to suppress the occurrence of Moire fringes, it is only necessary to offset the pitch of the grooves of the slanting portions 22 from the pitch of the BM.

Here, it is supposed that the sum $w_3$ of the width $w_1$ of the flat portion 21 and the width $w_2$ of the slanting portion 22 is the pitch of the grooves of the slanting portions 22. Further, although the BM is formed so as to shield the scanning lines 54 and the signal lines 55, only the scanning lines 54 are set in parallel with the grooves of the slanting portions 22; therefore, it is supposed that the pitch $P_1$ of the scanning lines 54 is the same as the pitch of the BM.

In order to offset the pitch of the grooves of the slanting portions 22 from the pitch of the BM, it is only necessary to make $w_3$ and $P_1$ disagree with each other ($w_3 \neq P_1$). However, with respect to the relationship between $w_3$ and $P_1$, it is particularly preferable to set $w_3$ so as to have a width greater than two times the width $P_1$ ($w_3 > 2P_1$) or to set $w_3$ so as to have a width smaller than half the width $P_1$ ($w_3 < \frac{1}{2}P_1$).

In the case when the relationship between $w_3$ and $P_1$ is set out of the above-mentioned ranges, although the pitch of the grooves of the slanting portions 22 is offset from the pitch of the BM, it may be considered that, from the point of view of optics, they are regarded as being coincident with each other. For this reason, this setting fails to effectively suppress the occurrence of Moire fringes, and is not preferably adopted.

Additionally, in the present embodiment, the width $w_1$ of the flat portions 21, the width $w_2$ of the slanting portions 22, the sum $w_3$ of the widths $w_1$ and $w_2$, the angle of the slanting portions 22, and other values are not intended to be limited to the above-mentioned numeric values, and may be set in accordance with the pixel construction of the reflection-type liquid crystal cell 10a to be used.

Moreover, in the present invention, in order to average the luminance distribution, the pitch of the flat portions 21 is reduced in the departing direction from the light source 26 (in the first direction); however, instead of reducing the pitch, the angle of the slanting portions 22 may be varied so as to reduce the sum of the pitches of the flat portions 21 and the slanting portions 22. For example, with an arrangement in which the angle α made by the flat portion 21 and the slanting portion 22 is reduced in the departing direction from the light source 26 (in the first direction), as well as narrowing the flat portions 21, the sum of the pitches of the flat portions 21 and the slanting portions 22 may be reduced. In this case also, since the progressing light through the slanting portions 22 can be released efficiently in the departing direction from the light source 26 (in the first direction), it becomes possible to average the luminance distribution.

Furthermore, in addition to the front light 20a having the above-mentioned construction and the reflection-type liquid crystal cell 10a having the above-mentioned construction, the reflection-type LCD of the present embodiment has an arrangement in which an anti-reflection film, which serves as the second light-directing body, is placed between the front light 20a and the reflection-type liquid crystal cell 10a.

Here, an explanation will be given of the anti-reflection film: In the reflection-type LCD, an anti-reflection film 13, which serves as the anti-reflection film, is joined to the interface (the first light-releasing surface) between the polarizing plate 18 placed on the reflection-type liquid crystal cell 10 and the light-directing body 24a.

In the present embodiment, an anti-reflection film (TAC-HC/AR), manufactured by Nitto Electric Industrial Co., Ltd., is used as the anti-reflection film 13. This anti-reflection film 13 has a multi-layer structure having four layers. More specifically, a triacetylcellulose (TAC) layer is used as a base layer, and on this are formed an $MgF_2$ layer serving as the first layer, a $CeF_3$ layer serving as the second layer, a $TiO_2$ layer serving as the third layer and $MgF_2$ layer serving as the fourth layer, thereby constituting the anti-reflection film 13.

The TAC film is set to have a thickness of 100 μm with the refractive index $n_t=1.51$. The $MgF_2$ layer, provided as the first layer, has a thickness of approximately 100 nm with the refractive index $n_m=1.38$. The $CeF_3$ layer, provided as the second layer, has a thickness of approximately 120 nm with the refractive index $n_c=1.63$. The $TiO_2$ layer, provided as the third layer, has a thickness of approximately 120 nm with the refractive index $n_{ti}=2.30$. The $MgF_2$ layer, provided as the fourth layer, has a thickness of approximately 100 nm with the refractive index $n=1.38$. These first through fourth layers are successively formed on the TAC film provided as the base layer by the vacuum evaporation method.

Upon bonding it to the front light 20a, a layer of a bonding agent of the acryl family, which has virtually the same refractive index $n_1$ as the refractive index $n_2$ of the acryl material used in the light-directing body 24a, is utilized. For this reason, it is possible to improve the anti-reflection effect without altering the input-output conditions of light within the light-directing body 24a, and also to prevent the occurrences of unevenness in the luminance distribution and rainbow-colored spectrum.

Additionally, with respect to the construction of the anti-reflection film 13, the TAC film as the first layer is not necessarily an essential element, and for example, the second through fourth layers may be directly stacked on the light-directing body 24a by eliminating the first layer. In this case, however, the manufacturing cost may increase slightly.

The anti-reflection film 13, provided as the above-mentioned multi-layer film, is arranged so as to function as a λ/4–λ/2–λ/4–λ/4 wavelength plate in response to incident light with the wavelength λ=550 nm. Therefore, the anti-reflection film 13 is allowed to function as the anti-reflection film 13 in a wide wavelength band.

In the aforementioned light-directing body 24a, the slanting portions 22, formed on the surface (the interface 23) of the light-directing body 24a, function as minute light-source sections with respect to the reflection-type liquid crystal cell 10a. For this reason, when light is directed to the reflection-type liquid crystal cell 10a from the slanting portions 22, approximately 4% of the light from the slanting portions 22 is reflected from the interface between the light-directing body 24a and the reflection-type liquid crystal cell 10a, that is, from the interface 28 that is aligned face to face with the interface 23, thereby forming reflected light rays.

Thus, reflection images are formed from the interface 28 onto the interface 23 side due to the occurrence of these reflected light rays. These reflection images interfere with or are diffracted by the images on the slanting portions 22, resulting in unevenness in the luminance distribution or rainbow-colored spectrum on the surface of the reflection-type LCD when viewed by the observer.

However, in the reflection-type LCD of the present embodiment, since the anti-reflection film (the anti-reflection film 13) is placed between the reflection-type liquid crystal cell 10a and the front light 20a, that is, on the interface 28 side of the light-directing body 24a, the occurrence of the reflected light rays, resulted from the incident light from the slanting portions 22 that has been reflected by the interface 28, can be suppressed.

Therefore, it is possible to prevent interference or diffraction between the images on the slanting portions 22 functioning as the minute light-source sections and the reflection images resulted from reflection on the interface 28. Consequently, it becomes possible to prevent the occurrences of unevenness in the luminance distribution and rainbow-colored spectrum on the display viewed from the observer side (from the interface 23 side).

Figure 48:
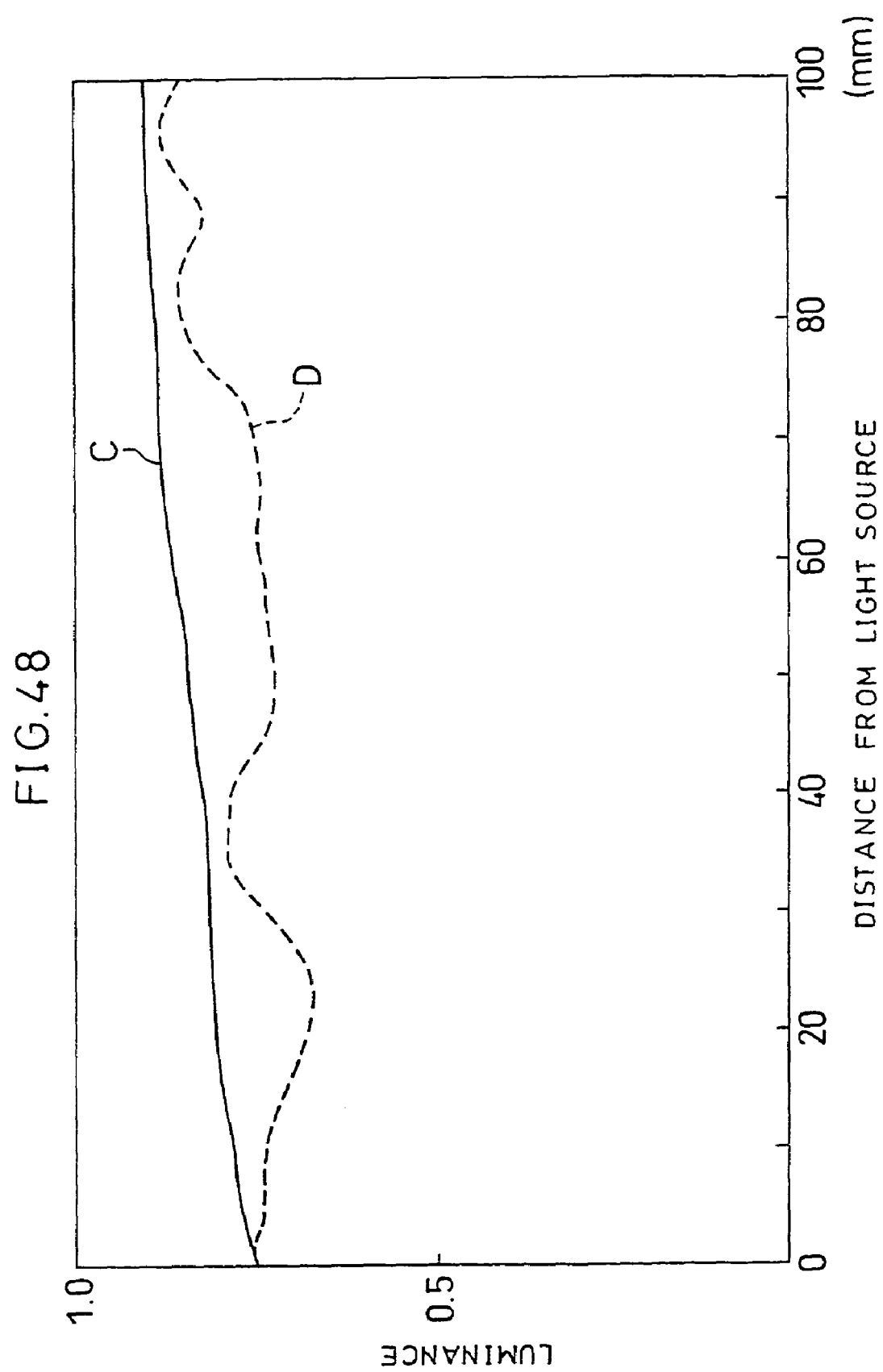
FIG. 48 is a graph that indicates the luminance and luminance distribution characteristic of released light in the front light installed in the reflection-type LCD shown in FIG. 37.

When comparison is made on the luminance distribution of the display in the reflection-type LCD in the present embodiment between cases where no anti-reflection film is place and where the anti-reflection film 13 is placed, graph C with the anti-reflection film 13 has a more constant luminance distribution without unevenness and also exhibits a better luminance than graph D without the anti-reflection film 13, as shown in FIG. 48.

Moreover, since a product on the market as it is can be used as the anti-reflection film 13, it is possible to suppress the production cost of the front light 20a from increasing further. Consequently, it becomes possible to obtain an inexpensive front light 20a and a reflection-type LCD provided with such a front light 20a.

Furthermore, the anti-reflection film 13 is bonded by a bonding agent having a refractive index $n_1$ that is virtually the same as the refractive index $n_2$ of the light-directing body 24a serving as the first light-directing body; therefore, it is possible to improve the anti-reflection effect without altering the input-output conditions of light within the light-directing body 24a.

Additionally, the construction and the material of the anti-reflection film 13 are not intended to be limited by the above-mentioned construction and material. For example, the construction of the wavelength plate may be changed to a construction of λ/4–λ/2–λ/2–λ/2–λ/4. This construction of the wavelength plate makes it possible to obtain the anti-reflection effect within a wider wavelength band. Further, the anti-reflection film may be provided as a λ/4 wavelength plate with a mono-layer construction. In this case, however, the wavelength band in which the anti-reflection effect is obtained may become narrower.

As described above, the pitch of the flat portions 21 and the slanting portions 22 formed on the surface (the interface 23) of the light-directing body 24a is gradually reduced in the departing direction from the light source 26 (in the first direction); therefore, the quantity of light reflected by the slanting portions 22 can be gradually increased in the departing direction from the light source as compared with a conventional construction. Consequently, it becomes possible to average the luminance distribution on the interface 23 (the first light-releasing surface) of the light-directing body 24a.

Moreover, with the arrangement in which the pitch of the flat portions 21 and the slanting portions 22 formed on the interface 23 of the light-directing body 24a in the front light 20a is set smaller than the pitch of the reflection-type liquid crystal cell 10a, the occurrence of Moire fringes due to interference between the BM formed on the periphery of each pixel 56 and the grooves of the slanting portions 22 can be suppressed. Therefore, it becomes possible to prevent degradation in the display quality of a reflection-type LCD.

Furthermore, by installing the anti-reflection film (the anti-reflection film 13) between the reflection-type liquid crystal cell 10a and the front light 20a, it becomes possible to prevent the occurrences of unevenness in the luminance distribution and rainbow-colored spectrum on the interface 23 of the light-directing body 24a. Thus, it is possible to provide a brighter reflection-type LCD with higher display quality.

In addition, by forming protrusions and recesses on the reflective electrodes 17a in the reflection-type liquid crystal cell 10a, the incident light can be diffused without giving adverse effects on the orientation of liquid crystal molecules and the cell thickness. Therefore, images can be observed even when light is made incident on the reflection-type liquid crystal cell 10a in directions other than the direction of regular reflection.

As described above, in the front-illuminating device of the present invention, the second light-directing body functions as an optical means which suppresses light, released from the second light-releasing surface in the first light-directing body, from being reflected by the first light-releasing surface in the first light-directing body.

Normally, the first light-releasing surface of the first light-directing body reflects light from the slanting portions formed on the second light-releasing surface, thereby forming reflected light rays. Due to the occurrence of these reflected light rays, reflection images are formed from the first light releasing-surface in the first light-directing body to the second light-releasing surface. As a result, these reflection images interfere with or are diffracted by the images on the slanting portions, resulting in unevenness in the luminance distribution or rainbow-colored spectrum on the surface of the object to be illuminated, when viewed by the observer.

However, with the above-mentioned arrangement, since the front-illuminating device is provided with the optical means as the second light-directing body, the occurrence of the reflected light rays, resulted from the incident light from the slanting portions that has been reflected by the first light-releasing surface, can be suppressed. Therefore, it is possible to prevent interference or diffraction between the images on the slanting portions functioning as the minute light-source sections and the reflection images resulted from the reflected light rays. Consequently, it becomes possible to prevent the occurrences of unevenness in the luminance distribution and rainbow-colored spectrum on the display viewed from the observer side (from the second light-releasing surface).

In the front-illuminating device of the present invention, the optical means is provided as an anti-reflection film. Since an anti-reflection film as it is, which is available on the market, can be adopted as the optical means, it is possible to suppress the production cost of the front-illuminating device from increasing further. Consequently, it becomes possible to provide an inexpensive front-illuminating device.

In the front-illuminating device of the present invention, the optical means is bonded to the first light-directing body by a bonding agent having virtually the same refractive index as the refractive index of the first light-directing body. Therefore, it is possible to improve the anti-reflection effect virtually without altering the input-output conditions of light within the first light-directing body.

In the front-illuminating device of the present invention, the sum of the pitch of the flat portions and the pitch of the slanting portions that are formed on the light-directing body is set to become smaller as the distance from the incident surface increases. Therefore, the number of the slanting portions per unit area is allowed to increase as the distance from the light source increases. As the number of the slanting portions increases, the luminance on the surface of the object to be illuminated is improved as the distance from the light source increases. Since the luminance generally tends to decrease as the distance from the light source increases, the above-mentioned arrangement, which has an increase in the number of the slanting portions, cancels the reduction in the luminance in the object to be illuminated due to an increased distance from the light source, thereby making it possible to effectively direct light from the light source to the entire body of the object to be illuminated with higher angles. Consequently, it becomes possible to average the luminance distribution on the surface of the object to be illuminated.

In the reflection-type liquid crystal display of the present invention that has the front-illuminating device with the above-mentioned arrangement, the reflection-type liquid crystal element is further provided with scanning lines, and the sum of the pitch of the flat portions and the pitch of the slanting portions on the second light-releasing surface of the front-illuminating device is set to become smaller than the pitch of the scanning lines.

Therefore, with the above-mentioned arrangement, since the sum of the pitches of the flat portions and the slanting portions is smaller than the pitch of the scanning lines, the pitch of the slanting portions of the front-illuminating device is offset from the pitch of the black matrix formed on the periphery of each pixel in the reflection-type liquid crystal element. Thus, it becomes possible to suppress the occurrence of Moire fringes due to interference between the black matrix and the slanting portions, and consequently to improve the display quality of a reflection-type liquid crystal display that is to be produced.

In the above-mentioned arrangement of the reflection-type liquid crystal display of the present invention, the sum of the pitch of the flat portions and the pitch of the slanting portions on the second light-releasing surface of the front-illuminating device may be set to become larger than the pitch of the scanning lines. In this arrangement also, the pitch of the slanting portions of the front-illuminating device is offset from the pitch of the black matrix formed on the periphery of each pixel in the reflection-type liquid crystal element. Thus, it becomes possible to suppress the occurrence of Moire fringes due to interference between the black matrix and the slanting portions, and consequently to improve the display quality of a reflection-type liquid crystal display that is to be produced.

The reflection-type liquid crystal display of the present invention, which has the above-mentioned arrangement, is provided with a reflective plate whose surface has protrusions and recesses that are designed not to affect the cell thickness. Thus, the reflective plate diffuses the incident light without giving adverse effects on the orientation of the liquid crystal molecules and the cell thickness of the liquid crystal cell. Therefore, images can be observed even when light is made incident in directions other than the direction of regular reflection.

In the above-mentioned arrangement of the reflection-type liquid crystal display of the present invention, the reflective plate is a reflective electrode that also functions as a liquid crystal driving electrode for driving the liquid crystal layer of the reflection-type liquid crystal element, and is set to be adjacent to the liquid crystal layer. For this reason, as compared with a case in which the reflective plate is not adjacent to the liquid crystal layer, this construction eliminates the occurrence of parallax due to the electrodes substrates constituting the reflection-type liquid crystal display. As a result, it becomes possible to suppress double images of an object from occurring in the resulting reflection-type liquid crystal display. Moreover, since the reflective plate also functions as the liquid crystal driving electrode, the construction of the reflection-type liquid crystal display can be simplified.

Embodiment 12

Referring to Figures, the following description will discuss still another embodiment of the present invention. Here, those members that have the same functions and that are described in the aforementioned Embodiments are indicated by the same reference numerals and the description thereof is omitted.

Figure 49:
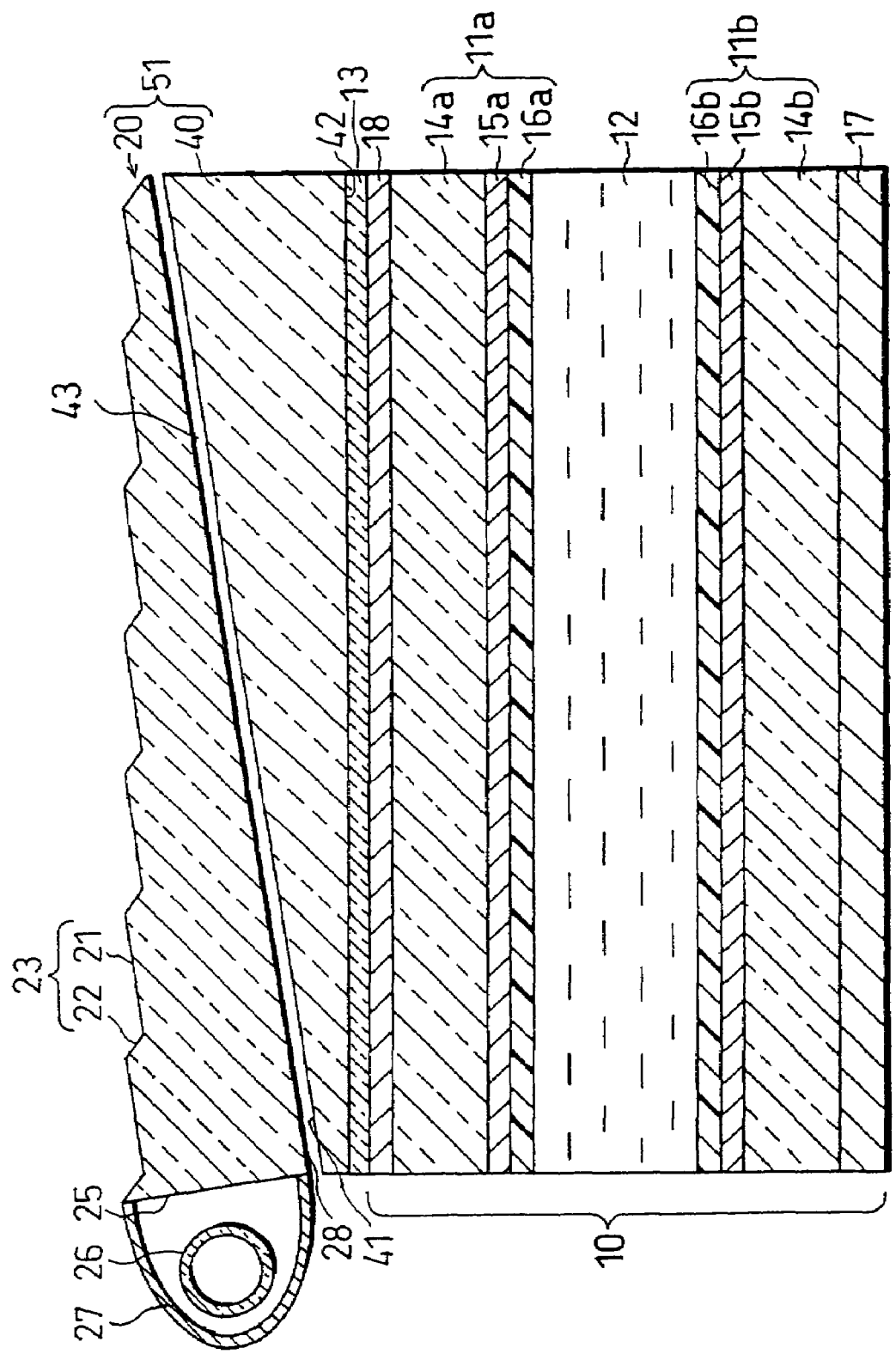
FIG. 49 is a cross-sectional view showing a construction of a reflection-type LCD in accordance with still another embodiment of the present invention.
Figure 52:
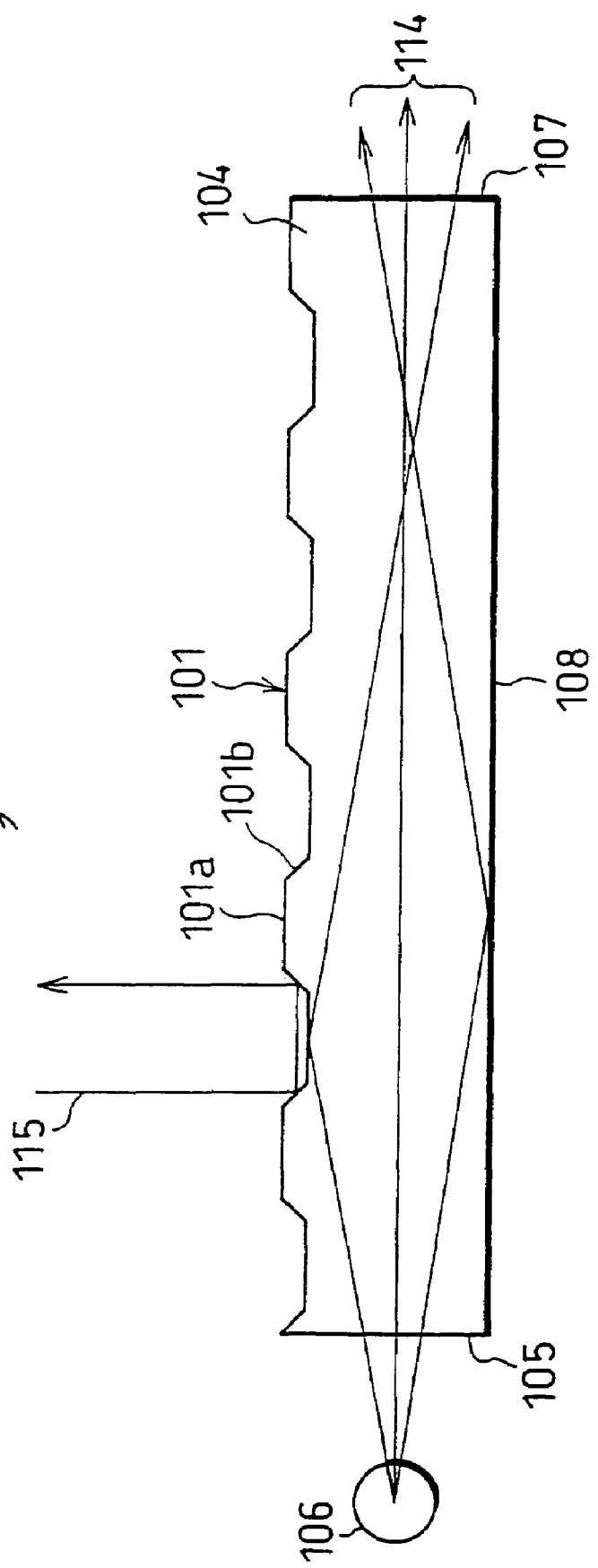
FIG. 52 is a cross-sectional view that shows behaviors of light in the conventional reflection-type LCD.

As illustrated in FIG. 49, although the reflection-type LCD of the present embodiment is the same as the aforementioned Embodiment 2 in its basic construction, it differs from Embodiment 2 in that an anti-reflection film 13, which serves as a third light-directing body (an optical means), is placed between the reflection-type liquid crystal cell 10 and the front light system 51.

The above-mentioned anti-reflection film 13 is the same as that used in Embodiment 1. Here, with respect to explanations of the anti-reflection film 13, the reflection-type liquid crystal cell 10 and the front light system 51, those explanations will be omitted since they were given in Embodiments 2 and 11.

In the present embodiment, the anti-reflection film 13 functions as the third light-directing body, in addition to the light-directing body 24a and the light-directing body 40 serving as the first and second light-directing bodies respectively.

Without the formation of the anti-reflection film 13, light released from the slanting portions 22 formed on the interface 23 (the first light-releasing surface) of the first light-directing body 24a would be reflected by approximately 4% by the bottom surface 42 (the second surface) of the second light-directing body 40, thereby forming reflected light rays. Images of the slanting portions 22 resulted from these reflected light rays and the slanting portions 22 interfere with each other, resulting in unevenness in the luminance distribution on the interface 28 (the second light-releasing surface) of the light-directing body 24a.

In the reflection-type LCD of the present embodiment, the anti-reflection film 13, which is the same as that disclosed in Embodiment 11, is placed between the bottom surface 42 of the second light-directing body 40 and the surface on the display surface side of the reflection-type liquid crystal cell 10. With the anti-reflection film 13 as placed in this manner, it is possible to suppress the occurrence of the reflected light rays more effectively. Therefore, it becomes possible to suppress unevenness in the luminance distribution on the interface 28, and consequently to provide a reflection-type LCD that achieves high-quality display.

As illustrated in FIGS. 50(a) and 50(b), when comparison is made between cases where the anti-reflection film 13 is place and where no anti-reflection film is placed, the pitch p of the luminance peak is maintained virtually equal over the entire bottom surface 42 of the second light-directing body 40 and the peak of the luminance is smooth indicating less unevenness in the luminance distribution in the case of FIG. 50(a) showing the luminance distribution with the anti-reflection film 13, as compared with FIG. 50(b) showing the luminance distribution without it.

Moreover, the anti-reflection film 13 is bonded by using a bonding agent having a refractive index $n_1$ that is virtually equal to the refractive index $n_2$ of the second light-directing body 40. Thus, it is possible to improve the anti-reflection effect virtually without altering the input-output conditions of light within the second light-directing body 40.

Moreover, since a product on the market as it is can be used as the anti-reflection film 13, it is possible to suppress the production cost of the front light system 51 from increasing further. Consequently, it becomes possible to obtain an inexpensive front light system 51 and a reflection-type LCD provided with such a front light system 51.

As described above, in the front-illuminating device of the present invention, an optical means, which suppresses light released from the second light-releasing surface of the first light-directing body from being reflected from the second surface, is placed on the second surface of the second light-directing body as the third light-directing body.

Normally, the second surface of the second light-directing body reflects a portion of light from the slanting portions formed on the second light-releasing surface of the first light-directing body, thereby forming reflected light rays. Due to the occurrence of these reflected light rays, reflection images are formed from the first light releasing-surface in the first light-directing body to the second light-releasing surface. As a result, these reflection images interfere with or are diffracted by the images on the slanting portions, resulting in unevenness in the luminance distribution or rainbow-colored spectrum on the surface of the object to be illuminated, when viewed by the observer.

However, with the above-mentioned arrangement, since the front-illuminating device is provided with the optical means as the third light-directing body, the occurrence of the reflected light rays, resulted from the incident light from the slanting portions that has been reflected by the second surface, can be suppressed. Therefore, it is possible to prevent interference or diffraction between the images on the slanting portions functioning as the minute light-source sections and the reflection images resulted from the reflected light rays. Consequently, it becomes possible to prevent the occurrences of unevenness in the luminance distribution and rainbow-colored spectrum on the display viewed from the observer side (from the second light-releasing surface).

In the front-illuminating device of the present invention, the optical means is provided as an anti-reflection film. Since an anti-reflection film as it is, which is available on the market, can be adopted as the optical means, it is possible to suppress the production cost of the front-illuminating device from increasing further. Consequently, it becomes possible to provide an inexpensive front-illuminating device.

In the front-illuminating device of the present invention, the optical means is bonded to the second light-directing body by a bonding agent having virtually the same refractive index as the refractive index of the second light-directing body. Therefore, it is possible to improve the anti-reflection effect virtually without altering the input-output conditions of light within the second light-directing body.

Embodiment 13

Referring to Figures, the following description will discuss still another embodiment of the present invention.

The reflection-type LCD of the present embodiment has virtually the same construction as those of the above-mentioned embodiments; however, it differs from those in that a periodic structure, which consists of transmitting sections and reflective sections formed on the surface of the light-directing body, is set so as to have a predetermined shape. This arrangement makes it possible to prevent Moire fringes that tend to occur in images of the reflection-type LCD having a front light, and also to prevent double images.

Figure 53:
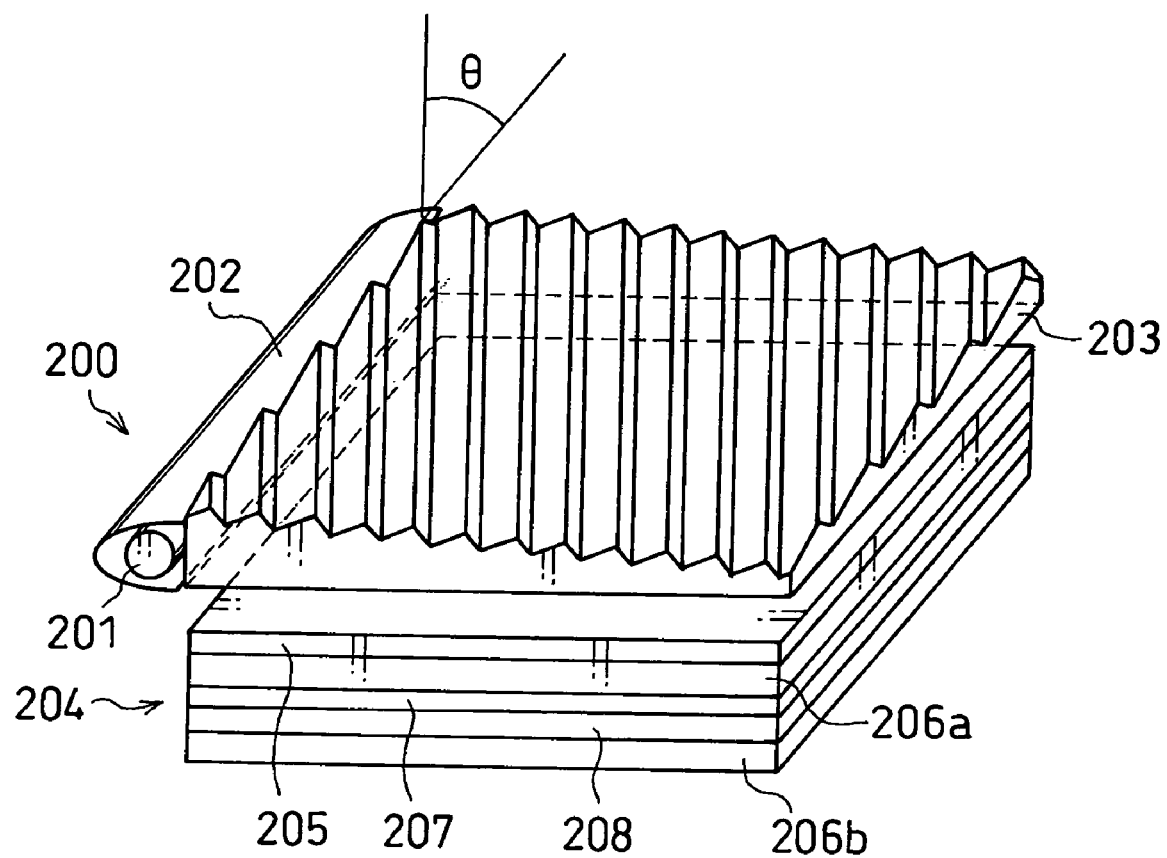
FIG. 53 is a perspective view that shows the constructions of a reflection-type liquid crystal cell and a front light in a reflection-type LCD in still another embodiment of the present invention.

First, an explanation will be given of the construction of a reflection-type LCD in accordance with the present embodiment. In the same manner as the reflection-type LCDs explained in the above-mentioned embodiments, as illustrated in FIG. 53, the reflection-type LCD of the present invention is provided with a front light 200 (an illuminating means) and a reflection-type liquid crystal cell 204 (a reflection-type liquid crystal element). The front light 200 is constituted by a light source 201, a diffusing reflection sheet 202 (light-conversing means) and a light-directing body 203. Here, the diffusing reflection sheet 202 corresponds to the reflection mirror 27 in Embodiment 1.

Moreover, the reflection-type liquid crystal cell 204 is constituted by a pair of glass substrates 206a and 206b between which a liquid crystal layer 207 is sealed in a sandwiched manner. The glass substrate 206a forms the display surface of the reflection-type liquid crystal cell 204, and a polarizing plate 205 is placed on the surface of this glass substrate 206a that does not contact the liquid crystal layer 207. In contrast, the glass substrate 206b forms the back surface of the reflection-type liquid crystal cell 204, and a reflective plate 208 is placed on the surface of the glass substrate 206b on the side contacting the liquid crystal layer 207.

In other words, the polarizing plate 205 is placed on the surface side of the reflection-type liquid crystal cell 204 on and from which light is made incident and released, and the reflective plate 208 is placed on the back surface side so as to reflect the incident light that has passed through the liquid crystal layer. In this manner, the construction of the reflection-type liquid crystal cell 204 in the present embodiment is virtually the same as the construction (see FIG. 37) of the reflection-type liquid crystal cell 10a in Embodiment 11.

The following description will discuss image display on the above-mentioned reflection-type liquid crystal cell 204. Illuminating light, which has been made incident on the reflection-type liquid crystal cell 204 from the light source 201 through the light-directing body 203, is allowed to reach the reflective plate 208 through the polarizing plate 205 and the liquid crystal layer 207, and reflected by the reflective plate 208 and then released after again passing through the liquid crystal layer 207 and the polarizing plate 205. Here, the above-mentioned illuminating light is modulated by the liquid crystal layer 207 in its polarizing state while it is reflected by the reflective plate 208 after passing through the polarizing plate 205 and the liquid crystal layer 207. Thus, the quantity of light released from the reflection-type liquid crystal cell 204 is controlled so that images are displayed.

A detailed explanation is further given of the above-mentioned image display. In the present embodiment, as illustrated in FIGS. 54(a) and 54(b), the polarizing plate 205 is constituted by a polarizing layer 205a and a λ/4 plate 205b that are respectively arranged so that the transmitting axis or the absorbing axis of the polarizing layer 205a is allowed to make an angle of 45° with the lag axis or the condensive axis of the λ/4 plate 205b.

Figure 54A:
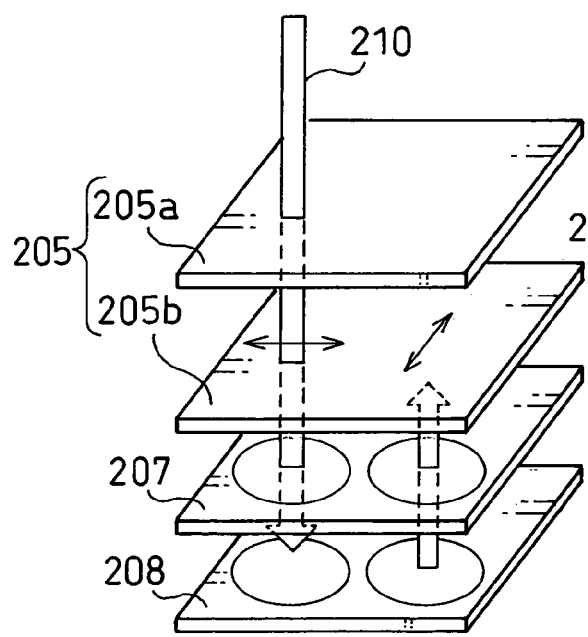
FIGS. 54(a) and 54(b) are perspective views showing the displaying principle of the reflection-type liquid crystal cell shown in FIG. 53.
Figure 54B:
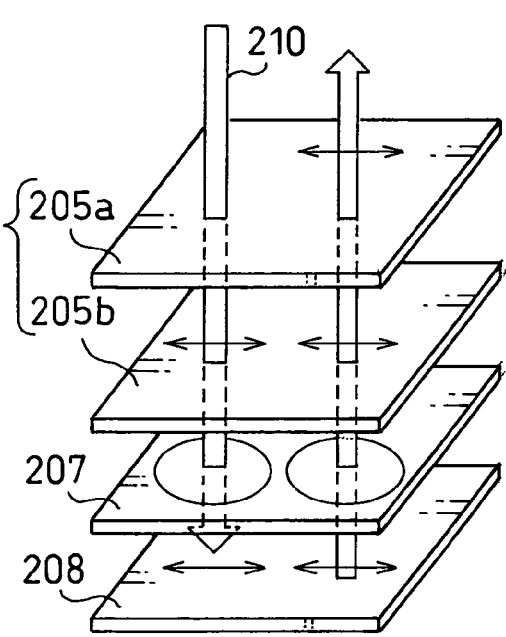

On this polarizing plate 205, illuminating light 210 is made incident through the light-directing body 203 (not shown in FIGS. 54(a) and 54(b)), and some of the illuminating light 210, which is linearly polarized light that has passed through the polarizing layer 205a, is converted by the λ/4 plate 205b into circularly polarized light, and made incident on the liquid crystal layer 207.

In the case when the incident circularly polarized light is not modulated by the liquid crystal layer 207, the rotation direction of the circularly polarized light is reversed as illustrated in FIG. 54(a) when reflected by the reflective plate 208. The circularly polarized light, which has the reversed rotation direction, is again allowed to pass through the λ/4 plate 205b and then reach the polarizing layer 205a. Here, the circularly polarized light is converted into linearly polarized light that is orthogonal to the transmitting axis of the polarizing layer 205a, and absorbed. Therefore, in the case when the circularly polarized light is not modulated by the liquid crystal layer 207, black display is obtained.

In contrast, in the case when the liquid crystal layer 207 modulates the incident circularly polarized light so as to be reflected with its polarized state being maintained, the circularly polarized light, released from the reflection-type liquid crystal layer 207 after having been reflected by the reflective plate 208, has the same rotation direction as that at the time of the incident, as illustrated in FIG. 54(b). When this circularly polarized light is allowed to pass through the λ/4 plate 205b and reach the polarizing layer 205a, it is formed into linearly polarized light that is coincident with the transmitting axis of the polarizing layer 205a, and released from the reflection-type liquid crystal cell 204. Therefore, when the circularly polarized light is modulated by the liquid crystal layer 207, white display is obtained.

Here, the directions of the transmitting axis of the polarizing layer 205a and the lag axis of the λ/4 plate 205b are determined by taking into consideration the orientation direction of the liquid crystal material used for the liquid crystal layer 207, the characteristic of the viewing angle, etc.; and they are not intended to be particularly limited. Moreover, the surface of the polarizing layer 205a may be subjected to an anti-reflection treatment. In this case, it is possible to prevent the reflected light from the surface of the polarizing layer 205a, and consequently to improve the display quality. Here, with respect to the anti-reflection treatment, for example, formation of an anti-reflection film, which will be described later, etc. may be adopted.

In the above-mentioned reflection-type liquid crystal cell 204, a plurality of pixels, arranged in a predetermined pattern, are formed on the glass substrate 206a. When color display is carried out by the reflection-type liquid crystal cell 204, color filters of three primary colors, red (R), green (G) and blue (B), are disposed on each of the pixels. The illuminating light 210 is colored when passing through these color filters, thereby making it possible to display color images.

Figure 55:
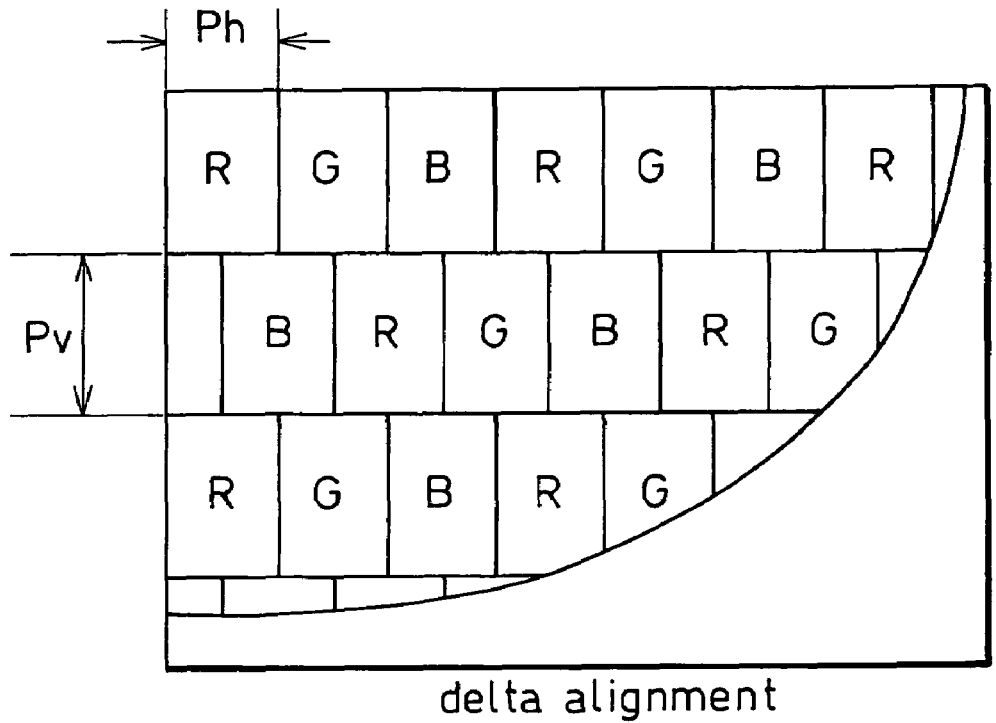
FIG. 55(a) is a plan view showing a delta arrangement that is one example of patterns of the pixel arrangement of the reflection-type liquid crystal cell shown in FIG. 53.
FIG. 55(b) is a plan view showing a stripe arrangement that is one example of patterns of the pixel arrangement of the reflection-type liquid crystal cell shown in FIG. 53.
Figure 55:
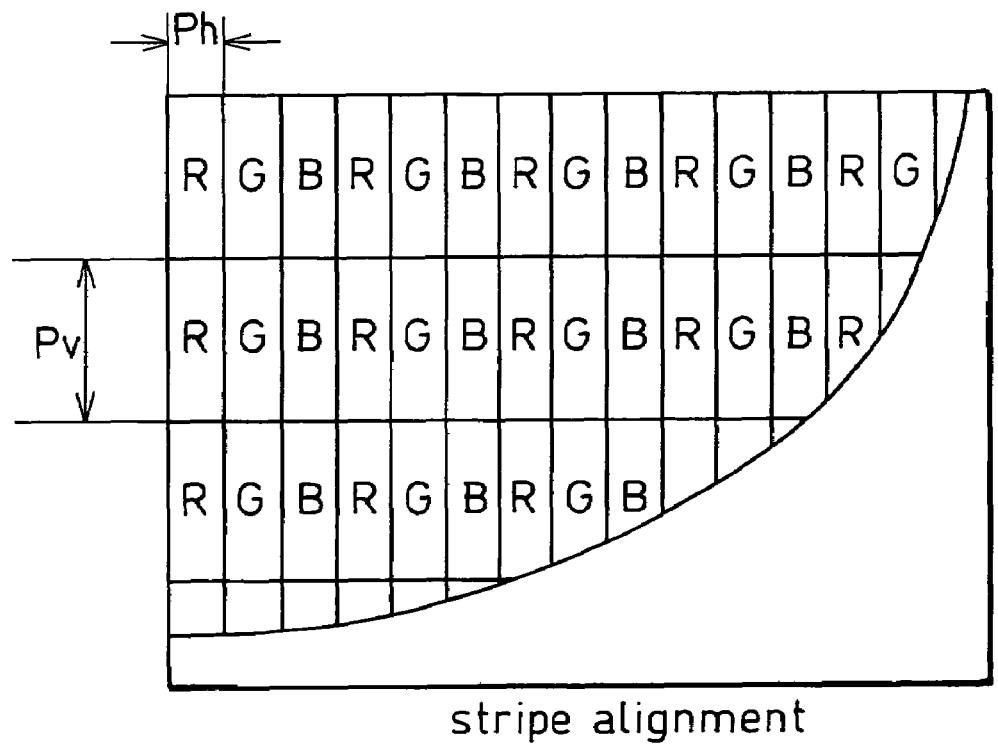

With respect to the pattern arrangement of the respective pixels of R, G and B, various patterns are listed, and not particularly limited; however, for typical examples, a delta arrangement as shown in FIG. 55(a) and a stripe arrangement as shown in FIG. 55(b) may be listed. Here, as shown in FIGS. 55(a) and 5.5(b), in the present embodiment, the width of each pixel in the horizontal direction on the screen is defined as Ph, and the width thereof in the vertical direction is defined as Pv. These pixels are repeated in the horizontal direction or in the vertical direction on the screen depending on the kinds of pattern arrangements.

The number of pixels formed on the reflection-type liquid crystal cell 204 and the size of the respective pixels are not particularly limited; and they are set under various conditions. In the present embodiment, a 3.9-type QVGA reflection-type liquid crystal cell is used in which the pattern arrangement of the pixels is a stripe arrangement with the number of horizontal pixels× the number of vertical pixels of 320×(R•G•B)×240, and with respect to the size of the pixels, the width Ph in the horizontal direction is 80 μm and the width Pv in the vertical direction is 240 μm.

Here, in the present embodiment, since the pattern arrangement of the pixels is the stripe arrangement, a group of pixels of R•G•B having a virtually rectangular shape is repeated in this order along the horizontal direction of the screen as illustrated in FIG. 55(b). In the color image display, respective pixels of R•G•B form a set of pixels so that in this stripe arrangement, sets of the respective pixels of R•G•B are arranged in one row along the horizontal direction of the screen. Here, supposing that the arrangement of the sets of pixels in one row is a pixel row, the pixel row is further repeated in the vertical direction of the screen.

In other words, the above-mentioned stripe arrangement is a periodic arrangement in which the pixel row is periodically repeated in the vertical direction of the screen. Therefore, hereinafter, the above-mentioned vertical direction is referred to as the repeating direction. Here, the repeating direction is a relative direction, and if the pixels are formed in one row in the vertical direction in the reflection-type liquid crystal cell 204 with the pixel row being repeated along the horizontal direction of the screen, the horizontal direction corresponds to the repeating direction. Moreover, as can be seen from FIG. 55(*a*), the repeating direction of the delta arrangement corresponds to the vertical direction.

Figure 56A:
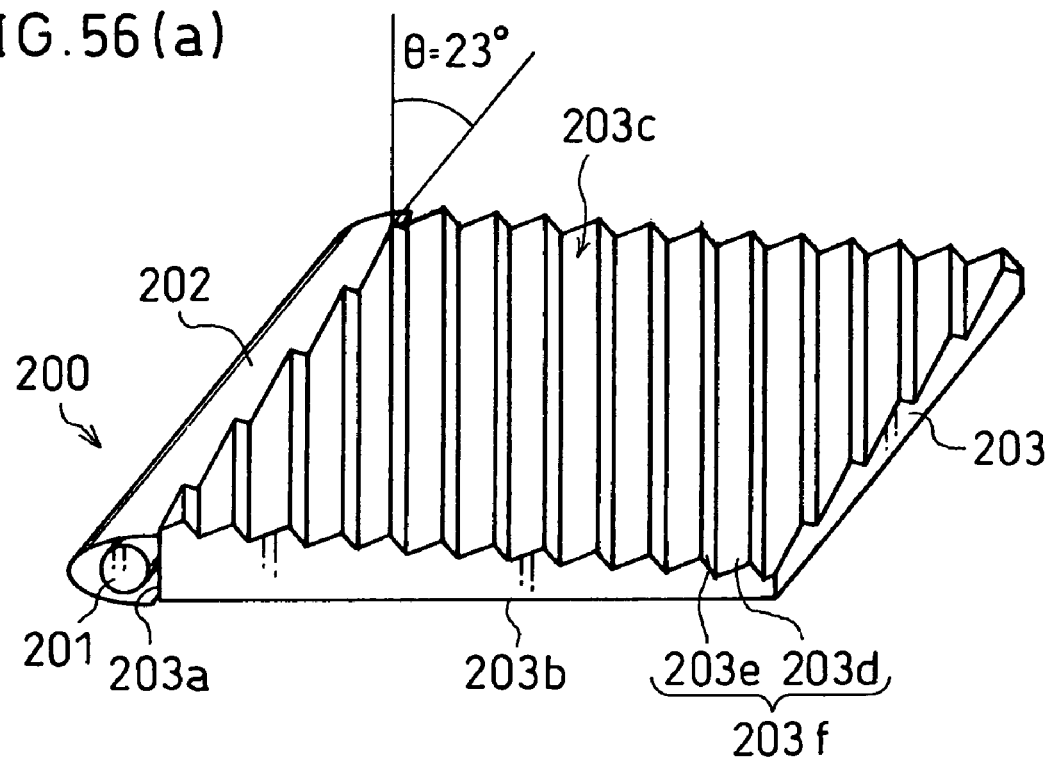
FIG. 56(a) is a perspective view that shows the construction of the front light shown in FIG. 53.
Figure 56B:
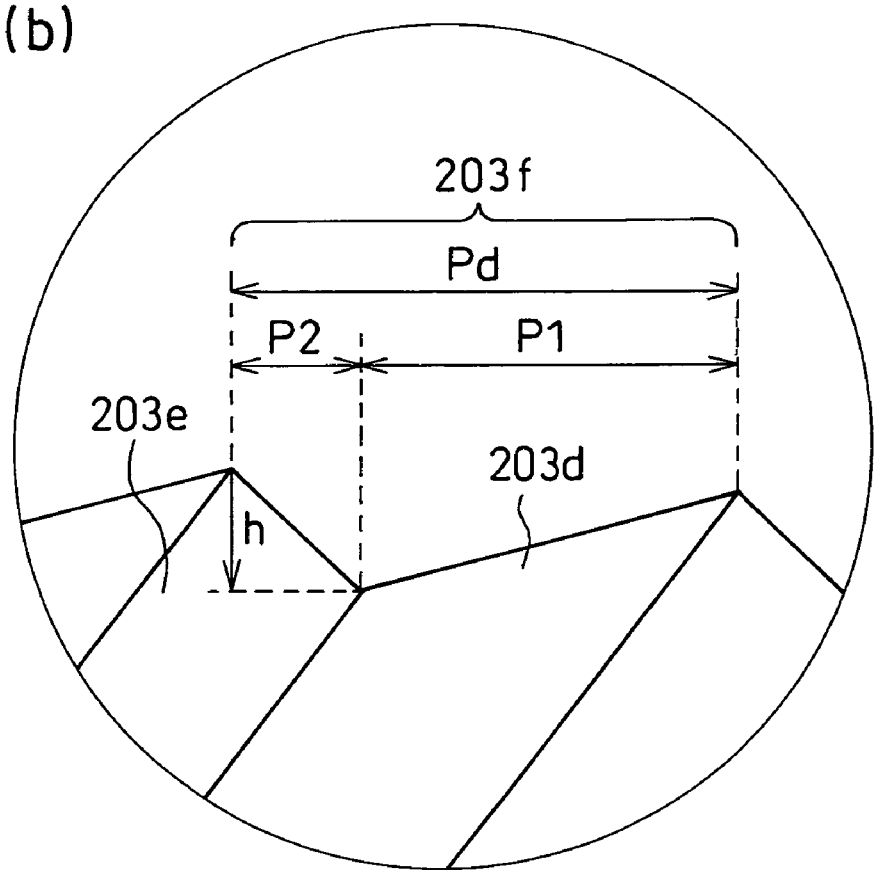
FIG. 56(b) is an explanatory drawing that shows a periodic structure in the front light.

A detailed explanation will be given of the front light 200. As illustrated in FIG. 56(*a*), the front light 200 of the present embodiment is provided with the light source 201, the diffusing reflection sheet 202 and the light-directing body 203. The light source 201 is installed along the side face (incident face 203*a*, which will be described later) of the light-directing body 203 having a virtually flat plate shape, and the diffusing reflection sheet 202 is placed on the periphery thereof. Most of light from the light source 201 is directed to the light-directing body 203 by this diffusing reflection sheet 202.

With respect to the light source 201, for example, a fluorescent lamp is used in the present embodiment; however, it is not particularly limited thereby, and an EL, an LED or a combination of an LED and a rod-shape light-directing body, etc. may be used as long as it serves as a light source for uniformly projecting illuminating light to the incident face 203*a* of the light-directing body 203.

In the same manner as the aforementioned embodiments, the light-directing body 203 is provided with the incident face 203*a* opposing the light source 201, a light-releasing surface 203*b* (first light-releasing surface) for releasing light from the light source 201 to the reflection-type liquid crystal cell 204, and an opposing face 203*c* (second light-releasing surface) that is placed so as to face the light-releasing surface 203*b*.

In the aforementioned embodiments, a periodic structure in which a set of a flat portion 21 and a slanting portion 22 is repeated is formed on the second light-releasing surface. In contrast, in the present embodiment, as also illustrated in FIG. 56(*b*), a periodic structure 203*f* which has a prism shape and consists of a transmitting section 203*d* and a reflection section 203*e* is formed on the surface of the opposing face 203*c*.

In the present embodiment, as illustrated in FIG. 56(*b*), the width of the periodic structure 203*f* is defined as Pd, the width of the transmitting section 203*d* is defined as P1 and the width of the reflection section 203*e* is defined as P2. In this case, the relationship, Pd=P1+P2, is satisfied. Moreover, the height of the prism formed by the transmitting section 203*d* and the reflection section 203*e* is defined as h.

The above-mentioned light-directing body 203 may be formed by using a transparent material that can direct light from the light source 201 uniformly without damping and that has an appropriate value in its refractive index. With respect to the material for the light-directing body 203, specific examples include transparent resins such as acrylic resins, such as polymethylmethacrylate, polycarbonate resins and epoxy resins, glass, etc. Moreover, with respect to the molding method, which is properly selected depending on materials, and not particularly limited, a processing method such as an injection molding method may be adopted in the case of transparent resins. In the present embodiment, the light-directing body 203 was manufactured by using polymethylmethacrylate that is a transparent resin through injection molding.

It is preferable to apply an anti-reflection treatment (not shown) to the light-releasing surface 203*b* of the light-directing body 203. The application of the anti-reflection treatment makes it possible to reduce reflection on the light-releasing surface 203*b* of light released from the light source 201, and consequently to improve the transmittance of the light-directing body 203. With respect to this anti-reflection treatment, an anti-reflection film, which reduces reflection energy by using an interference effect resulting from a plurality of thin films, may be used as one of the specific methods.

With respect to the above-mentioned anti-reflection film, for example, a construction in which thin films of 0.1 µm, such as a magnesium fluoride film ($MgF_2$) and a silicon oxide ($SiO_2$) film, are alternately formed is preferably used. This anti-reflection film can be directly formed on the light-releasing surface 203*b* by vapor deposition. In the present embodiment, the formation of the anti-reflection film constituted by alternately laminated thin-films made it possible to reduce the surface reflection of the light-releasing surface 203*b* from approximately 4% to approximately not more than 1%. As a result, the transmittance of the light-directing body 203 is further improved, thereby making it possible to provide lighter display.

In the reflection-type LCD in accordance with the present invention, the front light (front-illuminating device) as explained in the aforementioned embodiments is provided as an auxiliary light source so as to achieve superior image display even under environmental conditions lacking a sufficient quantity of ambient light. However, when the front light is placed on the screen of the reflection-type liquid crystal cell, interference of light tends to occur between the arrangement of pixels formed on the reflection-type liquid crystal cell and the periodic structure formed on the second light-releasing surface of the front light. As a result, Moire fringes, etc. appear on a displayed image, causing degradation in the display quality of images.

Moreover, double images tend to occur in a displayed image depending on the periodic structure formed on the second light-releasing surface of the front light. For example, when the periodic structure is provided as a periodic structure 203*f* consisting of a transmitting section 203*d* and a reflection section 203*e* as described in the present embodiment, double images tend to occur since light rays are released from both of the transmitting section 203*d* and the reflection section 203*e*.

Therefore, in the present embodiment, by designing the periodic structure into a predetermined shape, the occurrence of interference of light and the occurrence of double images are prevented so as to improve the display quality of images. The following description will discuss the shape of the periodic structure of the present embodiment.

In the periodic structure 203*f* of the present embodiment, it becomes possible to prevent the occurrence of interference and the occurrence double images by properly setting (1) the formation angle of the periodic structure 203*f* and (2) the formation gap of the periodic structure 203*f*. Here, (2) the formation gap of the periodic structure 203*f* includes formation gaps of the transmitting sections 203*d* and the reflection sections 203*e* and the ratios thereof. The following description will discuss (1) the formation angle of the periodic structure 203*f* and the setting of (2) the formation gap of the periodic structure 203*f* in more detail.

(1) Setting of Formation Angle of the Periodic Structure 203

As described earlier, a plurality of pixels are arranged in a predetermined pattern (stripe arrangement in the present invention) on the reflection type liquid crystal cell 204; and it is possible to reduce or, more preferably, to prevent the occurrence of interference of light, by varying the angle of formation (hereinafter, referred to as the formation angle θ) of the periodic structure 203f with respect to the repeating direction of one pixel row, that is, the formation direction of the pixel period, in the stripe arrangement.

More specifically, by properly selecting the width of the light-directing body in accordance with the pixel width formed on the reflection-type liquid crystal cell 204, the formation angle θ is preferably set in the range of not less than 10° to not more than 75° (10°≦θ≦75°), and more preferably, in the range of not less than 20° to not more than 55° (20°≦θ≦55°). When the formation angle θ of the periodic structure 203f is within the above-mentioned range, it becomes possible to positively prevent the occurrence of interference of light, that is, in particular, the occurrence of Moire fringes.

With respect to the formation angle θ of the periodic structure 203f, the following Table 1 shows the relationship among the width Pd of the periodic structure 203f, the width of the pixel row in the repeating direction, that is, the pixel pitch P1c, and the formation angle θ of the periodic structure 203f. Here, in the Table, (−) represents that Moire fringes occurred regardless of the setting of the formation angle θ.

TABLE 1

Range of formation angle θ capable of preventing Moire fringes

| Width of Periodic Structure Pd = P1 + P2 | Formation Angle θ (°) of Periodic Structure for Preventing Moire Fringes with respect to Pixel Pitch P1c | | | |
|---|---|---|---|---|
| | P1c = 0.139 mm | P1c = 0.240 mm | P1c = 0.270 mm | P1c = 0.288 mm |
| Pd = 160 μm | — | — | 12 to 30 | 15 to 65 | 17 to 65 |
| Pd = 200 μm | — | — | 24 to 35 | 10 to 30 |
| Pd = 240 μm | — | 30 to 50 | — | — |
| Pd = 280 μm | — | 30 to 50 | 27 to 50 | — |
| Pd = 300 μm | — | 20 to 55 | 20 to 55 | 23 to 55 |
| Pd = 390 μm | — | 20 to 55 | 15 to 35 | 20 to 55 |
| Pd = 500 μm | 10 to 15 | 15 to 75 | 15 to 75 | 17 to 75 |

As shown in Table 1, although the angle range of the formation angle θ of the periodic structure 203f varies since the pixel pitch P1c and the width Pd of the periodic structure 203f respectively vary, it is possible to determine the formation angle θ of the periodic structure 203f capable of preventing the occurrence of Moire fringes by properly selecting the width Pd of the periodic structure 203f with respect to the pixel pitch P1c. Here, as indicated in Table 1, the formation angle θ is preferably set in the range of not less than 10° to not more than 75°.

The more specific value of the formation angle θ is appropriately set in accordance with the constructions of the front light 200 and the reflection-type liquid crystal cell 204, etc., and it is not particularly limited as long as it is within the above-mentioned range. In the present embodiment, the light-directing body 203 is formed so as to set the formation angle θ of the periodic structure 203f at approximately 23° (θ=23°). With this formation, no interference of light occurs between the pixel arrangement of the reflection-type liquid crystal cell 204 and the periodic structure 203f, and consequently, since the occurrence of Moire fringes is prevented, it is possible to avoid degradation in the display quality.

(2) Setting of Formation Gap of the Periodic Structure 203f
(2-1) Setting of the Width Pd of the Periodic Structure 203f As described earlier, the periodic structure 203f is constituted by the transmitting section 203d and the reflection section 203e. Here, the width of the transmitting section 203d is P1, and the width of the reflection section 203e is P2; therefore, the width Pd of the periodic structure 203f is Pd=P1+P2. In the present embodiment, the width Pd of the periodic structure 203f is preferably set in the range of not less than 0.05 mm to not more than 1.0 mm.

In the case when the width Pd of the periodic structure 203f is less than 0.05 mm, the periodic structure 203f causes light diffraction, resulting in degradation in the display quality of images. In contrast, in the case when the width Pd exceeds 1.0 mm, the roughness of the periodic structure 203f becomes conspicuous on the opposing face 203c of the light-directing body 203. For this reason, the periodic structure 203f is easily recognized on the screen by the observer, resulting in degradation in the display quality of images. Therefore, by setting the width Pd in the above-mentioned range, it is possible to positively avoid the degradation in the display quality of images.

The more specific value of the above-mentioned width Pd is properly set in accordance with the constructions of the front light 200 and the reflection-type liquid crystal cell 204, etc.; and it is not particularly limited as long as it is within the above-mentioned range. In the present embodiment, in the case of θ=23° of the formation angle θ of the periodic structure 203f, the light-directing body 203 is formed so as to set the width Pd of the periodic structure 203f at Pd=390 μm.

(2-2) Setting of the Width P2 of the Reflection Section 203e with Respect to the Width P1 of the Transmitting Section 203d Moreover, in the present embodiment, it is greatly preferable to set the width P2 of the reflection section 203e so as to be smaller than the width P1 of the transmitting section 203d (P1>P2) in the periodic structure 203f. This setting allows the incident light from the light source 201 to be effectively released to the reflection-type liquid crystal cell 204, and also makes the observer view images mainly on the transmitting section 203d, thereby making it possible to prevent double images.

In the present embodiment, in particular, the construction satisfying the relationship P1>P2 is preferably combined with the construction that sets the formation angle θ of the periodic structure 203f in the range of not less than 10° to not more than 75°. This arrangement ensures to prevent the occurrence of Moire fringes as well as the occurrence of double images.

In the construction satisfying the relationship P1>P2, the ratio P2/P1 (hereinafter, referred to simply as ratio P2/P1) between the width P1 of the transmitting section 203d and the width P2 of the reflection section 203e is always set to less than 1. In this case, it is preferable to also limit this ratio P2/P1 to a predetermined range. More specifically, the ratio P2/P1 is preferably set in the range of not less than 0.01 to not more than 0.20. Since this arrangement makes the width P1 of the transmitting section 203d greater than the width P2 of the reflection section 203e, the observer is allowed to view images virtually only on the transmitting section 203d. Therefore, it becomes possible to more positively prevent double images.

The specific values of the width P1 of the transmitting section 203d and the width P2 of the reflection section 203e are properly set in accordance with the constructions of the front light 200 and the reflection-type liquid crystal cell 204, etc.; and they are not particularly limited as long as they are within the above-mentioned range. In the present embodiment, in the case when the formation angle θ of the periodic structure 203f is θ=23° and the width Pd of the periodic structure 203f is Pd=390 μm, the light-directing body 203 is formed so as to set the width P1 of the transmitting section 203d at an average value of 375 μm (P1=375 μm) and to set the width P2 of the reflection section 203e at an average value of 15 μm (P2=15 μm). Moreover, in the light-directing body 203, the height of the prism formed by the transmitting section 203d and the reflection section 203e is set to 15 μm (h=15).

Figure 57:
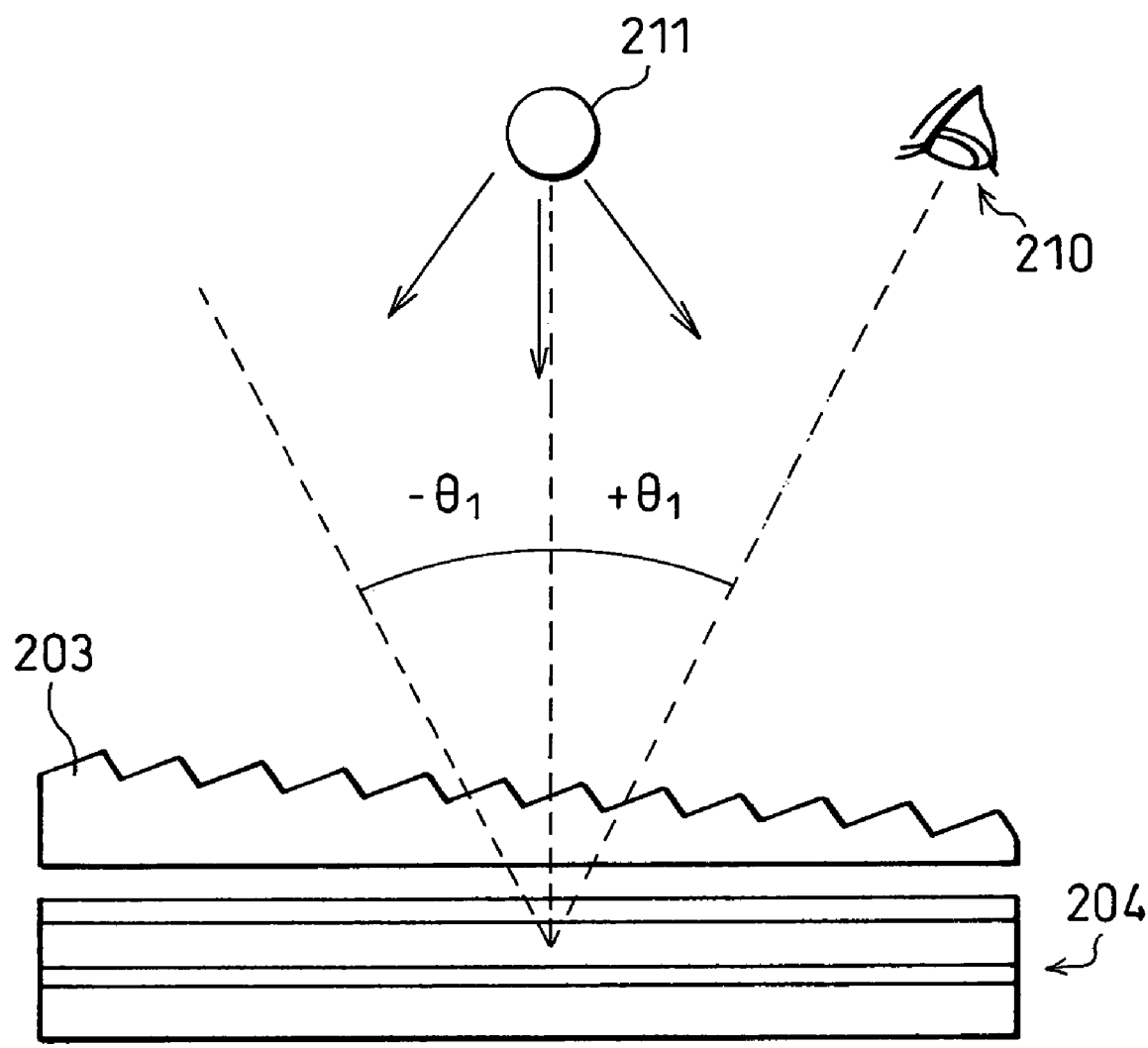
FIG. 57 is a cross-sectional view that shows one example of the evaluation method for double images in the reflection-type LCD shown in FIG. 53.

Here, an explanation will be given of an evaluation method on double images in the reflection-type LCD of the present embodiment. As illustrated in FIG. 57, first, a reflection-type LCD (see FIG. 53) was formed by arranging a front light 200 in front of a reflection-type liquid crystal cell 204. In this case, FIG. 57 shows only the light-directing body 203. Next, light was directed to this reflection-type LCD from an external light source 211. Then, the observer 210 viewed an image with an observation angle θ₁ with respect to the normal to the screen of the reflection-type LCD; thus, the degree of double images at this time was observed. Here, a fluorescent lamp was used as the external light source 211, with the observation angle θ₁ being set in the range of −45° to +45° (−45°≦θ₁≦+45°).

Table 2 shows the relationship between the degree of double images and the ratio P2/P1. In table 2, ○ indicates that no double images occurred within the above-mentioned range, Δ indicates that, although double images slightly occurred, no adverse effects were given on the display as well as recognition of the image, and x indicates that double images occurred and serious adverse effects were given on the display quality, resulting in degradation in the image quality.

TABLE 2

Relationship between the ratio P2/P1 and double images

| | Ratio P2/P1 | | | | | |
|---|---|---|---|---|---|---|
| | 0.01 | 0.05 | 0.10 | 0.15 | 0.20 | 0.25 |
| Degree of Double Images | ○ | ○ | Δ | Δ | Δ | x |

As can be seen from Table 2, the ratio P2/P1 in the range of not less than 0.01 to not more than 0.20 is effective to suppress double images, and more preferably, the ratio P2/P1 in the range of not less than 0.01 to not more than 0.05 ensures to eliminate double images.

The specific value of the ratio P2/P1 is properly set in accordance with the constructions of the front light 200 and the reflection-type liquid crystal cell 204, etc.; and it is not particularly limited as long as it is within the above-mentioned ranges. In the present embodiment, in the case when the formation angle θ of the periodic structure 203f is θ=23°, the width Pd of the periodic structure 203f is Pd=390 μm, the width P1 of the transmitting section 203d has an average value of 375 μm and the width P2 of the reflection section 203e has an average value of 15 μm, the light-directing body 203 is formed so as to set the above-mentioned ratio P2/P1 in the range of not less than 0.026 to not more than 0.054 (0.026≦P2/P1≦0.054).

(2-3) Change in the Width P2 of the Reflection Section 203e

The reason that, in the present embodiment, the above-mentioned settings, that is, the width P1 of the transmitting section 203d of the average value 375 μm, the width P2 of the reflection section 203e of the average value 15 μm and the above-mentioned ratio P2/P1 in the range of not less than 0.026 to not more than 0.054, can be made is because the width P2 of the reflection section 203e is properly changed in the periodic structure 203f.

That is, in the present embodiment, it is more preferable to set the width P2 of the reflection section 203e to become smaller as it approaches the incident surface 203a (the surface on which the light source 201 is placed), that is, to become greater as it departs therefrom in the periodic structure 203f. In other words, in the light-directing body 203, it is preferable to set the above-mentioned ratio P2/P1 so as to become gradually greater in the departing direction from the incident surface 203a. This arrangement makes it possible to uniform the distribution of light released from the light-directing body 203, and consequently to uniform the illuminating light 210 released toward the reflection-type liquid crystal cell 204.

The change in the width P2 of the reflection section 203e is properly set in accordance with the constructions of the front light 200 and the reflection-type liquid crystal cell 204, etc.; and it is not particularly limited as long as it is within the above-mentioned range. In the present embodiment, since the average value of the width P2 of the reflection section 203e is set to 15 μm, the width P2 of the reflection section 203e is set so as to become shorter than 15 μm as it approaches the incident surface 203a, and also set so as to become longer than 15 μm as it departs from the incident surface 203a.

With respect to the more specific values, the width P2 of the reflection section 203e was set to, for example, P2=10 μm in the vicinity of the incident surface 203a, and it was also set to, for example, P2=20 μm in the farthest position (that is, the side of the light-directing body 203 opposing the incident surface 203a) from the incident surface 203a. In this case, of course, the average value of the width P2 of the reflection section 203e was 15 μm. With this arrangement, since the illuminating light from the reflection section 203e is uniformed between positions closer to the incident surface 203a where the light from the light source 201 becomes stronger and positions farther from the incident surface 203 where the light becomes weaker, it is possible to direct the uniform illuminating light to the surface of the reflection-type liquid crystal cell 204.

Additionally, in the present embodiment, the periodic structure 203f formed on the opposing face 203c of the light-directing body 203 has a prism shape; however, the present invention is not intended to be limited thereby. In other words, the periodic structure 203f, formed on the opposing face 203c, only needs to serve as a periodic structure which is formed so as to transmit light from the light source 201 through the light-directing body 203 and allow it to be reflected from the light-releasing surface 203b, and also so as to release the light from the liquid crystal cell (not particularly limited to the reflection-type) from the opposing face 203c. More specifically, the periodic structure 203f may be constituted by a flat section and a slanting section as described in the respective embodiments, or may have a shape with protrusions and recesses, such as a trapezoidal shape, a lenticular shape and a spherical shape.

As described above, in the present embodiment, the periodic structure constituted by the transmitting section and the reflection section formed on the opposing face of the light-directing body is formed so as to make an angle in the range of not less than 10° to not more than 75°, and more preferably, not less than 20° to not more than 55° (more specifically, approximately 23°) with respect to the repeating direction of the period of one row of pixels formed on the reflection-type liquid crystal cell. This arrangement makes it possible to prevent the occurrence of Moire fringes, etc. due to interference of the above-mentioned periodic structure and the pixel arrangement.

Moreover, in the present embodiment, the width P2 of the reflection section is made smaller than the width P1 of the transmitting section of the periodic structure formed on the opposing face of the light-directing body, and the periodic structure is formed so that the ratio P2/P1 between the width P1 of the transmitting section and the width P2 of the reflection section is set in the range of not less than 0.01 to not more than 0.20, and more preferably, in the range of 0.026 to 0.054. This arrangement makes the observer view images mainly on the transmitting section, thereby making it possible to prevent double images.

Furthermore, in the present embodiment, the width Pd of the periodic structure is set in the range of not less than 0.05 mm to not more than 1.0 mm (more specifically, Pd=0.39 mm). This arrangement makes the roughness of the periodic structure formed on the opposing face of the light-directing body less conspicuous, and also prevents light diffraction.

In addition, in the present embodiment, the ratio P2/P1 of the widths of the transmitting section and the reflection section is made greater in the departing direction from the incident surface. Thus, the width of the reflection section is made greater so that it is possible to uniform the distribution of light released from the light-directing body, and consequently to further uniform the illuminating light toward the reflection-type liquid crystal cell. As a result, it becomes possible to further improve the display quality of the reflection-type LCD.

Moreover, in the present embodiment, the front light is formed by one sheet of a light-directing body. Therefore, it is possible to obtain a thin, light-weight illuminating means, and also to prevent the occurrence of Newton rings in the resulting images.

Embodiment 14

Referring to Figures, the following description will discuss still another embodiment of the present invention. Here, those members that have the same functions and that are described in embodiment 13 are indicated by the same reference numerals and the description thereof is omitted.

Figure 58:
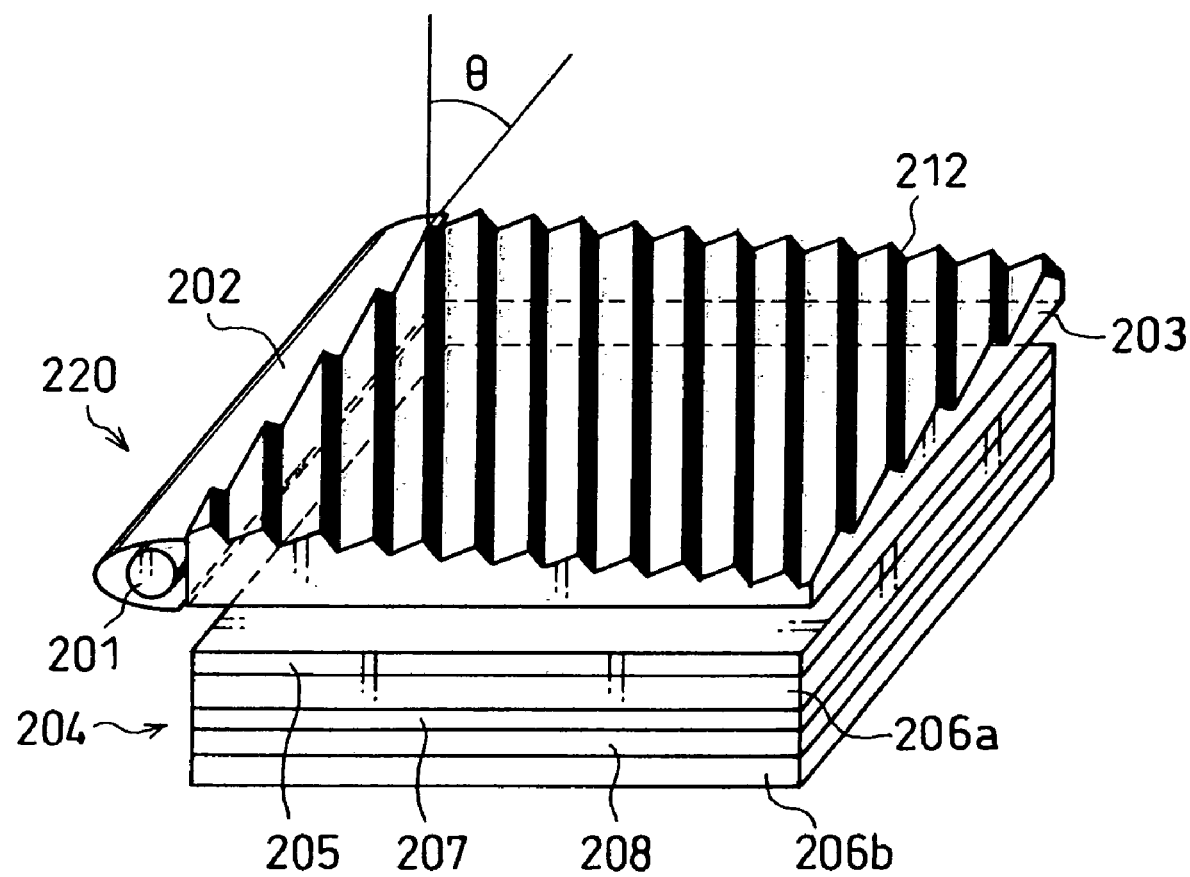
FIG. 58 is a perspective view that shows the construction of the reflection-type liquid crystal cell and the front light in the reflection-type LCD in still another embodiment of the present invention.

As illustrated in FIG. 58, the reflection-type LCD of the present embodiment has basically the same construction as that of the above-mentioned embodiment 13; however, it is different in that a light-shielding means is formed on the back surface of the reflection section 203e formed on the surface of the light-directing body 203, and the surface of this light shielding means is preferably subjected to a low reflection treatment.

More specifically, as illustrated in FIG. 58, the front light 220 is provided with a light source 201, a diffusing reflection sheet 202 covering the light source 201 and a light-directing body 203. Here, the reflection-type liquid crystal cell 204 is provided with a polarizing plate 205 placed on its surface, a pair of glass substrates 206a and 206b, a liquid crystal layer 207 sandwiched between these glass substrates 206a and 206b, and a reflective plate 208. A periodic structure 203f constituted by a transmitting section 203d and a reflection section 203e is formed in the light-directing body 203 in the same manner as the aforementioned embodiment 13.

In the front light 220 of the present embodiment, a light-shielding film 212 serving as the light-shielding means is formed on a portion corresponding to the reflection section 203e on the opposing face 203c (the surface on which images are viewed by the observer), that is, a portion corresponding to the back surface of the reflection section 203e for reflecting light from the light source 201.

Although the reflection section 203e reflects the light directed from the light source 201, it constitutes a part of the light-directing body 203 formed by a transparent material; therefore, if this part is left as it is, images of the pixels might be viewed by the observer through light released from the reflection section 203e. For this reason, the light-shielding film 212 is formed on the back surface (the surface of the opposing face 203c) of the reflection section 203e so as to shield the light released from the reflection section 203e; thus, the observer is allowed to view only images on the transmitting section 203d. Consequently, it becomes possible to prevent double images more positively.

With respect to the light-shielding film 212, a chromium (Cr) film is used in the present embodiment; however, the present invention is not intended to be limited by this, and other metal thin-films such as aluminum (Al) and silver (Ag) may be formed.

In this case, the light-shielding film 212 is formed on the surface (opposing face 203c) on the viewing side of the light-directing body 203. However, since the light-shielding film 212 is formed by a material capable of reflecting light effectively, external light tends to be reflected by the light-shielding film 212. As a result, this surface reflection causes degradation in the display quality of images. Therefore, it is greatly preferable to apply a low reflection treatment (not shown in FIG. 58) onto the top layer of the light-shielding film 212. This treatment makes it possible to reduce the surface reflection by the light-shielding film 212, and consequently to further improve the display quality of images of the reflection-type LCD.

With respect to this low reflection treatment, a thin film of chromium oxide ($Cr_2O_3$) is formed in the present embodiment. However, the low reflection treatment is not intended to be limited thereby, and in place of this, a single layer film of silicon oxide ($SiO_2$) or a laminated low reflection film, formed by alternately stacking a silicon oxide film and an titanium oxide ($TiO_2$) film, may be formed.

The formation method of the above-mentioned chromium thin film and chromium oxide thin film is not particularly limited; and in the present embodiment, these films were respectively formed by a sputtering method in the present embodiment. This thin-film forming process is explained as follows: First, the respective thin films were formed on the entire surface of the light-directing body 203 by sputtering, and the respective thin films were selectively left on areas corresponding to the back surface of the reflection section 203e through a photolithography process. Here, the film thickness of the chromium thin film was set to 0.1 μm and the film thickness of the chromium oxide thin film was set to 0.5 μm.

In the present embodiment, a 8.4-type VGA reflection-type liquid crystal cell was used in which the pattern arrangement of the pixels was a stripe arrangement with the number of horizontal pixels× the number of vertical pixels of 640× (R•G•B)×240, and with respect to the size of the pixels, the width Ph in the horizontal direction is 90 μm and the width Pv in the vertical direction is 270 μm.

Figure 59A:
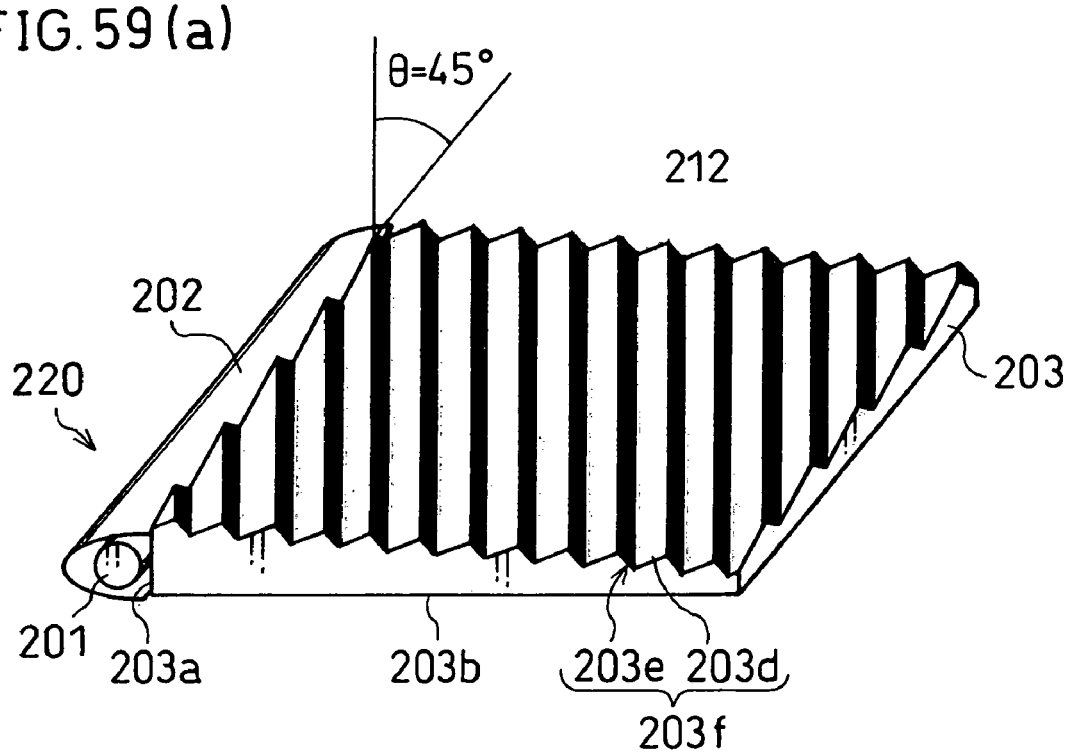
FIG. 59(a) is a perspective view that shows the construction of the front light shown in FIG. 58.
Figure 59B:
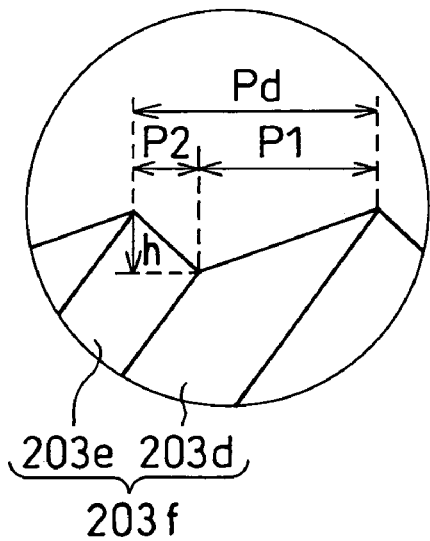
FIG. 59(b) is an explanatory drawing that shows the periodic structure in the above-mentioned front light.

The following description will discuss the construction of the front light 220 in more detail. In the same manner as the aforementioned embodiments, as illustrated in FIG. 59(a), the front light 220 is provided with the light source 201, the diffusing reflection sheet 202 and the light-directing body 203; and the light-directing body 203 is provided with the incident surface 203a, the light-releasing surface 203b and the opposing face 203c. As illustrated in FIG. 59(b), a periodic structure 203f having a prism shape, constituted by a transmitting section 203d and a reflection section 203e, is formed on the surface of the opposing face 203c.

In the present embodiment, in the same manner as the aforementioned embodiment 13, the light-directing body 203 is formed so as to (1) set the formation angle θ of the periodic structure 203f in the range of not less than 10° to not more than 75°, (2-1) make the width P2 of the reflection section 203e smaller than the width P1 of the transmitting section 203d in order to set the ratio P2/P1 between the width P1 of the transmitting section 203d and the width P2 of the reflection section 203e in the range of not less than 0.01 to not more than 0.20, (2-2) set the width Pd of the periodic structure 203f in the range of not less than 0.05 mm to not more than 1.0 mm, and (2-3) allow the ratio P2/P1 to become greater in the departing direction from the incident surface.

More specifically, the light-directing body 203 is formed so as to set the width Pd of the periodic structure 203f to Pd=500 μm and the formation angle θ of the periodic structure 203f to θ=approximately 45°. This arrangement makes it possible to eliminate interference between the pixel period of the reflection-type liquid crystal cell 204 and the periodic structure 204f, and consequently to prevent the occurrence of Moire fringes; thus, it becomes possible to avoid degradation in the display quality.

Moreover, in the case when the width Pd of the periodic structure 203f is Pd=500 μm, the width P1 of the transmitting section 203d is set to have an average value of 440 μm (P1=440 μm), the width P2 of the reflection section 203e is set to have an average value of 60 μm (P2=60 μm) and the height h of the prism formed by the transmitting section 203d and the reflection section 203e is set to 20 μm (h=20 μm). Furthermore, the above-mentioned ratio P2/P1 is set in the range of not less than 0.087 to not more than 0.19 (0.087≦P2/P1≦0.19).

Furthermore, in the case when the average value of the width P2 of the reflection section 203e is P2=60 μm, the width P2 of the reflection section 203e is made shorter than 60 μm as it approaches the light-incidence face 203a, and set to, for example, P2=40 μm, while it is made greater than 60 μm as it departs from the incident face 203a, and set to, for example, P2=80 μm.

Figure 59C:
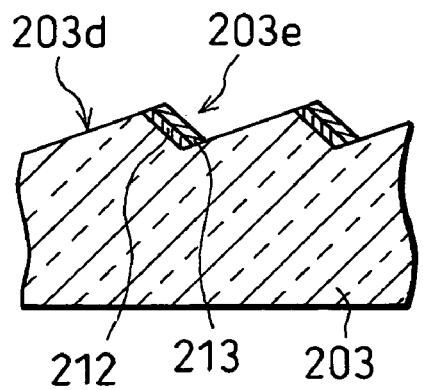
FIG. 59(c) is a cross-sectional view that shows the construction of a light-shielding film formed on a reflection section of the front light and a low reflection film that is formed on the surface thereof.
Figure 60:
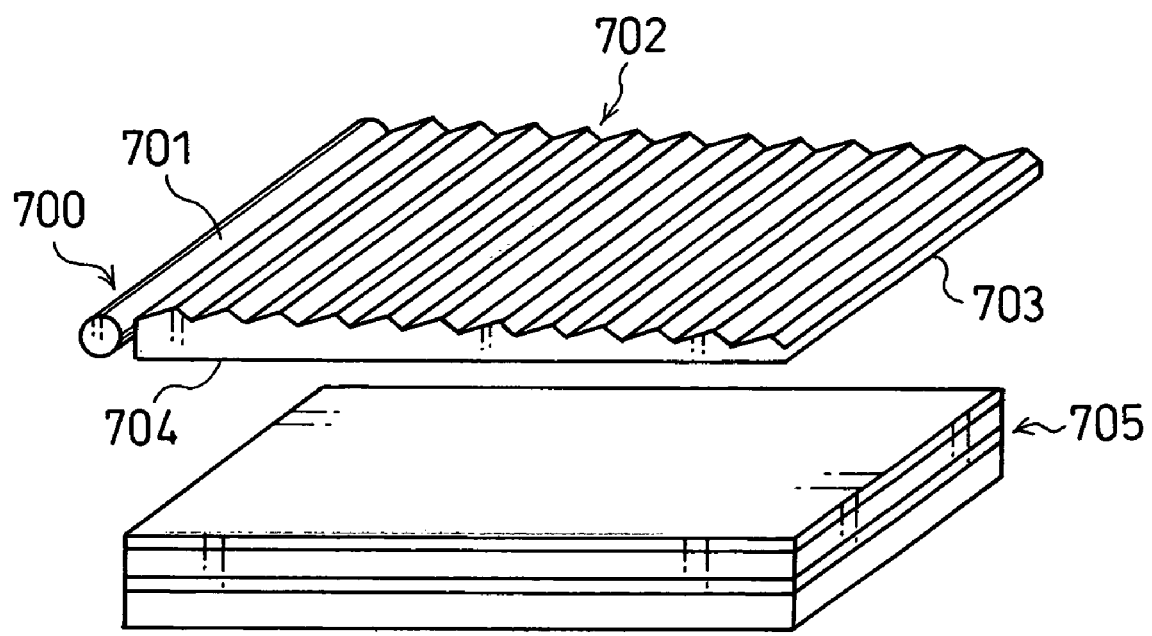
FIG. 60 is a perspective view that shows one example of the construction of a reflection-type LCD using a conventional front light.
Figure 61:
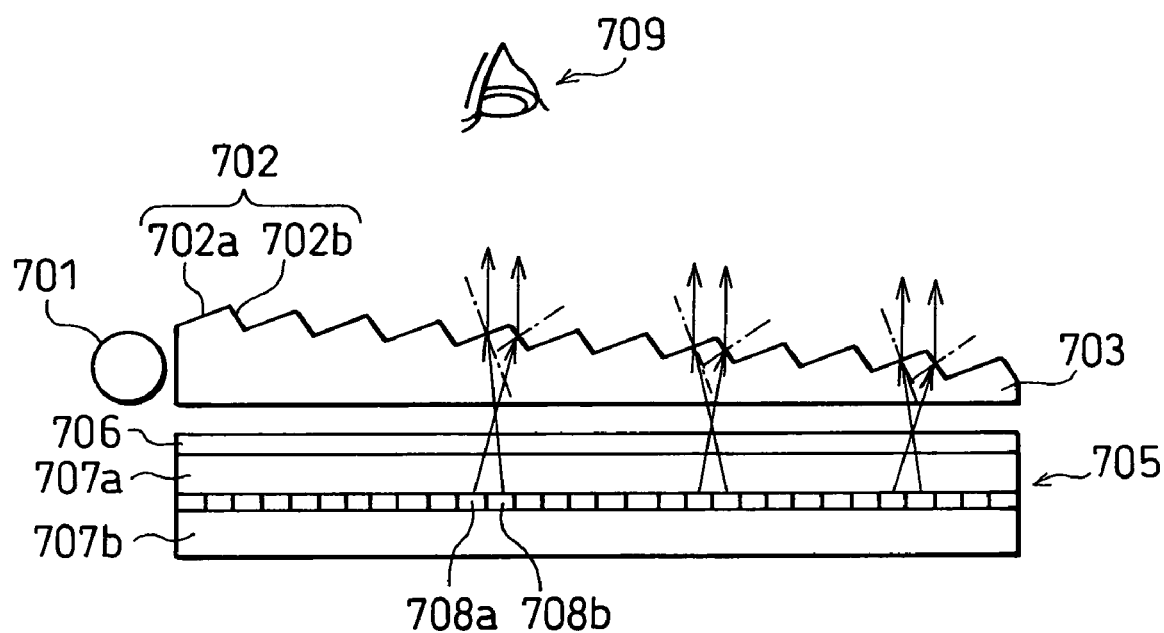
FIG. 61 is an explanatory drawing that shows the principle of double images in a reflection-type LCD using the front light shown in FIG. 60.
Figure 62A:
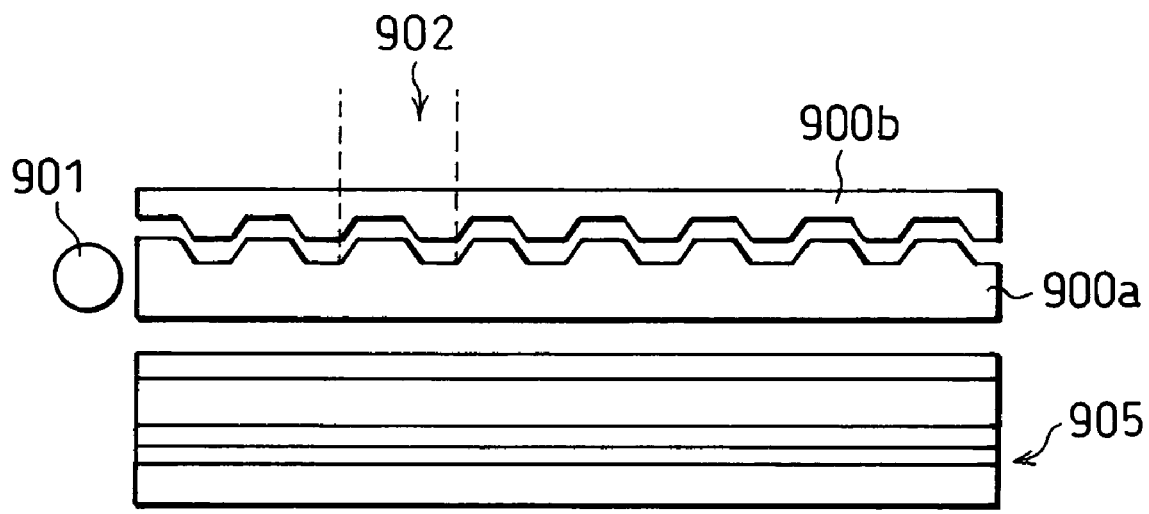
FIG. 62(a) is a perspective view that shows another example of the construction of a reflection-type LCD using a conventional front light.
Figure 62B:
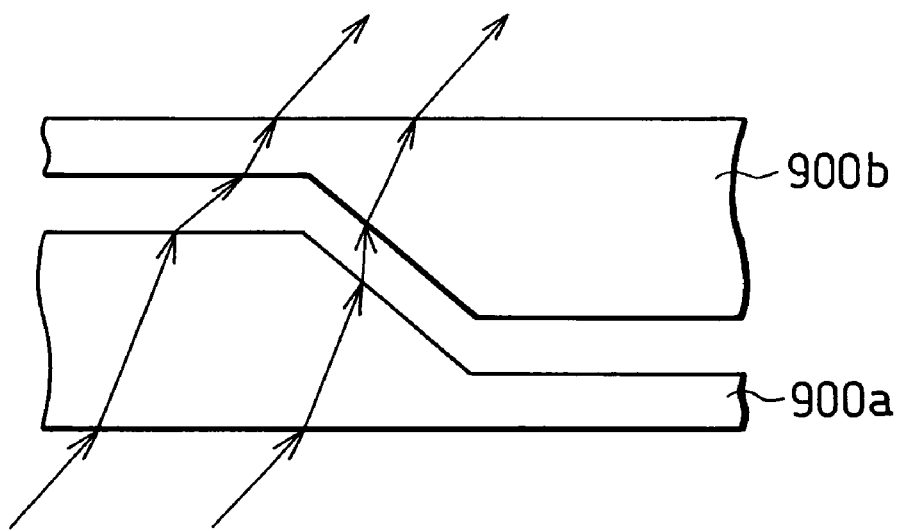
FIG. 62(b) is an explanatory drawing that shows a space formed between the first light-directing body and the second light-directing body in the above-mentioned front light.

In the present embodiment, on the back surface of the reflection section 203e, a chromium thin film is formed as a light-shielding film 212, as illustrated in FIG. 59(c). Moreover, a chromium oxide film 213 used for a low reflection treatment is formed on this light-shielding film 212 made of the chromium film, etc.

The formation of such a light-shielding film 212 improves the reflection efficiency of the reflection section 203e, and eliminates the release of light from the reflection section 203e, thereby making it possible to prevent double images positively. Further, the application of the low reflection treatment to the surface of the light-shielding film 212 reduces the occurrence of surface reflection on the opposing face 203c that is viewed by the observer, thereby making it possible to further improve the display quality of images.

As described above, in the present embodiment, the periodic structure constituted by the transmitting section and the reflection section formed on the opposing face of the light-directing body is formed so as to make an angle in the range of not less than 10° to not more than 75°, and more preferably, not less than 20° to not more than 55° (more specifically, approximately 45°) with respect to the repeating direction of the arrangement period of pixels formed on the reflection-type liquid crystal cell. This arrangement makes it possible to prevent the occurrence of Moire fringes, etc. due to interference of the above-mentioned periodic structure and the pixel period.

Moreover, in the present embodiment, the width P2 of the reflection section is made smaller than the width P1 of the transmitting section of the periodic structure formed on the opposing face of the light-directing body, and the periodic structure is formed so that the ratio P2/P1 between the width P1 of the transmitting section and the width P2 of the reflection section is set in the range of not less than 0.01 to not more than 0.20, and more preferably, in the range of 0.087 to 0.19. This arrangement makes the observer view images mainly on the transmitting section, thereby making it possible to prevent double images.

Furthermore, in the present embodiment, the width Pd of the periodic structure is set in the range of not less than 0.05 mm to not more than 1.0 mm (more specifically, Pd=0.50 mm). This arrangement makes the roughness of the periodic structure formed on the opposing face of the light-directing body less conspicuous, and also prevents light diffraction.

In addition, in the present embodiment, the ratio P2/P1 of the widths of the transmitting section and the reflection section is made greater in the departing direction from the incident surface. Thus, the width of the reflection section is made greater so that it is possible to uniform the distribution of light released from the light-directing body, and consequently to further uniform the illuminating light toward the reflection-type liquid crystal cell. As a result, it becomes possible to further improve the display quality of the reflection-type LCD.

Moreover, the installation of the light-shielding means on the back surface (opposing face) side of the reflection section makes it possible to prevent double images. Furthermore, the application of the low reflection treatment to the surface of the light-shielding means makes it possible to reduce the occurrence of reflection of external light on the screen of the reflection-type LCD, and consequently to improve the display quality of images.

In the present embodiment, the front light is formed by one sheet of a light-directing body. Therefore, it is possible to obtain a thin, light-weight illuminating means, and also to prevent the occurrence of Newton rings in the resulting images.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front-illuminating device comprising: a light source; and a light-directing body that is placed in front of an object to be illuminated, the light-directing body having an incident surface on which light from the light source is made incident, a first light-releasing surface from which light is released to the object to be illuminated and a second light-releasing surface, placed face to face with the first light-releasing surface, for releasing light reflected from the object to be illuminated, wherein the object to be illuminated is a reflection-type liquid crystal element, wherein the second light-releasing surface is formed into a stepped shape having slanting portions for reflecting light mainly from the light source toward the first light-releasing surface and flat portions for transmitting light reflected mainly from the object to be illuminated are alternately placed, and an optical means, which suppresses light from the slanting portions on the second light-releasing surface of the light-directing body from being reflected by the first light-releasing surface, is placed on the first light-releasing surface, wherein the second light-releasing surface is formed so as to include N steps (N>1), each step including one flat portion and one slanting portion and having a width (Wi) and wherein the width of each step is such as to satisfy the following relationship:

W1<W2<W3 ... <Wn.

2. The front-illuminating device as defined in claim 1, wherein said light-directing body includes a first light-directing body portion, and a second light-directing body portion optically coupled to the first light-directing body portion and being configured so as to average the luminance distribution of light released from the first light-releasing surface.

3. The front illuminating device as defined in claim 2, wherein refractive indexes of the first light-directing body portion and the second light-directing body portion are virtually equal to each other.

4. The front-illuminating device as defined in claim 2, wherein the first light-directing body portion and the second light-directing body portion are formed into an integral part.

5. The front-illuminating device as defined in claim 1, wherein the optical means is an anti-reflection film.

6. The front-illuminating device as defined in claim 1, wherein the incident surface is located on a side face of the light-directing body.

7. The front-illuminating device as defined in claim 6, wherein a sum of projections of the slanting portions onto a flat surface perpendicular to the first light-releasing surface is virtually equal to a projection of the incident surface onto the flat surface.

8. The front-illuminating device as defined in claim 1, wherein a sum of projections of the slanting portions onto the first light-releasing surface is smaller in area than a sum of projections of the flat portions onto the first light-releasing surface.

9. The front-illuminating device as defined in claim 1, wherein the flat portions are set in parallel with the first light-releasing surface, or set to have an angle of inclination of not more than ±10° with respect to the first light-releasing surface.

10. The front-illuminating device as defined in claim 1, wherein supposing that the refractive index of the light-directing body is $n_2$ and that the refractive index of an external medium contacting the slanting portions is $n_1$, the incident angle θ of light that is to be made incident on the slanting portions from the light source satisfies the following inequality:

θ≧arcsin($n_1$/$n_2$).

11. A front-illuminating device comprising: a light source; a light-directing body that is placed in front of an object to be illuminated, the light-directing body having an incident surface on which light from the light source is made incident, a first light-releasing surface from which light is released to the object to be illuminated and a second light-releasing surface, placed face to face with the first light-releasing surface, for releasing light reflected from the object to be illuminated; wherein the object to be illuminated is a reflection-type liquid crystal element, wherein the second light-releasing surface is formed into a stepped shape having slanting portions for reflecting light mainly from the light source toward the first light-releasing surface and flat portions for transmitting light reflected mainly from the object to be illuminated are alternately placed; an optical means, which suppresses light from the slanting portions on the second light-releasing surface of the light-directing body from being reflected by the first light-releasing surface, is placed on the first light-releasing surface; and wherein a reflective member for reflecting light is placed on the surface of the slanting portions, wherein the second light-releasing surface is formed so as to include N steps (N>1), each step including one flat portion and one slanting portion and having a width (Wi) and wherein the width of each step is such as to satisfy the following relationship:

W1<W2<W3 ... <Wn.

12. The front-illuminating device as defined in claim 11, wherein supposing that the refractive index of the light directing body is $n_2$ and that the refractive index of an external medium contacting the slanting portions is $n_1$, the incident angle θ of light that is to be made incident on the slanting portions from the light source satisfies the following inequality:

θ<arcsin($n_1$/$n_2$).

13. A reflection-type liquid crystal display comprising:
a reflection-type liquid crystal element having a reflective plate, and
wherein the front-illuminating device as disclosed in claim 1 is placed in front of the reflection type liquid crystal element.

14. The reflection-type liquid crystal display as defined in claim 13, wherein the reflection-type liquid crystal element is provided with a reflective plate having a surface on which protrusions and recesses are formed.

15. The reflection-type liquid crystal display as defined in claim 14, wherein the reflective plate is a reflective electrode that also functions as a liquid crystal driving electrode for driving a liquid crystal layer of the reflection-type liquid crystal element, the reflective plate being adjacent to the liquid crystal layer.

16. A reflection-type liquid crystal display comprising:
a reflection-type liquid crystal element having a reflective plate;
wherein the front-illuminating device as disclosed in claim 1 is placed in front of the reflection type liquid crystal element;
wherein the reflection-type liquid crystal element is provided with a reflective plate having a surface on which protrusions and recesses are formed;
wherein the reflective plate is a reflective electrode that also functions as a liquid crystal driving electrode for driving a liquid crystal layer of the reflection-type liquid crystal element, the reflective plate being adjacent to the liquid crystal layer; and
wherein the front illuminating device is attached to the reflection-type liquid crystal element so as to be freely opened and closed.

17. The front-illuminating device as defined in claim 1, wherein the second light-releasing surface is formed so as to include a plurality of steps, each step including one flat portion and one slanting portion and a having a width ($W_i$) and wherein the width of each step varies from the incident surface.

18. The front-illuminating device as defined in claim 17, wherein a width of one flat portion is $W_f$ and the width of the slanting portion is $W_s$ and wherein the ratio of the width of the flat and slanting portion is such as to satisfy the following relationship:

0.01≦$W_s$/$W_f$≦0.20.

19. The front-illuminating device as defined in claim 17, wherein the width of each step satisfies the following relationship:

$$0.05 \text{ mm} \leq Wi \leq 1.0 \text{ mm}.$$

20. The front-illuminating device as defined in claim 1, wherein the second light-releasing surface is formed so as to include a plurality of steps, each step including one flat portion having a width $W_f$ and one slanting portion having a width $W_s$ and wherein the ratio of the width of the flat and slanting portion $W_s/W_f$ increases for each step from the incident surface.

21. The front-illuminating device as defined in claim 1, wherein:
the second light-releasing surface is formed so as to include a plurality of blocks of steps;
each block includes at least one step and each of the at least one step includes one flat portion and a slanting portion; and
each block is characterized as having an interval ($I_{bi}$) in a direction generally orthogonal to the light incident surface, the intervals for the plurality of blocks is decreased block by block in the direction from the incident surface.

22. The reflection-type liquid crystal display as defined in claim 13, wherein the second light-releasing surface of the front illuminating device is formed so as to include a plurality of steps, each step including one flat portion and one slanting portion and a having a width ($W_i$) and wherein the width of each step varies from the incident surface.

23. The reflection-type liquid crystal display device as defined in claim 13, wherein the second light-releasing surface of the front-illuminating device is formed so as to include a plurality of steps, each step including one flat portion having a width $W_f$ and one slanting portion having a width $W_s$ and wherein the ratio of the width of the flat and slanting portion $W_s/W_f$ increases for each step from the incident surface.

24. The reflection-type liquid crystal display device as defined in claim 13, wherein:
the second light-releasing surface of the front-illuminating device is formed so as to include a plurality of blocks of steps;
each block includes at least one step and each of the at least one step includes one flat portion and a slanting portion; and
each block is characterized as having an interval ($I_{bi}$) in a direction generally orthogonal to the light incident surface, the intervals for the plurality of blocks is decreased block by block in the direction from the incident surface.

25. The front-illuminating device as defined in claim 1, wherein the light-directing body is placed in front of the object to be illuminated, the object to be illuminated being for observation from an observer through the light directing body.

26. The front-illuminating device as defined in claim 25, wherein the object to be illuminated is for observation from an observer through the second light-releasing surface of the light directing body.

27. The front-illuminating device as defined in claim 26, wherein the object to be illuminated is for observation from an observer through the flat portions of the second light-releasing surface of the light directing body.

28. The front-illuminating device as defined in claim 1, wherein the front-illuminating device is for being placed in contact with the object to be illuminated.

29. The front-illuminating device as defined in claim 28, wherein the light-directing body is placed in placed in contact with the object to be illuminated through the optical means.

30. The front-illuminating device as defined in claim 29, wherein the optical means is joined to an interface between the object to be illuminated and the first light-releasing surface of the light directing body.

31. The front-illuminating device as defined in claim 11, wherein the light-directing body is placed in front of the object to be illuminated, the object to be illuminated being for observation from an observer through the light directing body.

32. The front-illuminating device as defined in claim 31, wherein the object to be illuminated is for observation from an observer through the second light-releasing surface of the light directing body.

33. The front-illuminating device as defined in claim 26, wherein the object to be illuminated is for observation from an observer through the flat portions of the second light-releasing surface of the light directing body.

34. The front-illuminating device as defined in claim 11, wherein the front-illuminating device is for being placed in contact with the object to be illuminated.

35. The front-illuminating device as defined in claim 34, wherein the light-directing body is placed in placed in contact with the object to be illuminated through the optical means.

36. The front-illuminating device as defined in claim 35, wherein the optical means is joined to an interface between the object to be illuminated and the first light-releasing surface of the light directing body.

* * * * *